(12) United States Patent
Terashita et al.

(10) Patent No.: US 7,057,689 B2
(45) Date of Patent: Jun. 6, 2006

(54) LIQUID CRYSTAL DISPLAY WITH AT LEAST ONE PHASE COMPENSATION ELEMENT

(75) Inventors: Shinichi Terashita, Nara (JP); Fumikazu Shimoshikiryo, Tenri (JP); Shuichi Kozaki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/290,253

(22) Filed: Nov. 8, 2002

(65) Prior Publication Data

US 2003/0058393 A1   Mar. 27, 2003

Related U.S. Application Data

(62) Division of application No. 09/143,615, filed on Aug. 28, 1998, now Pat. No. 6,512,561.

(30) Foreign Application Priority Data

Aug. 29, 1997  (JP)  ................................... 9-235136
Sep. 25, 1997  (JP)  ................................... 9-260596
Apr. 30, 1998  (JP)  ................................. 10-121530

(51) Int. Cl.
*G02F 1/1335*  (2006.01)
(52) U.S. Cl. .................................... 349/117; 349/118
(58) Field of Classification Search ......... 349/117–121
See application file for complete search history.

(56) References Cited

U.S. PATENT DOCUMENTS

| | | | |
|---|---|---|---|
| 4,889,412 A | 12/1989 | Clerc et al. | |
| 5,196,953 A | 3/1993 | Yeh et al. | |
| 5,298,199 A | 3/1994 | Hirose et al. | |
| 5,570,214 A | 10/1996 | Abileah et al. | |
| 5,627,665 A | 5/1997 | Yamada et al. | |

(Continued)

FOREIGN PATENT DOCUMENTS

JP   62-210423   9/1987

(Continued)

OTHER PUBLICATIONS

Chen et al 38.3 Optical Simuation of Electo-Optical Performance of Low deltand Multidomain TN Displays, SID 97 Digest, May 1997.*

(Continued)

*Primary Examiner*—James A. Dudek
(74) *Attorney, Agent, or Firm*—Nixon & Vanderhye P.C.

(57) ABSTRACT

A liquid crystal display device of the present invention includes: a liquid crystal cell having a pair of substrates and a liquid crystal layer interposed therebetween; a pair of polarizing plates interposing the liquid crystal cell therebetween; and a phase compensation element provided between at least one of the polarizing plates and the liquid crystal cell. A refractive index anisotropy value of the liquid crystal layer along a plane parallel to a surface of the liquid crystal cell is smaller in a black display than in a white display. The phase compensation element has three principal refractive indices nx, ny and nz respectively along x, y and z axes thereof which are perpendicular to one another, and when nx and ny are the principal refractive indices along a plane parallel to a surface of the liquid crystal cell with nz being the principal refractive index along a thickness direction of the liquid crystal cell, wherein the x axis is parallel to an absorption axis of one of the polarizing plates closer to a viewer viewing the liquid crystal display device, and the principal refractive indices nx, ny and nz satisfy the following expressions: $nz<(nx+ny)/2$; and $nx \ne ny$.

48 Claims, 60 Drawing Sheets

U.S. PATENT DOCUMENTS

| | | | |
|---|---|---|---|
| 5,739,881 A * | 4/1998 | Xu et al. | 349/118 |
| 5,747,121 A * | 5/1998 | Okazaki et al. | 428/1.54 |
| 5,796,456 A | 8/1998 | Takatori et al. | |
| 5,844,649 A | 12/1998 | Yamahara et al. | |
| 6,061,116 A | 5/2000 | Nishida et al. | |
| 6,081,311 A * | 6/2000 | Murai | 349/118 |
| 6,141,075 A * | 10/2000 | Ohmuro et al. | 349/130 |
| 6,281,956 B1 | 8/2001 | Ohmuro et al. | |
| 6,642,981 B1 | 11/2003 | Ohmuro et al. | |
| 6,646,701 B1 * | 11/2003 | Lyu et al. | 349/119 |

FOREIGN PATENT DOCUMENTS

| | | |
|---|---|---|
| JP | 63-279229 | 11/1988 |
| JP | 2-15238 | 1/1990 |
| JP | 4-139402 | 5/1992 |
| JP | 4-153621 | 5/1992 |
| JP | 4-162018 | 6/1992 |
| JP | 5-113561 | 5/1993 |
| JP | 6-301015 | 10/1994 |
| JP | 6-342154 | 12/1994 |
| JP | 7-28063 A | 1/1995 |
| JP | 7-120746 | 5/1995 |
| JP | 07-244280 | 9/1995 |
| JP | 9-33882 | 2/1997 |
| JP | 9-50027 | 2/1997 |
| JP | 9-16002 | 6/1997 |
| JP | 09-304764 | 11/1997 |
| JP | 10-153802 | 6/1998 |
| JP | 10-186330 A | 7/1998 |

OTHER PUBLICATIONS

H. Murai, et al, "Wide Viewing Angle TFT-LCD Panel with 4-Domain CTN", AM-LCD '96/IDW '96, 1996, pp. 185-188.

"Phase Matched Biaxial Compensation Film for lcds", Wu, SID May 1995.

Ohmuro et al. Development of Super-High-Image-Quality Vertical-Alignment-Mode LCD, SID DIG pp. 845-848, May 1997.

* cited by examiner

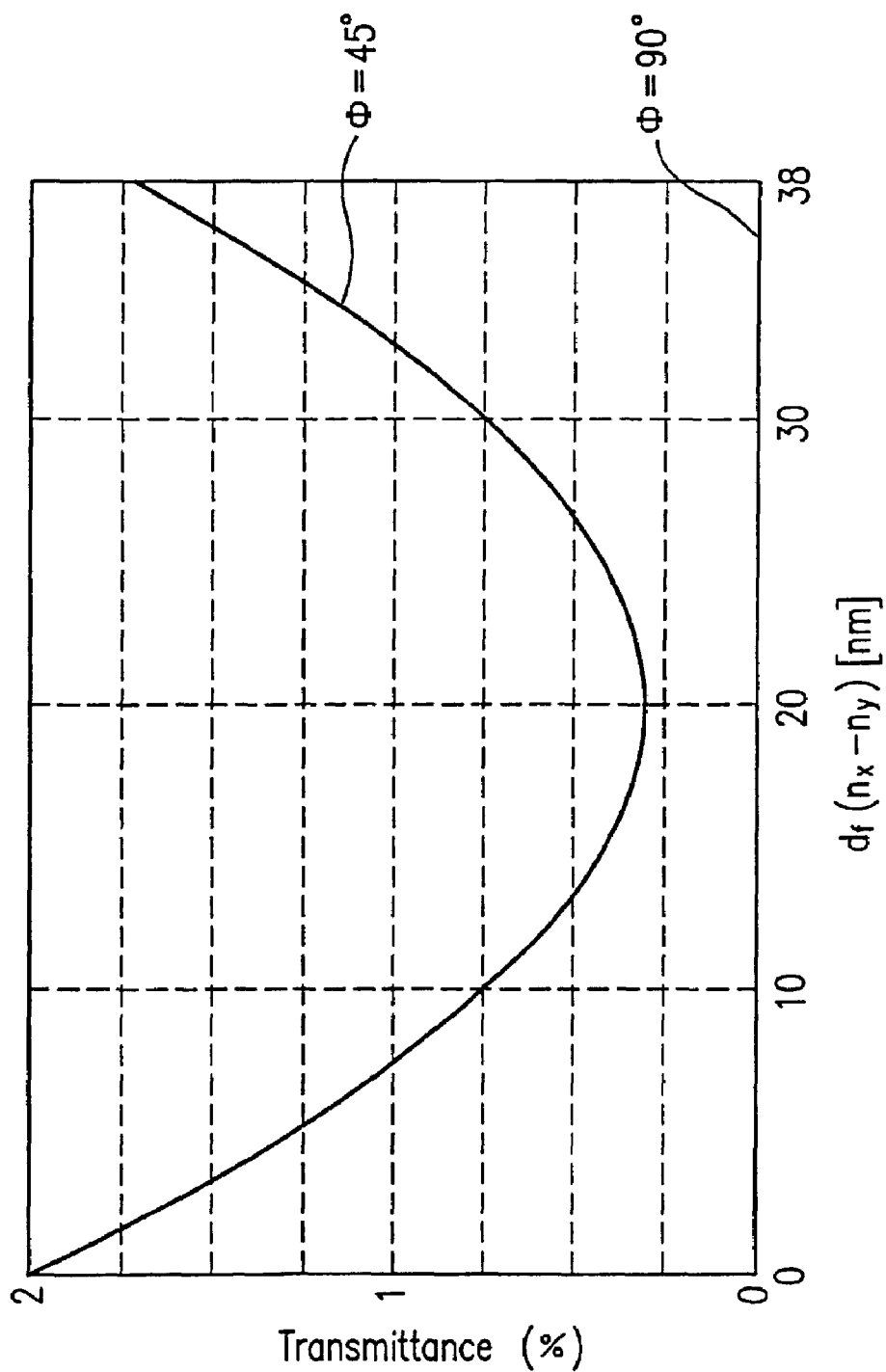

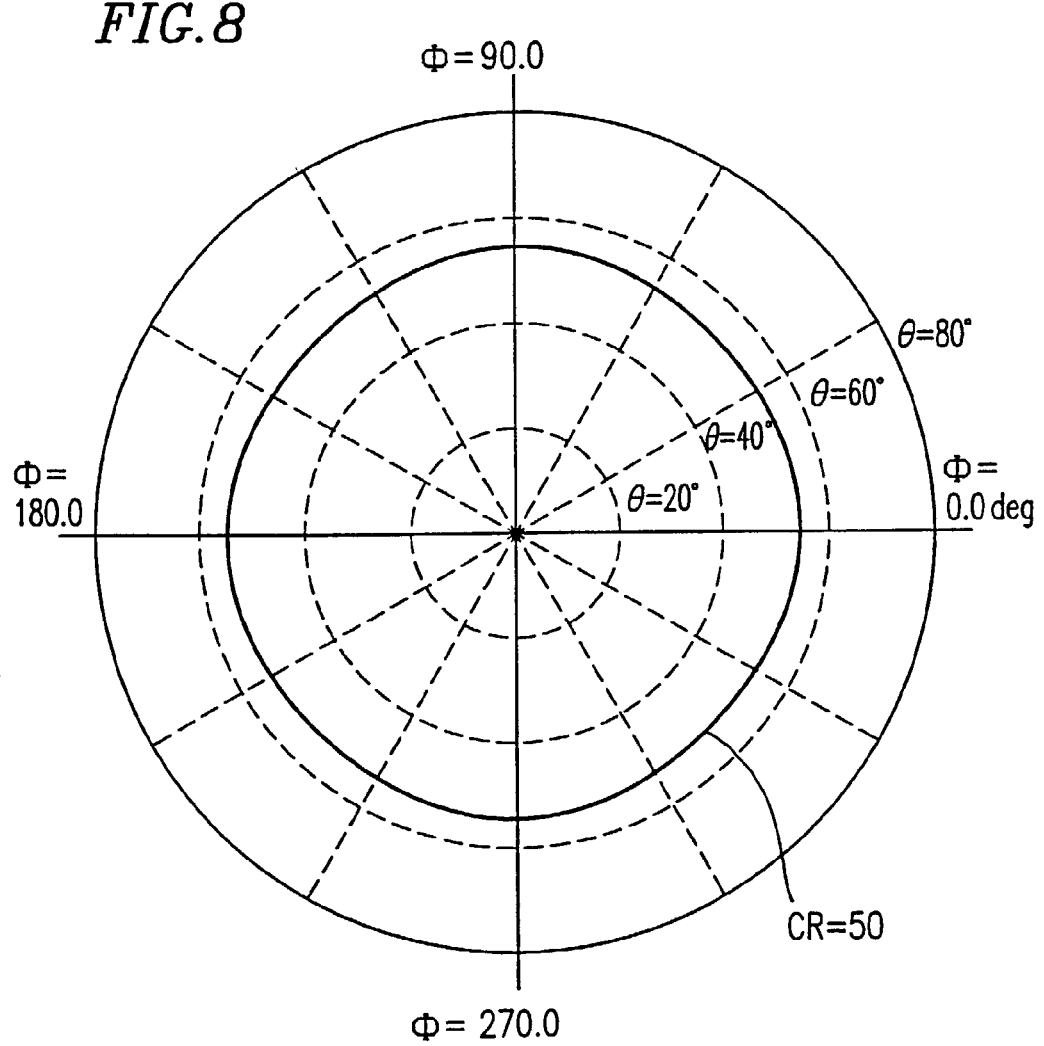

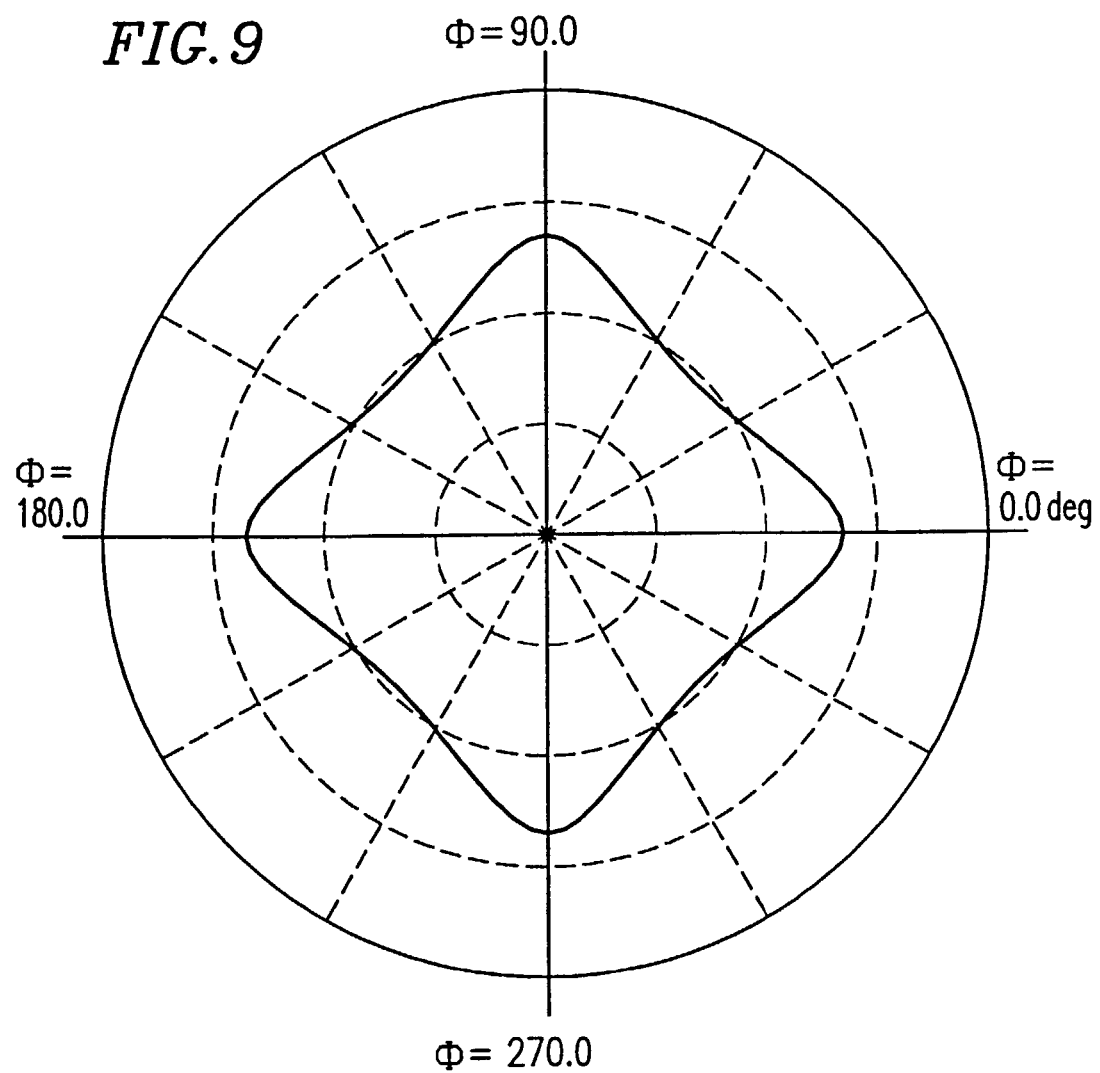

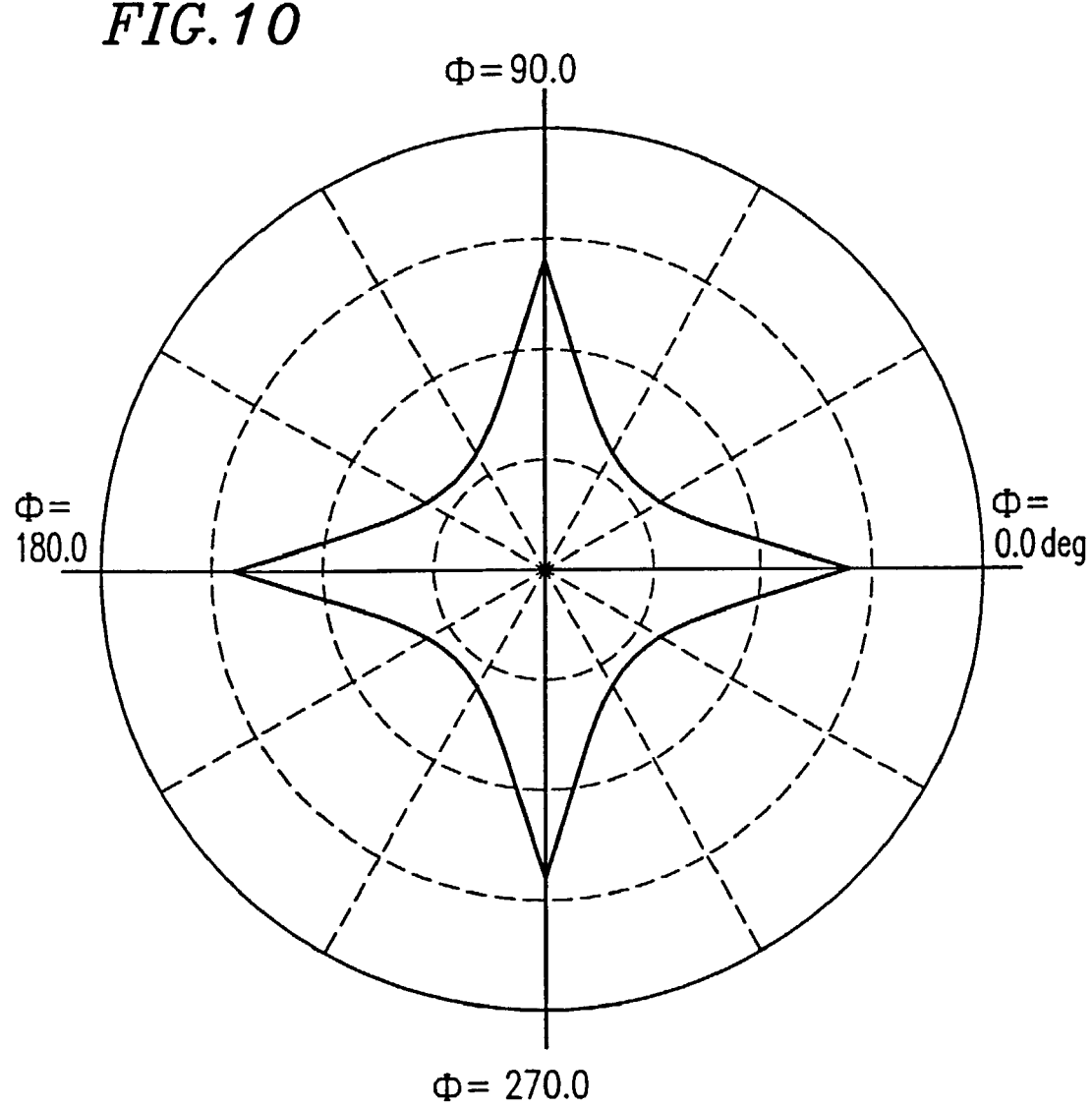

| | (a-1) White | (a-2) Black |
|---|---|---|
| 2 division | | |
| 4 division | (b-1) | (b-2) |
| Continuous | (c-1) | (c-2) |
| Display | White (When LC molecules horizontal) | Black (When LC molecules vertical) |
| Applied voltage Np | Low or zero | High |
| Applied voltage Nn | High | Low or zero |

At 45° from absorption axis of polarizing plate

Viewing angle characteristic Good

OFF state

ON state

OFF state

ON state

LIQUID CRYSTAL DISPLAY WITH AT LEAST ONE PHASE COMPENSATION ELEMENT This application is a division of application Ser. No. 09/143,615, filed Aug. 28, 1998, now U.S. Pat. No. 6,512,561, the entire content of which is hereby incorporated by reference in this application.

BACKGROUND OF THE INVENTION

1. Field of the Invention

The present invention relates to a liquid crystal display device. More particularly, the present invention relates to a liquid crystal display device having a wide viewing angle which is suitable for use in a flat display in a personal computer, a word processor, an amusement apparatus or a TV, or in a display apparatus utilizing a shutter effect.

2. Description of the Related Art

Known techniques for improving or widening the viewing angle of a liquid crystal display device include: moving the liquid crystal molecules only in a direction substantially parallel to the substrate surface; and dividing one pixel into a plurality of regions respectively having different orientations of liquid crystal molecules while the liquid crystal molecules move in a direction vertical to the substrate surface. A representative display mode which uses the former technique is the IPS (In-Plane Switching) mode. Representative display modes which uses the latter technique include: a wide viewing angle liquid crystal display mode (Japanese Laid-Open Publication No. 7-120728) where an Np (Nematic positive) type liquid crystal material is in an axially symmetric horizontal orientation; another wide viewing angle liquid crystal display mode (Japanese Laid-Open Publication No. 7-28068) where a vertically-oriented Nn (Nematic negative) type liquid crystal material is divided into regions and oriented differently in different regions by controlling an electric field applied therethrough; and still another wide viewing angle liquid crystal display mode (disclosed in AM-LCD'96, p. 185 (1996)) where an Np (Nematic positive) type liquid crystal material in each pixel is divided substantially equally into four regions, with the liquid crystal material being in different parallel orientations in each region.

Generally, in the latter technique, where each pixel is divided into a plurality of regions having liquid crystal molecules of different orientations, the viewing angle characteristic along an axial direction which extends equiangularly between a polarization axis 202 of an upper polarizing plate and an absorption axis 203 of a lower polarizing plate (which interpose a liquid crystal cell 201 therebetween as illustrated in FIG. 23B) is considerably inferior to the viewing angle characteristic along one of the absorption axes. Referring to FIG. 23A, a polar coordinate system is defined where: θ represents an angle from a direction normal to an imaginary plane 204 parallel to the liquid crystal cell to a viewing direction 205 from which the viewer is viewing the display; and Φ denotes an azimuth of the viewing direction 205 with respect to the absorption axis 203 (where Φ=0°) of a lower polarizing plate. When the viewing angle characteristic is evaluated in such a polar coordinate system, an isocontrast contour curve, as illustrated in FIG. 24, results generally irrespective of the display mode. Thus, the viewing angle narrows as the azimuth Φ shifts from the absorption axis of the upper or lower polarizing plate. A curve 302, also illustrated in FIG. 24, represents an isocontrast contour curve which the present invention aims to obtain.

The inventors of the present invention disclosed (Japanese Laid-Open Publication No. 7-120728) an ASM mode (Axially Symmetric Aligned Microcell Mode) where the liquid crystal molecules are oriented in an axially symmetric pattern in each pixel. In this mode, the phase separation of a mixture of a liquid crystal material and a photocurable resin is used to orient the liquid crystal molecules in an axially symmetric pattern. The Np type liquid crystal material used in this mode is such that the axially symmetric liquid crystal molecules are oriented vertically to the substrate by applying a voltage thereto.

A liquid crystal display device of this conventional ASM mode uses a liquid crystal material whose dielectric anisotropy Δε has a positive value. This display mode exhibits excellent display characteristics in any direction since the liquid crystal molecules are oriented in axial symmetry. However, when the respective absorption axes of the polarizing plates are arranged in a crossed-Nicols arrangement, the viewing characteristic tends to deteriorate. Moreover, a black matrix having a large area is required for preventing light from leaking in an OFF state. Furthermore, this conventional ASM mode utilizes a phase separation process which requires a complicated temperature control in order to realize the axially symmetric orientation. Therefore, a liquid crystal display device of this ASM mode is difficult to produce and the obtained axially symmetric orientation is unstable which is not reliable, particularly at a high temperature.

In order to solve such problems, the inventors of the present invention proposed (Japanese Laid-Open Publication No. 8-341590) a liquid crystal display device where the liquid crystal molecules are oriented in axial symmetry in each pixel region, which thus has a high contrast and exhibits excellent display characteristics in any azimuth, and a production method which allows such a liquid crystal display device to be produced easily.

The liquid crystal display device has: a pair of substrates interposing a liquid crystal layer therebetween including liquid crystal molecules with a negative dielectric anisotropy (Δε<0); and a vertical alignment layer on one surface of each substrate adjacent to the liquid crystal layer. Protrusions are further provided on at least one of the substrates so as to surround each pixel region. Moreover, a pair of polarizing plates are provided between the pair of substrates so that the respective absorption axes of the polarizing plates are perpendicular to each other. This liquid crystal display device does not require a complicated production process, but still realizes such an orientation where the liquid crystal molecules are oriented substantially perpendicular to the pair of substrates in the absence of an applied voltage, and are axially symmetric in each pixel region in the presence of an applied voltage.

In this liquid crystal display device, in the absence of an applied voltage, the liquid crystal molecules are oriented substantially perpendicular to the pair of substrates, thereby realizing a satisfactory black state and thus a high contrast display in a viewing angle normal to the display plane. From different viewing angles, however, light leakage is observed, and the contrast ratio is deteriorated, because (i) some of the viewing angle dependency results from an inherent characteristic of the polarizing plate, and (ii) the retardation value of the vertically-oriented liquid crystal molecules varies from one direction to another, thereby causing the retardation value of the liquid crystal layer to have a viewing angle dependency.

Hereinafter, the viewing angle dependency resulting from an inherent characteristic of the polarizing plate will be explained. When light is incident upon the above-described wide viewing angle mode liquid crystal display device from a direction of the polarization axis (transmittance axis) of the polarizing plate and passes through the refractive index ellipsoid of the liquid crystal layer, then, such light only contains a normal light component or an abnormal light component. However, when light is incident upon the device from a direction shifted by 45° from the absorption axis of the polarizing plate and passes though the refractive index ellipsoid, then, such light contains both normal and abnormal light components and thus is elliptically-polarized light. In such a case, apparent light leakage increases as the direction of the vibration of the polarized light shifts from one of the absorption axes of the polarizing plates, which are perpendicular to each other.

Hereinafter, the viewing angle dependency resulting from the varying retardation value of the liquid crystal layer will be explained. In the above-described liquid crystal display device, the liquid crystal molecules are oriented substantially vertically to the pair of substrates in the absence of an applied voltage. Accordingly, the retardation value varies depending upon the direction from which the display is viewed, whereby the viewing angle dependency is observed.

The viewing angle characteristic is particularly poor in a direction at about 45° from both of the absorption axes of the polarizing plates which are perpendicular to each other. The poor viewing angle characteristic occurs because in such a direction the inherent characteristic of the polarizing plate and the varying retardation value both affect the viewing angle characteristic of the display device. For example, in a direction at about 45° with respect to the absorption axis of the polarizing plate, the contrast of the display device considerably deteriorates over a certain viewing angle range, e.g., from about 35° to about 50°, where the gray-scale level is inverted. Thus, the display characteristic greatly deteriorates particularly in a grayscale display.

SUMMARY OF THE INVENTION

According to one aspect of this invention, a liquid crystal display device includes: a liquid crystal cell having a pair of substrates and a liquid crystal layer interposed therebetween; a pair of polarizing plates interposing the liquid crystal cell therebetween; and a phase compensation element provided between at least one of the polarizing plates and the liquid crystal cell. A refractive index anisotropy value of the liquid crystal layer along a plane parallel to a surface of the liquid crystal cell is smaller in a black display than in a white display. The phase compensation element has three principal refractive indices nx, ny and nz respectively along x, y and z axes thereof which are perpendicular to one another, and when nx and ny are the principal refractive indices along a plane parallel to a surface of the liquid crystal cell with nz being the principal refractive index along a thickness direction of the liquid crystal cell, wherein the x axis is parallel to an absorption axis of one of the polarizing plates closer to a viewer viewing the liquid crystal display device, and the principal refractive indices nx, ny and nz satisfy the following expressions: nz<(nx+ny)/2; and nx≠ny.

In one embodiment of the invention, first and second phase compensation elements are provided respectively between one of the polarizing plates and the liquid crystal cell and between the other one of the polarizing plates and the liquid crystal cell. The first and second phase compensation elements each have a maximum refractive index axis along which the phase compensation element exhibits a maximum refractive index in the plane parallel to the surface of the liquid crystal cell, the axes being perpendicular to each other.

In one embodiment of the invention, the maximum refractive index axis of each of the first and second phase compensation elements is perpendicular to an absorption axis of one of the polarizing plates which is adjacent to the phase compensation element.

In one embodiment of the invention, the liquid crystal layer includes a nematic liquid crystal material which has a negative dielectric anisotropy, where liquid crystal molecules of the nematic liquid crystal material are oriented substantially perpendicular to the substrate in an absence of an applied voltage.

In one embodiment of the invention, the liquid crystal layer includes a nematic liquid crystal material which has a positive dielectric anisotropy, where liquid crystal molecules of the nematic liquid crystal material are oriented substantially parallel to the substrate in an absence of an applied voltage.

In one embodiment of the invention, the liquid crystal cell includes a plurality of pixel regions, each of the pixel regions including two or more liquid crystal regions, respectively, having different orientations of liquid crystal molecules.

In one embodiment of the invention, the liquid crystal cell includes a plurality of pixel regions, and an orientation of liquid crystal molecules varies continuously in each of the pixel regions.

In one embodiment of the invention, a birefringence $\Delta n$ of the liquid crystal molecules, an average thickness dLC of the liquid crystal layer, and a thickness df of the phase compensation element satisfy the following expressions: $0 \leq \{df \cdot (nx-ny)\}/(dLC \cdot \Delta n) \leq 0.12$; and $0.05 \leq \{df \cdot (nx-nz)\}/(dLC \cdot \Delta n) \leq 0.69$.

In one embodiment of the invention, the liquid crystal layer includes a plurality of liquid crystal regions. The pair of substrates each have a vertical alignment layer on one surface thereof which is closer to the liquid crystal layer, and the liquid crystal molecules are oriented in axial symmetry in each of the liquid crystal regions in a presence of an applied voltage. Respective absorption axes of the pair of polarizing plates are perpendicular to each other. The phase compensation element has a negative birefringence and a relationship nx>ny>nz.

In one embodiment of the invention, the phase compensation element is provided between the liquid crystal cell and each of the polarizing plates.

In one embodiment of the invention, the phase compensation element includes a biaxial film having retardations along an in-plane direction and along a thickness direction, respectively, or a layered film obtained by attaching together a uniaxial film having a retardation along the in-plane direction and a uniaxial film having a retardation along the thickness direction.

In one embodiment of the invention, the x axis of the phase compensation element is substantially perpendicular to an absorption axis of one of the polarizing plates which is adjacent to the phase compensation element.

In one embodiment of the invention, an angular shift between the x axis of the phase compensation element and a direction perpendicular to the absorption axis of the polarizing plate is equal to or less than about 1°.

In one embodiment of the invention, a retardation value $df \cdot (nx-ny)$ of the phase compensation element along an in-plane direction thereof is less than a retardation value $dLC \cdot \Delta n$ of the liquid crystal layer, where: $\Delta n$ denotes a birefringence of the liquid crystal molecules; dLC denotes an average thickness of the liquid crystal layer; and df denotes a thickness of the phase compensation element.

In one embodiment of the invention, the retardation value dLC·Δn of the liquid crystal layer is in a range of 300 nm to 550 nm.

In one embodiment of the invention, the birefringence Δn of the liquid crystal molecules, the average thickness dLC of the liquid crystal layer and the thickness df of the phase compensation element satisfy the following expressions: $0 \leq \{df \cdot (nx-ny)\}/(dLC \cdot \Delta n) \leq 0.13$; and $0 \leq \{df \cdot (nx-nz)\}/(dLC \cdot \Delta n) \leq 0.72$.

In one embodiment of the invention, a retardation value df·(nx−nz) of the phase compensation element along a thickness direction thereof is less than a retardation value dLC·Δn of the liquid crystal layer, where: Δn denotes a birefringence of the liquid crystal molecules; dLC denotes an average thickness of the liquid crystal layer; and df denotes a thickness of the phase compensation element.

In one embodiment of the invention, the retardation value dLC·Δn of the liquid crystal layer is in a range of 300 nm and 550 nm.

In one embodiment of the invention, the birefringence Δn of the liquid crystal molecules, the average thickness dLC of the liquid crystal layer and the thickness df of the phase compensation element satisfy the following expressions: $0 \leq \{df \cdot (nx-ny)\}/(dLC \cdot \Delta n) \leq 0.13$; and $0 \leq \{df \cdot (nx-nz)\}/(dLC \cdot \Delta n) \leq 0.72$.

In one embodiment of the invention, the phase compensation element is such as to satisfy the following expression: $0.035 \leq \{df \cdot (nx-ny)\}/(dLC \cdot \Delta n) \leq 0.15$.

In one embodiment of the invention, a retardation value df·(nx−nz) of the phase compensation element along a thickness direction thereof is greater than 0.

In one embodiment of the invention, a ratio between a retardation value df·(nx−ny) of the phase compensation element along an in-plane direction thereof and the retardation value df·(nx−nz) of the phase compensation element along the thickness direction thereof is equal to or greater than 2.

In one embodiment of the invention, the ratio between the retardation value df·(nx−ny) of the phase compensation element along the in-plane direction thereof and the retardation value df·(nx−nz) of the phase compensation element along the thickness direction thereof is in a range of about 3 to about 6.

In one embodiment of the invention, an average refractive index of the phase compensation element is in a range of about 1.4 to about 1.7.

In one embodiment of the invention, an antiglare layer is provided on a surface of the one of the polarizing plates closer to the viewer viewing the liquid crystal display device.

In one embodiment of the invention, an antireflection film is provided on a surface of the antiglare layer.

Thus, the invention described herein makes possible the advantages of providing a liquid crystal display device having a generally axially symmetric viewing angle characteristic in which the viewing angle characteristic is prevented from deteriorating as the viewing direction shifts from the absorption axis.

This and other advantages of the present invention will become apparent to those skilled in the art upon reading and understanding the following detailed description with reference to the accompanying figures.

BRIEF DESCRIPTION OF THE DRAWINGS

FIG. 6C is a graph illustrating an effect of reducing the light leakage occurring along with viewing angle variation in an azimuth equiangularly between respective absorption axes of upper and lower polarizing plates in accordance with the present invention.

FIG. 8 is a graph illustrating a viewing angle characteristic in accordance with Example 1 of the present invention.

FIG. 9 is a graph illustrating a viewing angle characteristic in accordance with Comparative Example 1.

FIG. 10 is a graph illustrating a viewing angle characteristic in accordance with Comparative Example 2.

FIGS. 25A and 25B illustrate a state in the absence of an applied voltage; FIGS. 25C and 25D illustrate a state in the presence of an applied voltage; FIGS. 25A and 25C each illustrate a cross-sectional view of the liquid crystal display device; and FIGS. 25B and 25D each illustrate how the upper surface of the device is observed with a polarization microscope in a crossed Nicols state.

FIG. 62A illustrates the gray-scale characteristic in a direction along the absorption axis of the upper polarizing plate; and FIG. 62B illustrates the gray-scale characteristic in a direction shifted by about 45° from the absorption axis of the upper polarizing plate.

FIG. 63A illustrates the gray-scale characteristic in a direction along the absorption axis of the upper polarizing plate; and FIG. 63B illustrates the gray-scale characteristic in a direction shifted by about 45° from the absorption axis of the upper polarizing plate.

FIG. 64A illustrates the gray-scale characteristic in a direction along the absorption axis of the upper polarizing plate; and FIG. 64B illustrates the gray-scale characteristic in a direction shifted by about 45° from the absorption axis of the upper polarizing plate.

FIG. 65A illustrates the gray-scale characteristic in a direction along the absorption axis of the upper polarizing plate; and FIG. 65B illustrates the gray-scale characteristic in a direction shifted by about 45° from the absorption axis of the upper polarizing plate.

FIG. 66A illustrates the gray-scale characteristic in a direction along the absorption axis of the upper polarizing plate; and FIG. 66B illustrates the gray-scale characteristic in a direction shifted by about 45° from the absorption axis of the upper polarizing plate.

DESCRIPTION OF THE PREFERRED EMBODIMENTS

Embodiment 1

Hereinafter, Embodiment 1 of the present invention will be described.

Figure 1:
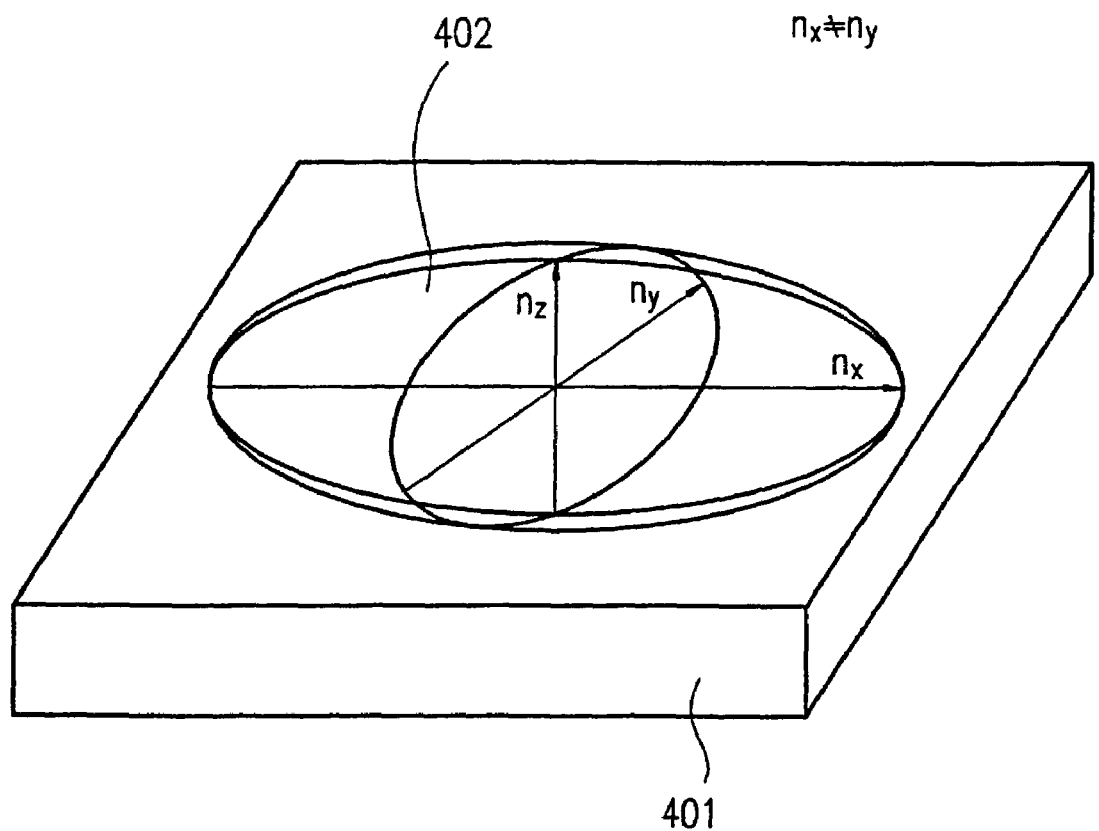
FIG. 1 is a schematic perspective view illustrating refractive index conditions for a phase compensation element used in the present invention.

In accordance with Embodiment 1 of the present invention, a phase compensation element is inserted between a liquid crystal cell and a polarizing plate. As illustrated in FIG. 1, the phase compensation element has in-plane average refractive indices (nx and ny) each being greater than the refractive index (nz) in the thickness direction and has a refractive index anisotropy in the plane thereof. This eliminates the deterioration of the viewing angle characteristic as the viewing direction shifts from the absorption axis.

The two conditions required by a phase compensation element used in the present invention are nz<(nx+ny)/2 and nx≠ny, as shown in FIG. 1. A phase compensation element which is formed of a plurality of phase plates (or phase films) can also be used in the present invention if the element as a whole satisfies the above two conditions. In FIG. 1, reference numeral 401 denotes the phase compensation element used in the present invention, and 402 denotes the refractive index ellipsoid thereof.

Moreover, it is possible to adjust the angle between the axis of the in-plane refractive index anisotropy and the axis of the polarizing plate in view of efficiently suppressing the transmittance variation and the coloring which occur depending upon the viewing angle when performing a white or gray-scale display in a liquid crystal display device.

Figure 2:
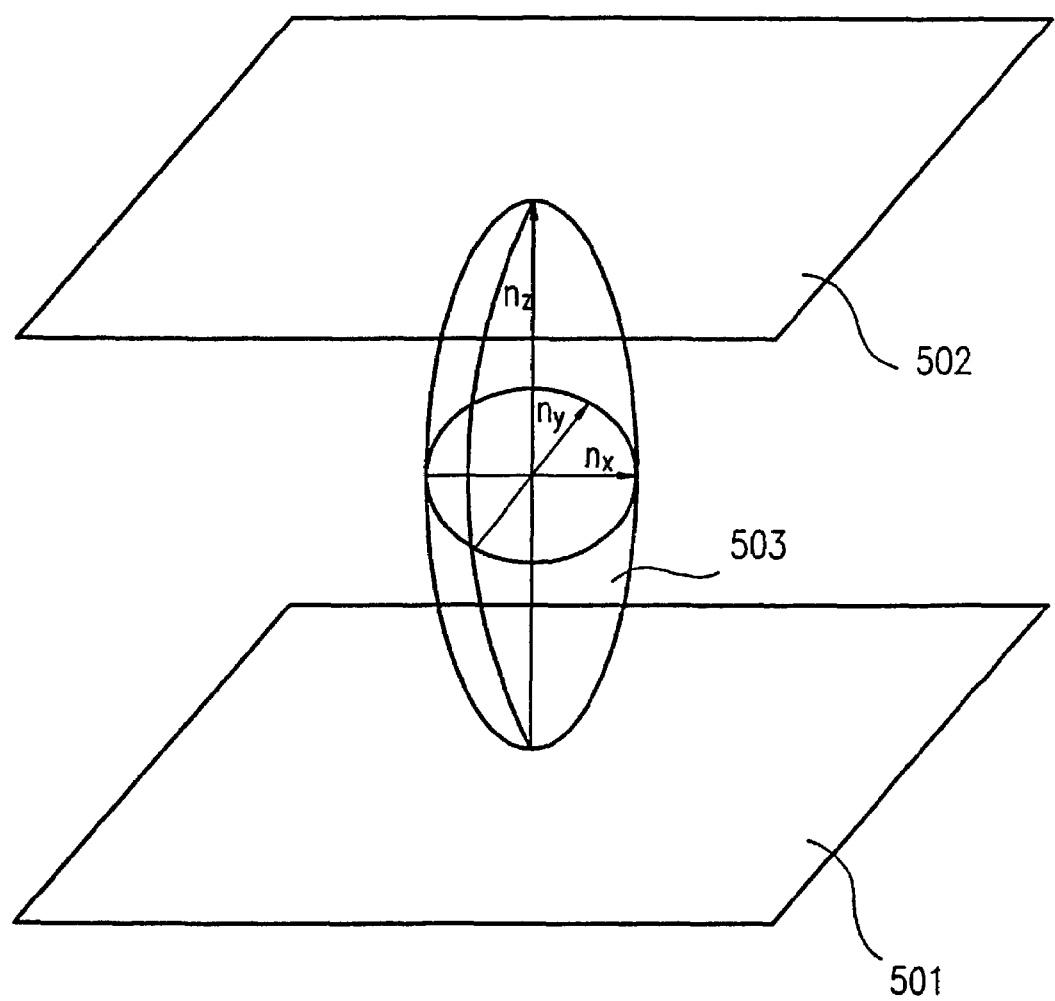
FIG. 2 is a perspective view illustrating an approximation of a refractive index anisotropy in a black display when a pixel is divided into four or more regions of different orientations in a liquid crystal cell which can be used with the present invention.

The condition required by a liquid crystal cell used in the present invention is that "a refractive index anisotropy value of the liquid crystal layer along a plane parallel to a surface of the liquid crystal cell is smaller in a black display than in a white display", as described above. Therefore, in a black display, the liquid crystal cell used in the present invention can be approximated as a uniaxial positive phase plate, as illustrated in FIG. 2. In FIG. 2, reference numerals 501 and 502 respectively denote lower and upper substrates of the liquid crystal cell, and 503 denotes a refractive index ellipsoid representing the refractive index anisotropy of the liquid crystal layer in a black display.

Figure 3:
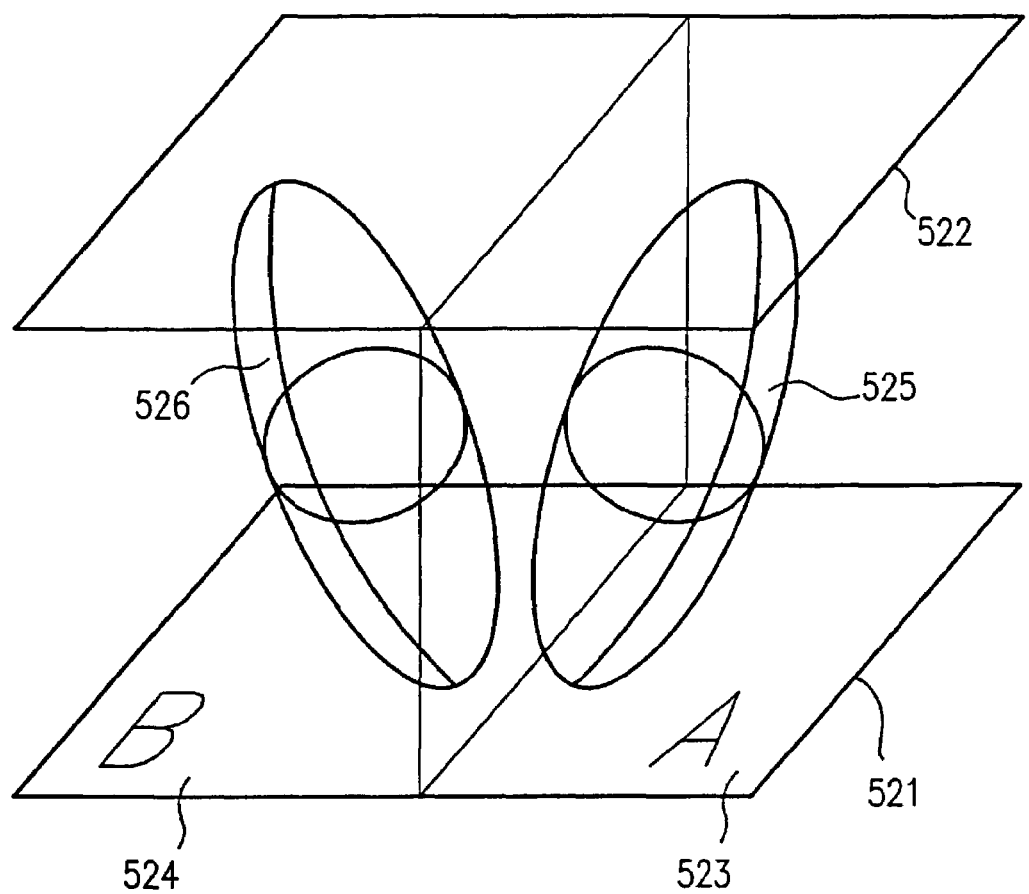
FIG. 3 is a perspective view illustrating an approximation for each domain of a refractive index anisotropy in a black display when a pixel is divided into two regions of different orientations in a liquid crystal cell which can be used with the present invention.

In a liquid crystal cell which is not divided into regions having different orientations of liquid crystal molecules, the optical axis of the refractive index ellipsoid equivalent to the liquid crystal cell in a black display is shifted from a direction normal to the liquid crystal cell, whereby the approximation of FIG. 2 is inappropriate. FIG. 3 illustrates refractive index ellipsoids representing the refractive index anisotropy of the liquid crystal cell which is divided into two regions having different orientations of liquid crystal molecules in a black display. In FIG. 3, reference numeral 521 denotes a lower substrate, 522 denotes an upper substrate, 523 denotes a domain A, 524 denotes a domain B, 525 denotes a refractive index ellipsoid representing the refractive index anisotropy of the liquid crystal layer in the domain A, and 526 denotes a refractive index ellipsoid representing the refractive index anisotropy of the liquid crystal layer in the domain B.

Figure 4:
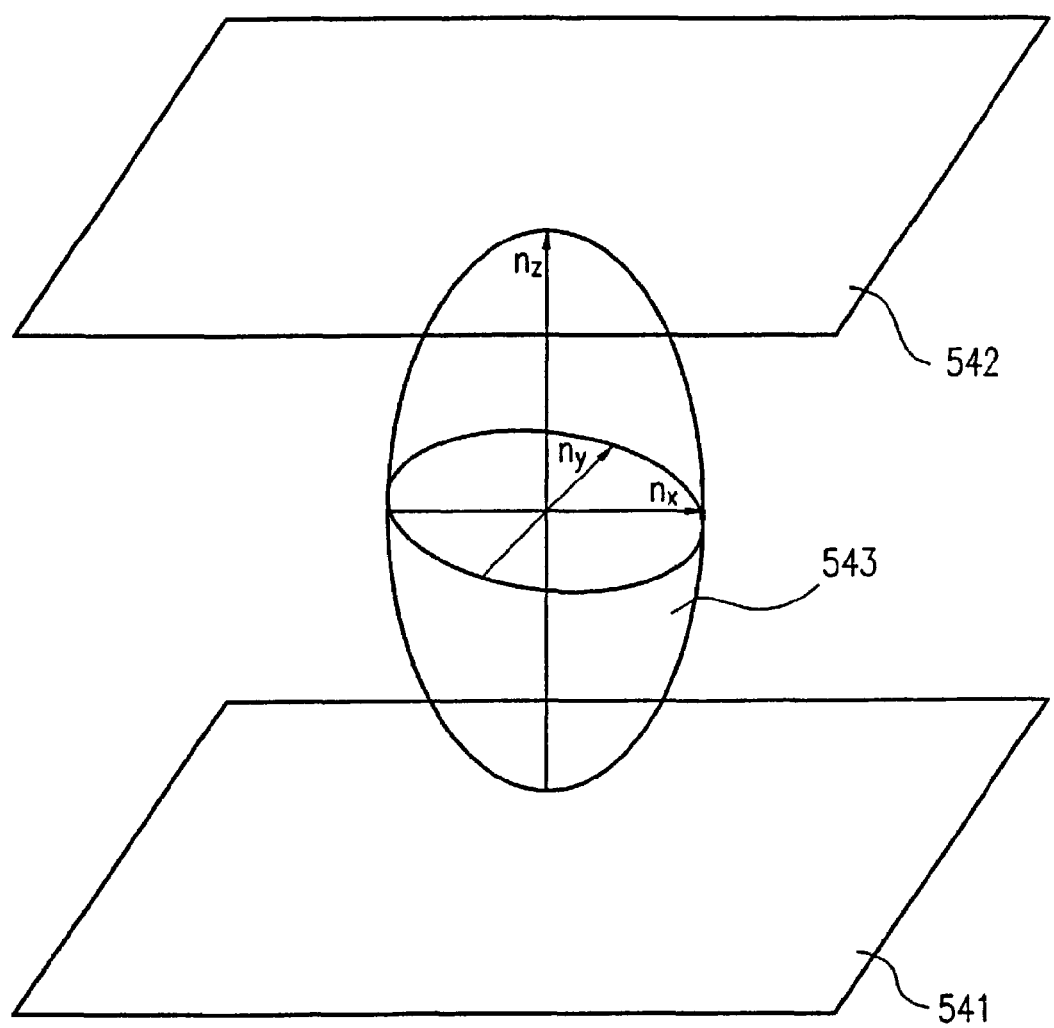
FIG. 4 is a perspective view illustrating an approximation of an averaged refractive index anisotropy in a black display when a pixel is divided into two regions of different orientations in a liquid crystal cell which can be used with the present invention.

The domains A and B illustrated in FIG. 3 coexist in one pixel so that the entire pixel as a total can be approximated as in FIG. 4. Therefore, the approximation of FIG. 2 is generally appropriate, and the effects of the present invention are provided.

An important difference between FIG. 2 and FIG. 4 is that $nx=ny$ in FIG. 2 while $nx \neq ny$ in FIG. 4. It can be easily understood that as the pixel is divided into more regions, respectively, having different orientations of liquid crystal molecules, or as the pretilt angle of the liquid crystal molecules increases, then the difference between nx and ny decreases, thereby rendering the approximation of FIG. 2 more appropriate.

Examples of such a liquid crystal cell include: a wide viewing angle liquid crystal display mode (Japanese Laid-Open Publication No. 7-120728) where the Np type liquid crystal material is in an axially symmetric horizontal orientation; another wide viewing angle liquid crystal display mode (Japanese Laid-Open Publication No. 7-28068) where a vertically-oriented Nn type liquid crystal material is divided into regions and oriented differently in different regions by controlling an electric field applied thereto; the wide viewing angle liquid crystal display mode (Japanese Laid-Open Publication No. 8-341590, proposed by the inventors of the present invention) where an Nn type liquid crystal material is in an axially symmetric vertical orientation; and still another wide viewing angle liquid crystal display mode (disclosed in AM-LCD'96, p. 185 (1996)) where an Np type liquid crystal material in each pixel is divided substantially equally into four regions, with the liquid crystal material being in a parallel orientation in each region.

As described above, the present invention can be applied to any liquid crystal cell whose optical state in a black display can be generally represented as in FIG. 2. Therefore, the present invention will hereinafter be described with, in place of a liquid crystal cell, a phase film having a refractive index ellipsoid equivalent to the refractive index ellipsoid of FIG. 2 representative of the refractive index anisotropy of the liquid crystal cell in a black display.

Figure 5:
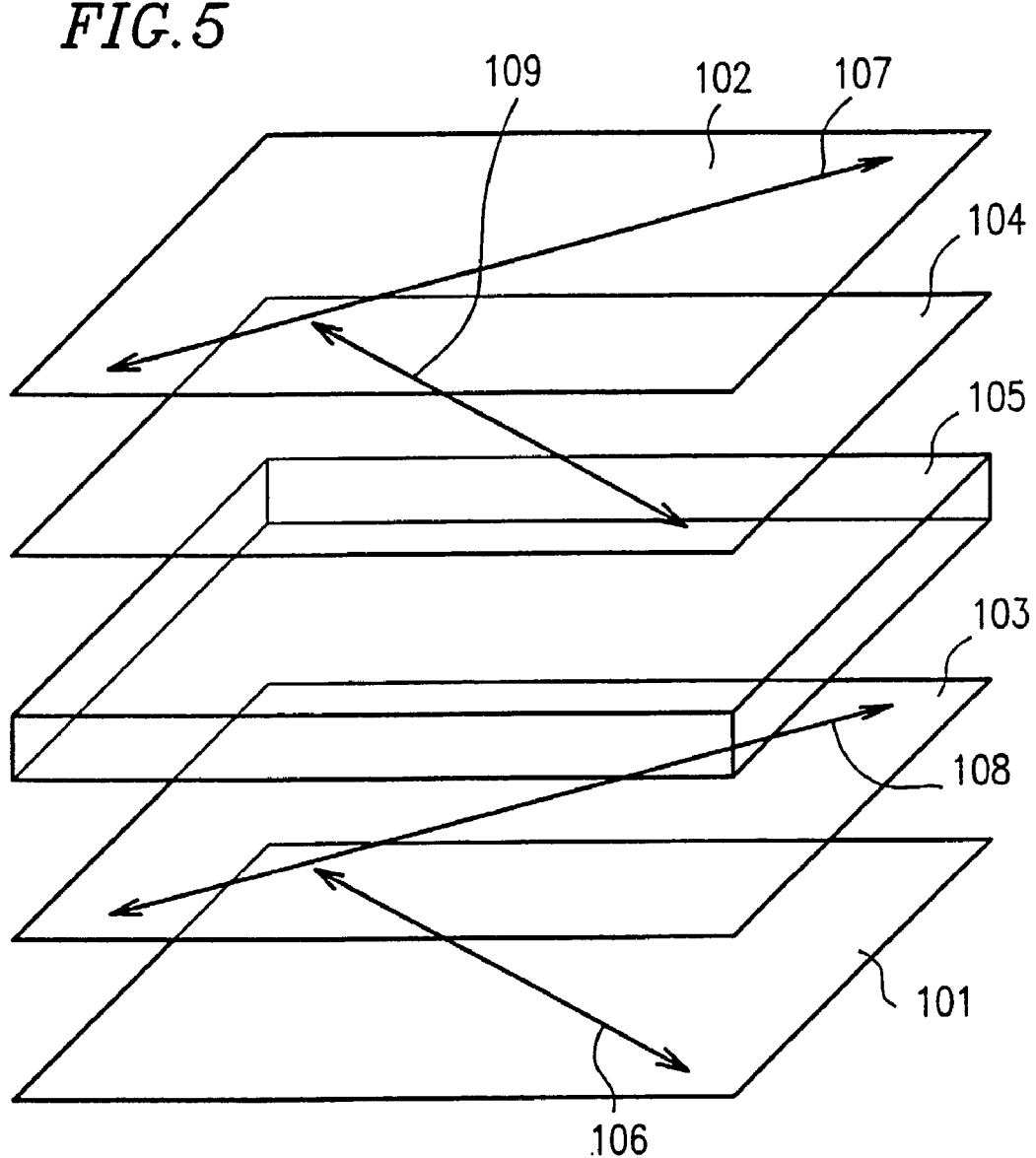
FIG. 5 is a broken perspective view illustrating an exemplary structure of a liquid crystal display device according to Examples 1 and 3 of the present invention.

A device having a structure similar to that illustrated in FIG. 5 was produced, where a liquid crystal cell 105 was replaced by a positive uniaxial phase film where $dLC \cdot (nz-nx)=350$ nm and $nx=ny$. In FIG. 5, reference numeral 101 denotes a lower polarizing plate, 102 denotes an upper polarizing plate, 103 denotes a lower phase compensation element, 104 denotes an upper phase compensation element, 106 denotes an absorption axis of the lower polarizing plate 101, and 107 denotes an absorption axis of the upper polarizing plate 102. Arrows 108 and 109 will be described later.

Figure 6A:
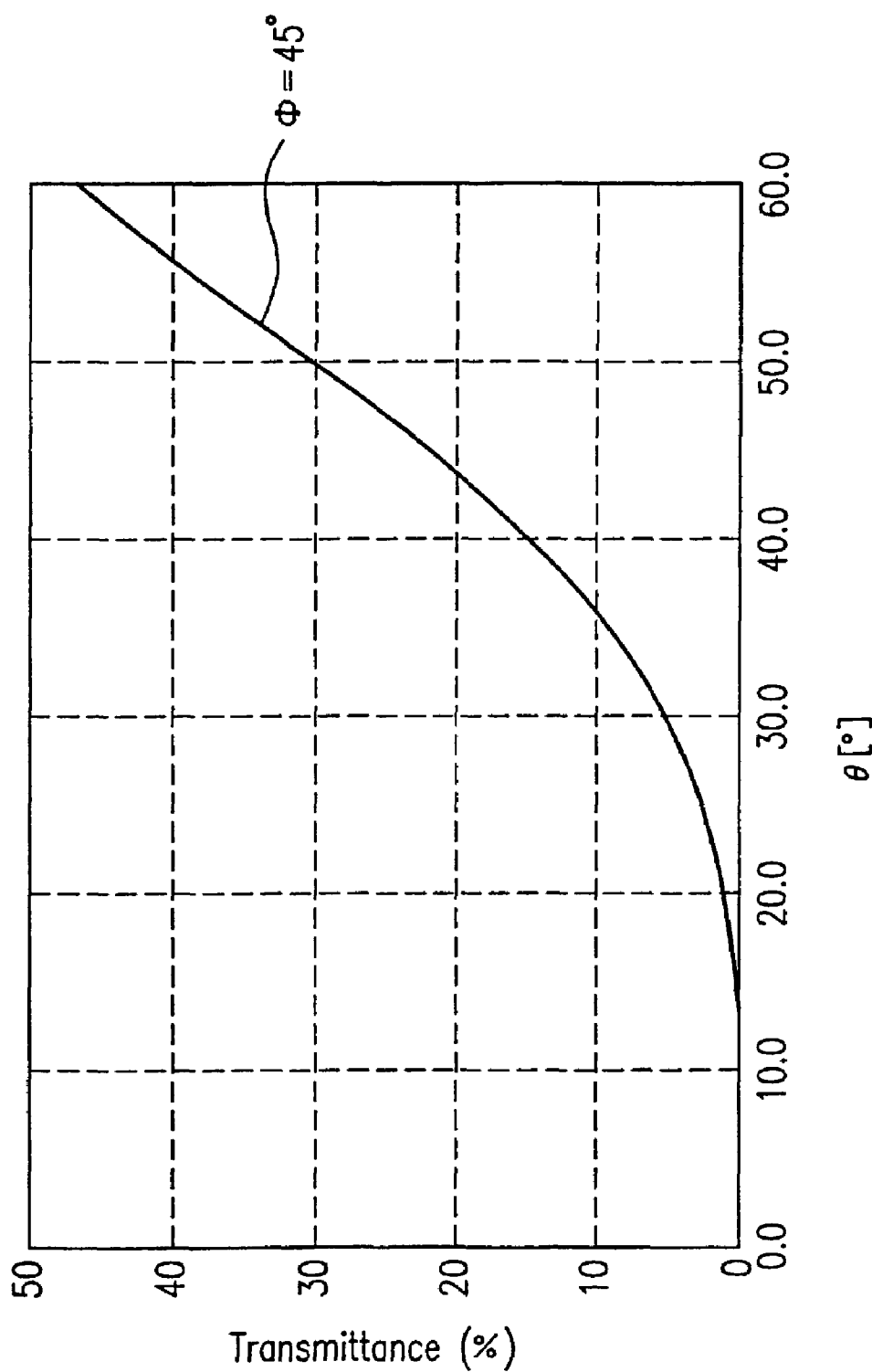
FIG. 6A is a graph illustrating light leakage occurring along with viewing angle variation in an azimuth equiangularly between respective absorption axes of upper and lower polarizing plates.

As is well known in the art, when a display device having a pair of polarizing plates provided in a crossed Nicols arrangement interposing a uniaxial phase film therebetween is viewed in a black display along a direction which extends equiangularly between the respective absorption axes of the upper and lower polarizing plates (i.e., at $\Phi=45°$) while changing the viewing angle ($\theta$), the transmittance increases, as illustrated in FIG. 6A (in the figure, 100% transmittance is defined as the transmittance of two polarizing plates attached together in a parallel Nicols arrangement in a direction normal to the display plane). Thus, light leaks from a liquid crystal cell in a black display when viewed from an inclined direction.

Figure 6B:
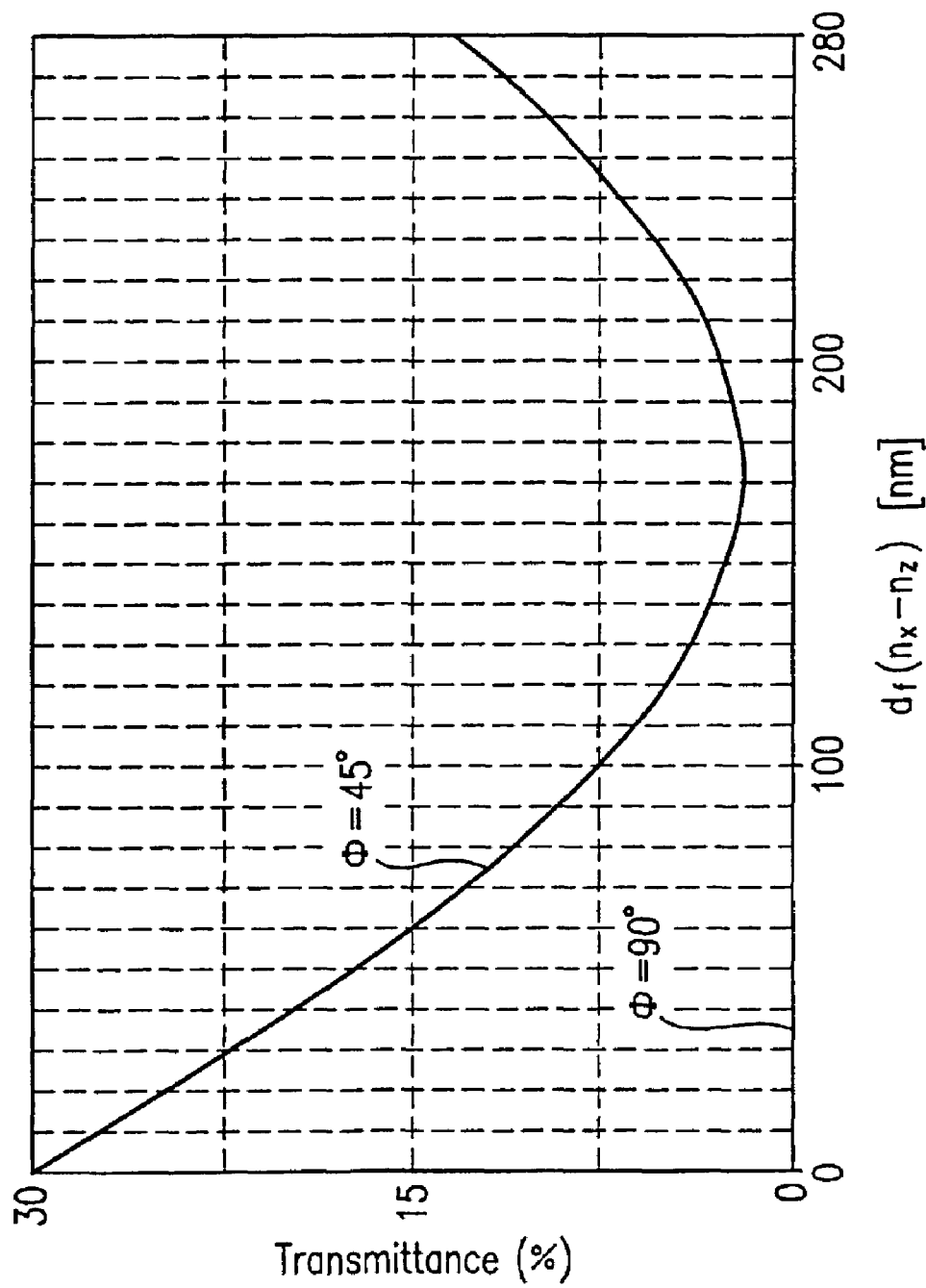
FIG. 6B is a graph illustrating an effect of reducing the light leakage occurring along with viewing angle variation in an azimuth equiangularly between respective absorption axes of upper and lower polarizing plates in accordance with a well-known technique.

Moreover, as is well known in the art, the above situation can be improved, as shown in FIG. 6B, by using a negative uniaxial phase film for each of the phase compensation elements 103 and 104 illustrated in FIG. 5. FIG. 6B illustrates the transmittance of a liquid crystal cell measured at $\Phi=45°$ (where $\Phi=0°$ along the absorption axis of the lower polarizing plate near the light source) and at $\Phi=90°$ (a direction parallel or perpendicular to the absorption axis of one of the upper or lower polarizing plates), at the viewing angle $\theta=50°$ (a direction inclined by 50° from a direction normal to the surface of the device illustrated in FIG. 5), while varying the value $df \cdot (nx-nz)$ (df denotes the thickness of the phase compensation element) of the phase compensation elements 103 and 104 ($nx=ny>nz$) from about 0 nm to about 280 nm. As shown in FIG. 6B, at $\Phi=90°$, the transmittance is about 0% irrespective of the value $df \cdot (nx-nz)$. At $\Phi=45°$, as the value $df \cdot (nx-nz)$ increases starting from 0, the transmittance decreases to the minimum value of about 2% at $df \cdot (nx-nz)=175$ nm. The above phenomenon is well known in the art.

In the present invention, the phase compensation element where $nx=ny>nz$ is replaced by a phase compensation element where $nx \neq ny$ and $(nx+ny)/2>nz$, thereby further reducing the minimum value below 2% at $\Phi=45°$.

FIG. 6C illustrates the transmittance of a liquid crystal cell measured at $\Phi=45°$ and at $\Phi=90°$, at the viewing angle $\theta=50°$, while the value $df\{(nx+ny)/2-nz\}$ of the phase compensation elements 103 and 104 ($nx \neq ny$ and $(nx+ny)/2>nz$) is kept at 175 nm and the value $df \cdot (nx-ny)$ thereof is varied from about 0 nm to about 38 nm. Reference numeral 108 of FIG. 5 denotes an axis of the lower phase compensation element along which the element exhibits its maximum refractive index, and reference numeral 109 denotes an axis of the upper phase compensation element along which the element exhibits its maximum refractive index.

As shown in FIG. 6C, at Φ=90°, the transmittance is about 0% irrespective of the value df·(nx−ny). At Φ=45°, as the value df·(nx−ny) increases starting from 0, the transmittance decreases to the minimum value of about 0.3% at df·(nx−ny)=20 nm.

Thus, with the structure of the present invention including the phase compensation element illustrated in FIG. 1, it is possible to reduce the light leakage at Φ=90° and θ=50° down to about ⅟7 of that resulting in the well-known prior art structure. This results in an improvement in the contrast of the display device when viewed from an inclined viewing angle, and thus, an improvement in the viewing characteristic of the display device. This is true because the contrast is proportional to the inverse number of the black level.

As described above, by using the technique of the present invention, i.e., using a phase compensation element such that nz<(nx+ny)/2 and nx≠ny and appropriately selecting the respective values of nx, ny and nz, it is possible to considerably suppress the amount of light leakage observed when viewed from an inclined angle particularly in a direction which extends equiangularly between the respective absorption axes of the upper and lower polarizing plates. This means improvement in the contrast ratio viewing angle characteristic along the direction which extends equiangularly between the respective absorption axes of the upper and lower polarizing plates.

Hereinafter, examples of the present invention will be described.

EXAMPLE 1

A liquid crystal display device according to Example 1 of the present invention has a structure as illustrated in FIG. 5.

The liquid crystal cell 105 illustrated in FIG. 5 is a liquid crystal cell having a wide viewing angle liquid crystal display mode which has been proposed by the inventors of the present invention (Japanese Laid-Open Publication No. 8-341590) where an Nn type liquid crystal material is in an axially symmetric vertical orientation. The structure of the liquid crystal cell 105 is as follows.

Figure 7A:
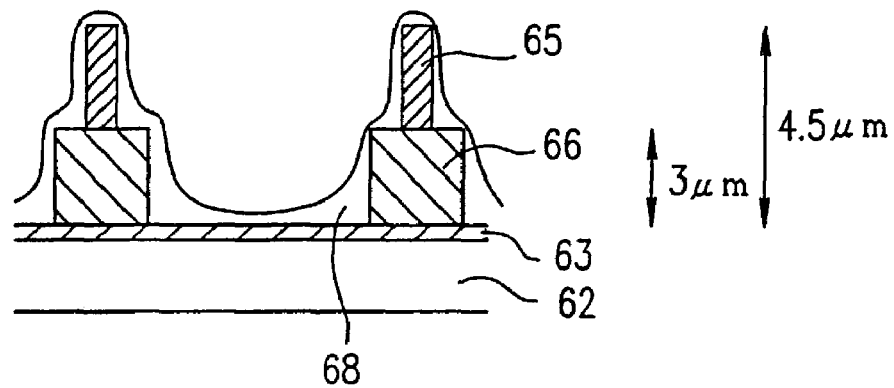
FIG. 7A is a cross-sectional view illustrating an exemplary structure of a liquid crystal cell which can be used with the present invention.
Figure 7B:
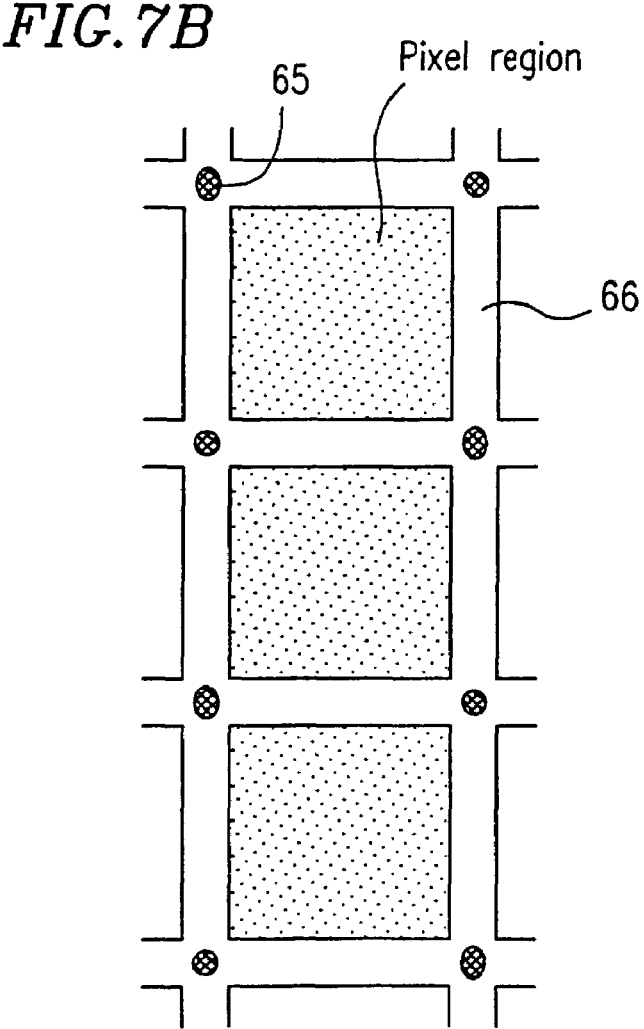
FIG. 7B is a plan view thereof.

Referring to FIGS. 7A and 7B, a spacer 65 having a height of about 4.5 μm is formed outside a pixel region using a photosensitive polyimide on a transparent electrode 63 (e.g., ITO: about 100 nm) which is formed on a substrate 62. A protrusion 66 having a height of about 3 μm is then formed using OMR83 (produced by Tokyo Ohka Kogyo Co., Ltd.). The size of a region surrounded by the protrusion 66 is about 100 μm×about 100 μm, and three such regions are formed in one pixel (about 100 μm×about 300 μm). JALS-204 (produced by Japan Synthetic Rubber Co., Ltd.) is spin-coated on the resultant structure, thereby forming a vertical alignment layer 68. Moreover, another vertical alignment layer (not shown) is formed on a transparent electrode (flat) on another substrate using the same material. The substrates are attached together, thus producing a liquid crystal cell.

An Nn type liquid crystal material (MJ95955: produced by Merck & Co., Inc., with a chiral agent added to have a left-handed 90° twist within a cell gap of about 4.5 μm) is injected into the produced liquid crystal cell, and a voltage of about 7 V is applied. In an initial state, immediately after the voltage application, there are a plurality of axially symmetric orientation axes. After a continued voltage application, each pixel region has a single axially symmetric orientation region (monodomain).

Phase plates produced by a biaxial stretching method (thickness df=about 50 μm, df·(nx−ny)=about 25 nm, df{nz−(nx+ny)/2}=about 130 nm) as the phase compensation elements 103 and 104 are placed as illustrated in FIG. 5. Moreover, the polarizing plates 101 and 102 are placed over the elements 103 and 104 in a crossed Nicols arrangement.

The liquid crystal display device of the present example was examined using an optical characteristic measurement apparatus LCD5000 (produced by Otsuka Electronics Co., Ltd.). First, the transmittance viewing angle characteristic when performing a black display at a driving voltage Voff=about 2 V was measured. Then, the transmittance viewing angle characteristic when performing a white display at a driving voltage Von=about 5 V was measured. Thereafter, the white display transmittance was divided by the black display transmittance, thereby obtaining the contrast ratio viewing angle characteristic.

FIG. 8 shows an isocontrast contour curve at a contrast ratio of about 50 based on the results obtained as described above.

COMPARATIVE EXAMPLE 1

Hereinafter, Comparative Example 1 for Example 1 of the present invention will be described.

In Comparative Example 1, a liquid crystal cell having substantially the same structure as that illustrated in FIG. 5 (Example 1) is used. In Comparative Example 1, however, a different phase plate (thickness df=about 50 μm, df·(nx−ny)=about 0 nm, df{nz−(nx+ny)/2}=about 130 nm) is used as the phase compensation element.

FIG. 9 shows an isocontrast contour curve at a contrast ratio of about 50 for the liquid crystal display device of Comparative Example 1 based on measurement results obtained in a manner similar to that of Example 1.

COMPARATIVE EXAMPLE 2

Hereinafter, Comparative Example 2 for Example 1 of the present invention will be described.

In Comparative Example 2, a liquid crystal cell having substantially the same structure as that illustrated in FIG. 5 (Example 1) is used. In Comparative Example 2, however, no phase compensation element is used.

FIG. 10 shows an isocontrast contour curve at a contrast ratio of about 50 for the liquid crystal display device of Comparative Example 2 based on measurement results obtained in a manner similar to that of Example 1.

Comparing FIGS. 8, 9 and 10 with one another, at Φ=0°, Φ=90°, Φ=180° and Φ=270°, each of the isocontrast contour curves at a contrast ratio of about 50 shows about the same value, that is, θ=about 55°. At Φ=45°, Φ=135°, Φ=225° and Φ=315°, however, the respective isocontrast contour curves show different values, that is, θ=about 23° in FIG. 8 (Comparative Example 2), θ=about 38° in FIG. 9 (Comparative Example 1) and θ=about 53° in FIG. 10 (Example 1).

In summary, all of Example 1, and Comparative Examples 1 and 2 have about the same satisfactory viewing angle characteristic at Φ=0°, Φ=90°, Φ=180° and Φ=270°. At Φ=45°, Φ=135°, Φ=225° and Φ=315°, however, the viewing angle characteristic is considerably poor in the liquid crystal display device of Comparative Example 2. The liquid crystal display device of Comparative Example 1 shows some improvement from that of Comparative Example 2. In the liquid crystal display device of Example 1, the viewing angle characteristics at Φ=45°, Φ=135°, Φ=225° and Φ=315° are improved to substantially the same level as those at Φ=0°, Φ=90°, Φ=180° and Φ=270°. Thus, Example 1 realizes a substantially completely isotropic and satisfactory viewing angle characteristic.

Although a phase film (thickness df=about 50 µm, df·(nx−ny)=about 25 nm, df{nz−(nx+ny)/2}=about 130 nm) is used for each phase compensation element in Example 1, the present invention is not limited to this. For example, a plurality of phase films may alternatively be combined to provide a phase compensation element, as long as it shows similar characteristics.

EXAMPLE 2

In Example 1, two phase films (phase compensation elements) (thickness df=about 50 µm, df·(nx−ny)=about 25 nm, df{nz−(nx+ny)/2}=about 130 nm) are provided so as to interpose a liquid crystal cell, where the phase compensation elements are arranged such that the x axis of each of the elements is perpendicular to the absorption axis of the closest polarizing plate.

In Example 2, the value df{nz−(nx+ny)/2}, the value df·(nx−ny) and the angle between the absorption axis of the polarizing plate and the x axis of the phase plate are varied independently of one another, so as to determine the range of each of the values within which the effect of the present invention can be provided. In example 2, instead of using the phase film where the values nx, ny and nz are different from one another, a phase compensation element obtained by combining a first phase film where nx=ny>nz and a second phase film where nx>ny=nz, as illustrated in FIG. 11, is used.

Figure 11:
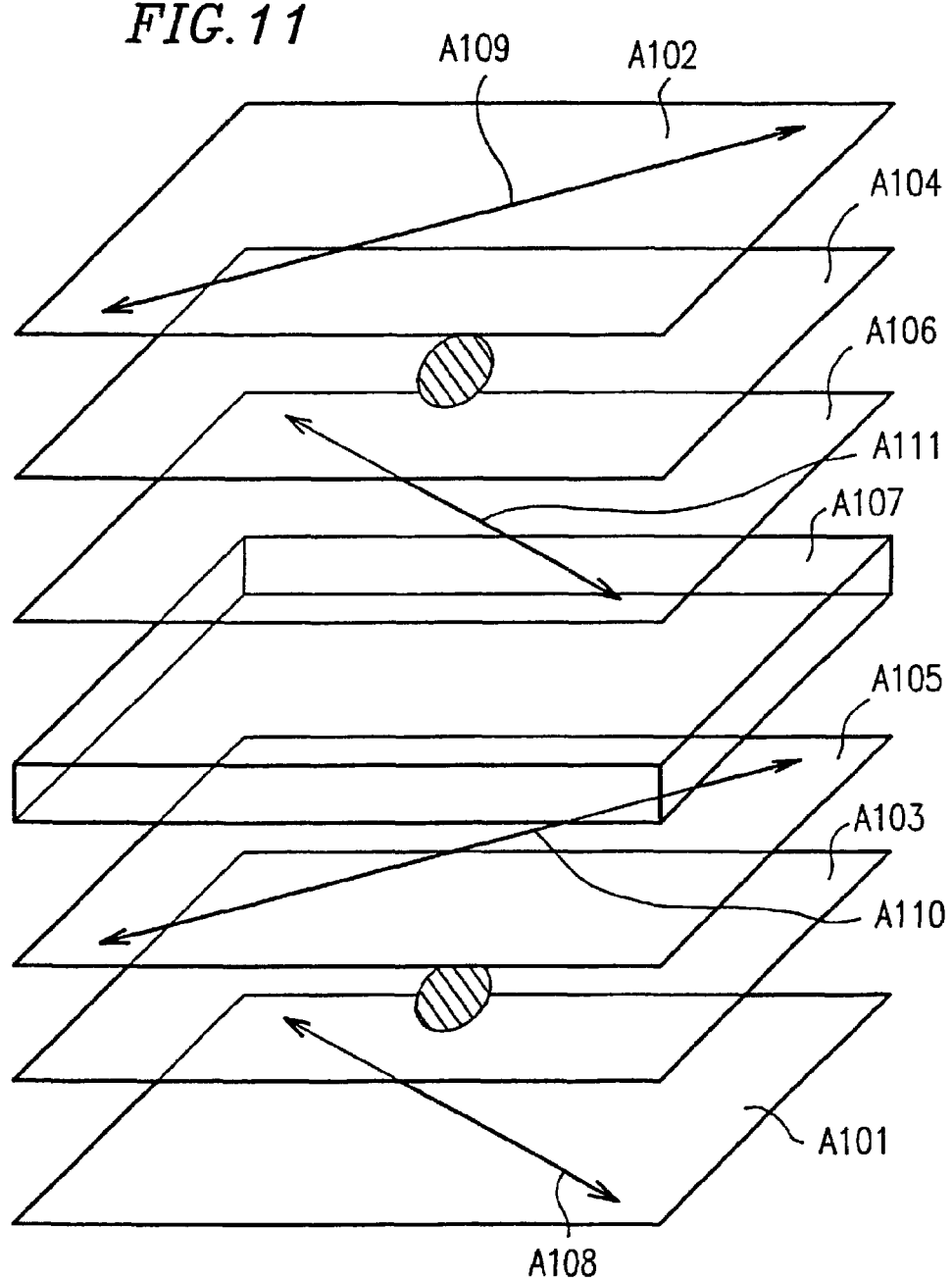
FIG. 11 is a broken perspective view illustrating an exemplary structure of a liquid crystal display device according to Examples 2 and 4 of the present invention.

In FIG. 11, A101 denotes a lower polarizing plate, A102 denotes an upper polarizing plate, A103 denotes a first lower phase film (nx=ny>nz), A104 denotes a first upper phase film (nx=ny>nz), A105 denotes a second lower phase film (nx>ny=nz), A106 denotes a second upper phase film (nx>ny=nz), A107 denotes a liquid crystal cell, A108 denotes an absorption axis of the lower polarizing plate A101, A109 denotes an absorption axis of the upper polarizing plate A102, A110 denotes an x axis of the second lower phase film A105, and A111 denotes an x axis of the second upper phase film A106.

The phase compensation element is used in this example for the following two reasons:

(a) to be able to easily and precisely determine the value ranges where the effect of the present invention can be provided; and (b) to show that the effect of the present invention can be provided with a phase compensation element obtained by combining a plurality of phase films.

[Variation in df{nz−(nx+ny)/2}]

Figure 23A:
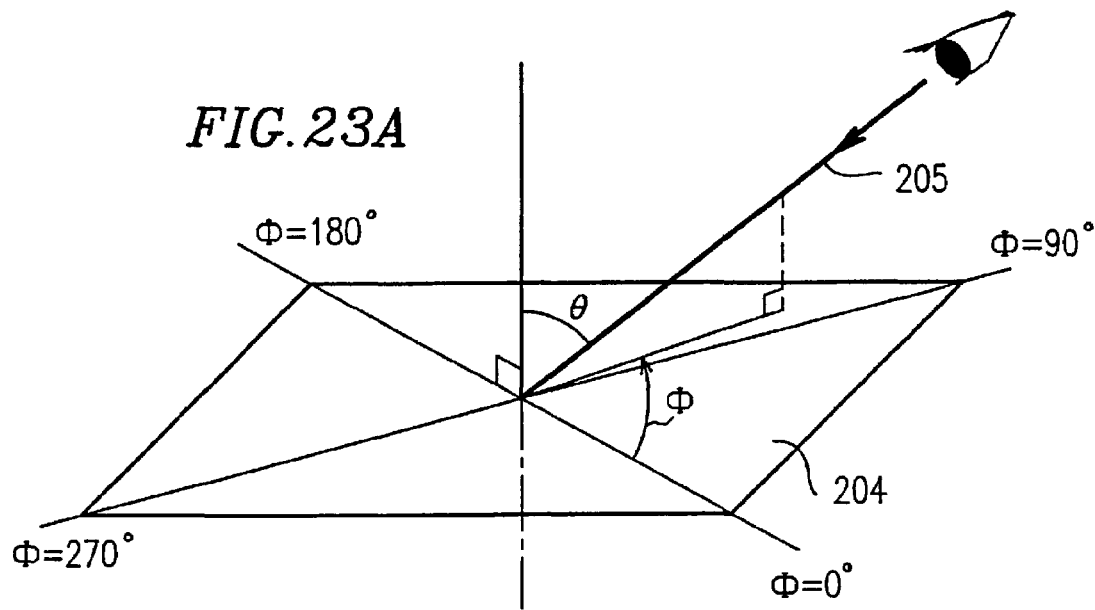
FIGS. 23A and 23B are perspective views illustrating how a viewing angle is defined in the present invention.

Using the same measurement system as that in Example 1, the contrast characteristic of a liquid crystal cell having an arrangement as that shown in FIG. 11 (without the second phase films A105 and A106) as viewed from an inclined direction was measured while varying the value df·(nx−nz) of the first phase film (nx=ny>nz, thickness df) from about 20 nm to about 400 nm. Herein, referring to FIG. 23A, the inclined direction refers to a direction defined at θ=50° and Φ=0°, Φ=45°, Φ=90°, Φ=135°, Φ=180°, Φ=225°, Φ=270° and Φ=315°.

Figure 12:
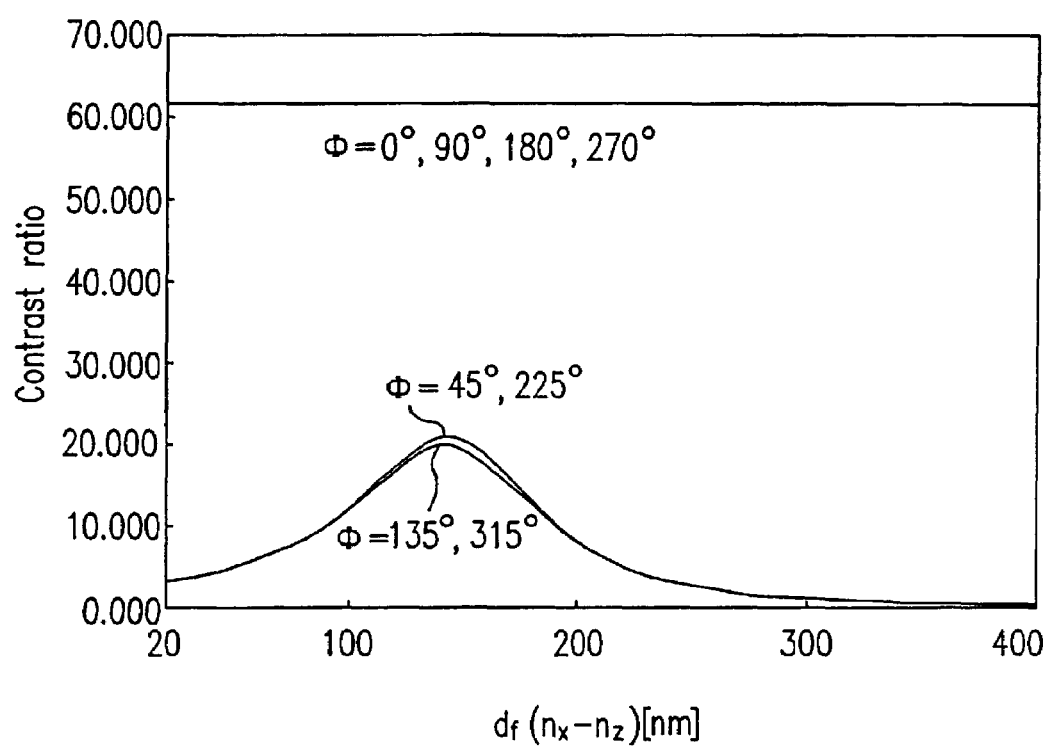
FIG. 12 is a graph illustrating the df·(nx−nz) dependency of the contrast ratio in accordance with Example 2 of the present invention.

FIG. 12 shows the measurement results. FIG. 12 illustrates a substantially constant and satisfactory contrast value at Φ=0°, Φ=90°, Φ=180° and Φ=270° irrespective of the value df·(nx−nz). At Φ=45°, Φ=135°, Φ=225° and Φ=315°, on the other hand, the maximum contrast value was measured at df·(nx−nz)=about 140 nm. As shown in FIG. 12, an improved contrast can be provided in a range of about 20 nm<df·(nx−nz)<about 250 nm, and more preferably, in a range of about 90 nm<df·(nx−nz)<about 190 nm.

As is well known in the art, the retardation value {df·(nx−nz)} of a phase compensation element should be discussed as a relative value with respect to the value dLC·Δn (a product of the cell thickness dLC and Δn=ne−no of the liquid crystal material used) of the compensated liquid crystal cell. The liquid crystal material used in Example 2 (MJ95955: produced by Merck & Co., Inc., ) has a value Δn of about 0.077 and a cell thickness of about 4.5 µm. Accordingly, the value dLC·Δn of the liquid crystal cell is about 347 nm. Therefore, the effect of the present invention can be provided when the retardation value {df·(nx−nz)} of the phase compensation element is in the range of about 0% to about 72% of the dLC·Δn value of the liquid crystal cell. More preferably, df·(nx−nz) is in the range of about 25% to about 55%, and most preferably, about 40% of dLC·Δn.

In Example 2, the phase compensation element is provided on both sides of the liquid crystal cell. To recalculate the determined values for a liquid crystal cell in which the phase compensation element is provided only on one side of the liquid crystal, the above values may generally be doubled. Thus, in such a case where the phase compensation element is provided only on one side, the effect of the present invention can be provided when the retardation value {df·(nx−nz)} is in the range of about 0% to about 144% of the dLC·Δn value of the liquid crystal cell. More preferably, df·(nx−nz) is in the range of about 50% to about 110%, and most preferably, about 80% of dLC·Δn.

While each phase compensation element is formed of two phase films in Example 2, it may alternatively be formed of three or more phase films or of a material other than a film, e.g., a liquid crystal cell, or a liquid crystal polymer film.

[Variation in df·(nx−ny)]

Figure 23B:
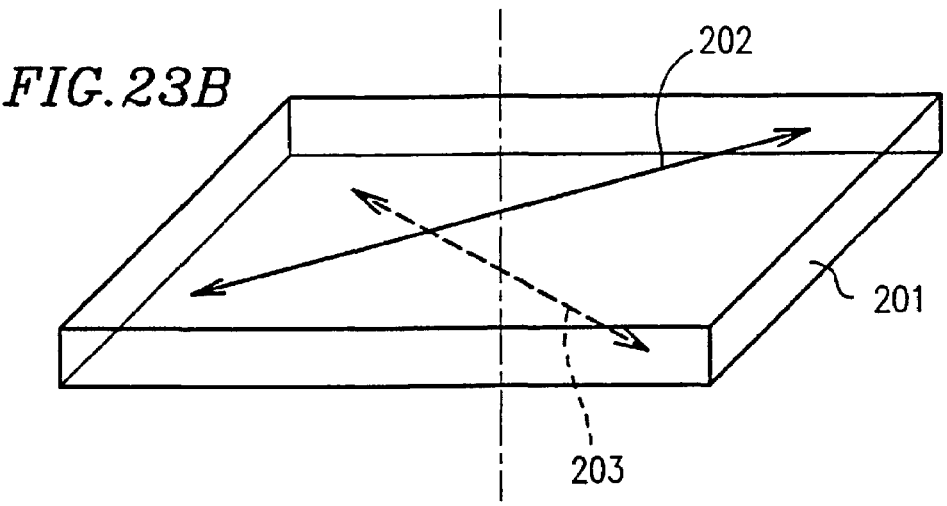
Figure 24:
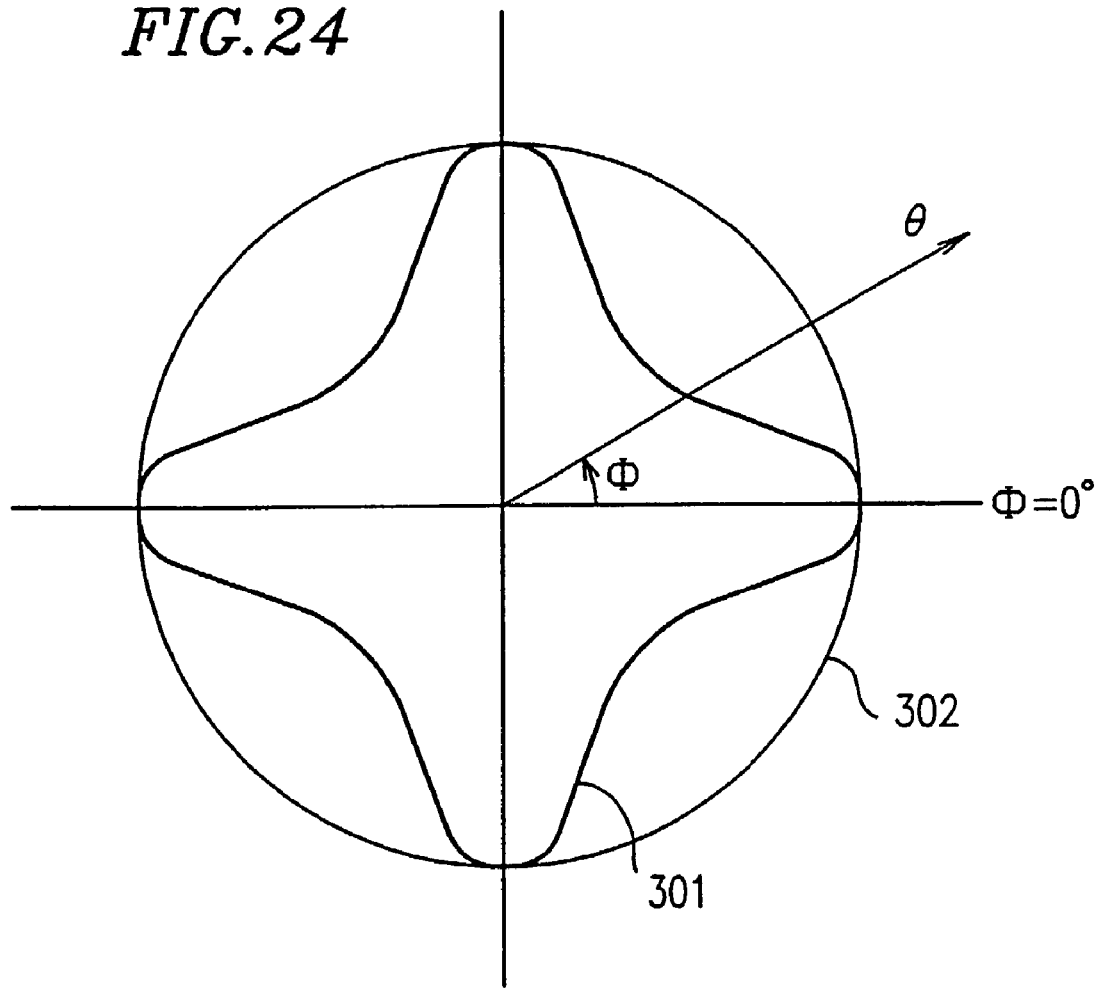
FIG. 24 is a graph illustrating a representative viewing angle characteristic (an isocontrast contour curve) of a conventional division-orientation wide viewing angle display mode and an improvement thereto provided by the present invention.

Using the same measurement system as that in Example 1, the contrast characteristic of a liquid crystal cell having an arrangement as that shown in FIG. 11 as viewed from an inclined direction was measured while varying the value df·(nx−ny) of the second phase film from about 0 nm to about 50 nm. A phase film where df·(nx−nz)=about 140 nm was used as the first phase film. Herein, referring to FIG. 23, the inclined direction refers to a direction defined at θ=50° and Φ=0°, Φ=45°, Φ=90°, Φ=135°, Φ=180°, Φ=225°, Φ=270° and Φ=315°.

Figure 13:
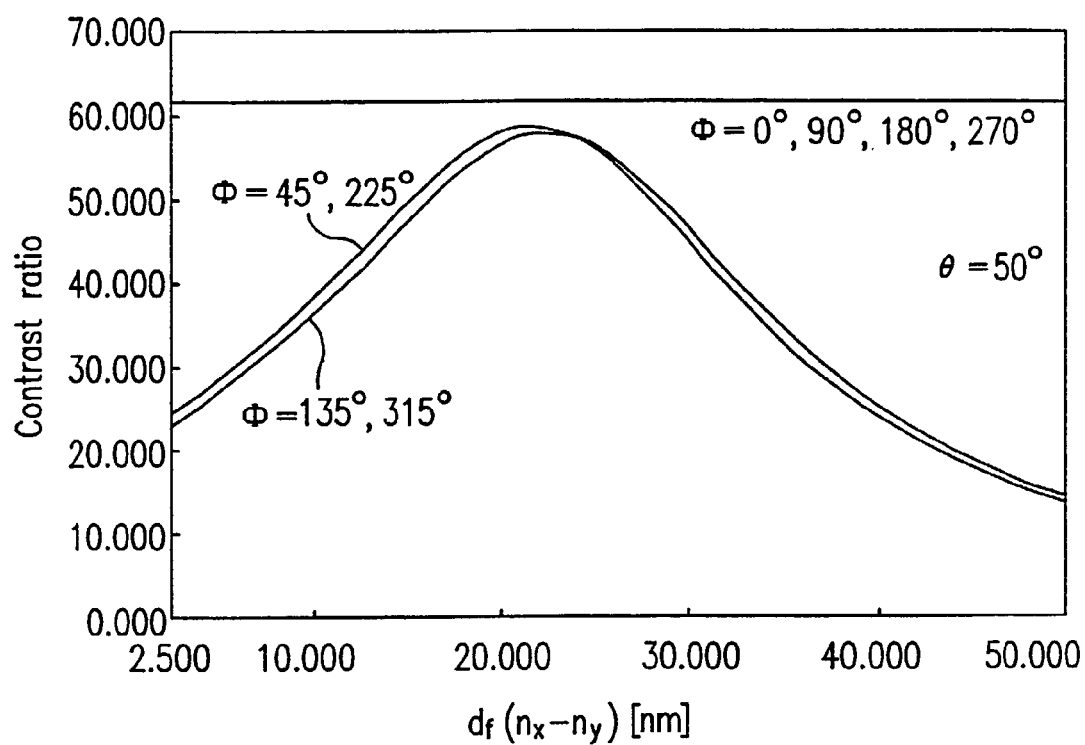
FIG. 13 is a graph illustrating the df·(nx−ny) dependency of the contrast ratio in accordance with Example 2 of the present invention.

FIG. 13 shows the measurement results. FIG. 13 illustrates a substantially constant and satisfactory contrast value at Φ=0°, Φ=90°, Φ=180° and Φ=270° irrespective of the value df·(nx−ny). At Φ=45°, Φ=135°, Φ=225° and Φ=315°, on the other hand, the maximum contrast value was measured at df·(nx−ny)=about 22.5 nm. As shown in FIG. 13, an improved contrast can be provided in a range of about 2.5 nm<df·(nx−ny)<about 45 nm, and more preferably, in a range of about 10 nm<df·(nx−ny)<about 35 nm.

Again, the retardation value {df·(nx−ny)} of a phase compensation element is discussed as a relative value with respect to the value dLC·Δn (dLC·Δn=about 347 nm in the present example) of the compensated liquid crystal cell.

The effect of the present invention can be provided when the retardation value {df·(nx−ny)} of the phase compensation element is in the range of about 0% to about 13% of the dLC·Δn value of the liquid crystal cell. More preferably, df·(nx−ny) is in the range of about 2% to about 10%, and most preferably, about 6.5% of dLC·Δn.

[Angle Between the x Axes of Upper and Lower Phase Compensation Elements (Wherein the x Axis=Axis Along Which the Element Exhibits its Maximum Refractive Index)]

In the present invention, the x axes of the phase compensation elements provided respectively on the upper and lower sides of the liquid crystal cell are perpendicular to each other, so as to avoid deterioration of the contrast of the display device when viewed from a direction normal to the display plane. As can be easily assumed, when the x axes are not perpendicular to each other, the phase compensation elements as a whole will have an in-plane phase difference, thereby resulting in an unsatisfactory black display and a lower contrast.

[Position of the Phase Compensation Elements, Change in the Angle Between the x Axes and the Absorption Axis of the Polarizing Plate]

In Example 1 above, the x axis (x axis=the axis along which the element exhibits its maximum refractive index) of each of the phase compensation elements provided on the upper and lower sides of the liquid crystal cell, respectively, is perpendicular to the absorption axis of the closest polarizing plate. In Example 2, the relationship between the effect of the present invention and the shift of the x axis away from the absorption axis of the closest polarizing plate was examined.

Figure 14:
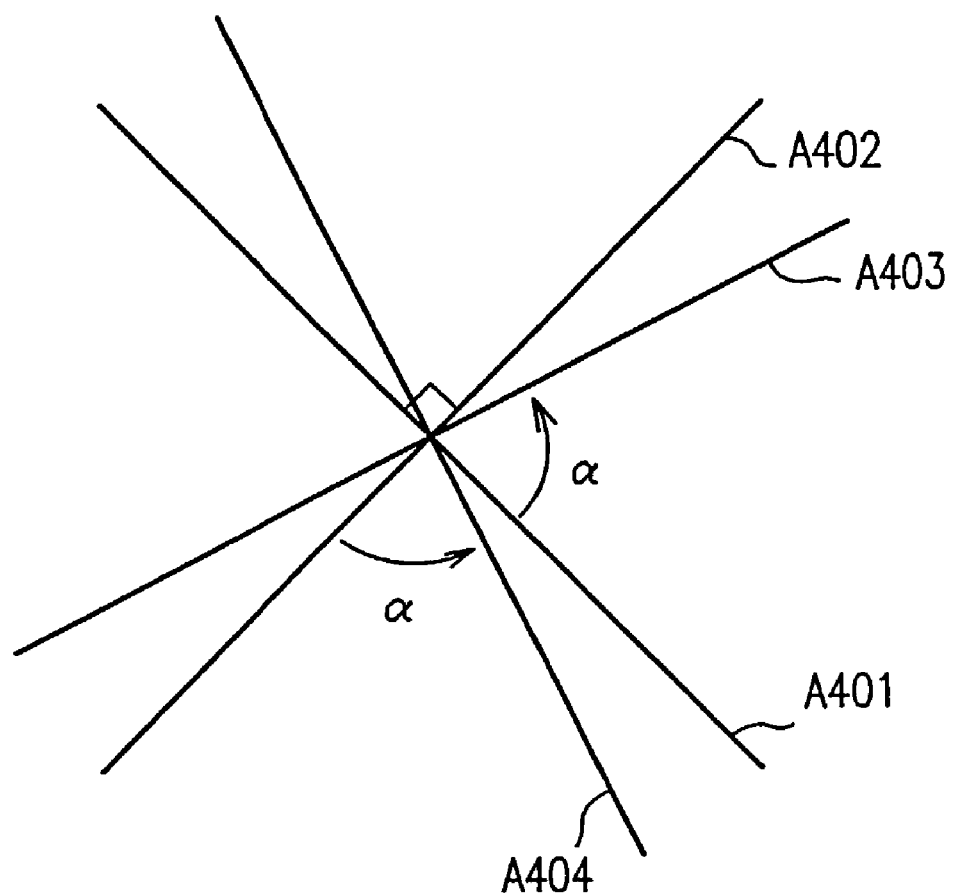
FIG. 14 is a diagram illustrating the angle α which defines the relationship between the x axis of the phase compensation element and the absorption axis of the polarizing plate.

Phase films (first phase films A103 and A104) such that df·(nz−nx)=about 140 nm and ny=nx and other phase films (second phase films A105 and A106) such that df·(nz−ny)=about 22.5 nm and nz=ny were placed as shown in FIG. 11. Using the same measurement system as that in Example 1, the contrast characteristic of such a liquid crystal cell as viewed from an inclined direction was measured, while maintaining the perpendicular relationship between the x axes (an axis parallel to the maximum refractive index in the plane) of the upper and lower second phase films, and varying (in clockwise rotation) the angle α (see FIG. 14) between the x axis of the second phase film and the absorption axis of the closest polarizing plate in the range of $0° \leq \alpha < 180°$. Herein, referring to FIGS. 23A and 23B, the inclined direction refers to a direction defined at θ=50° and Φ=0°, Φ=45°, Φ=90°, Φ=135°, Φ=180°, Φ=225°, Φ=270° and Φ=315°.

Figure 15:
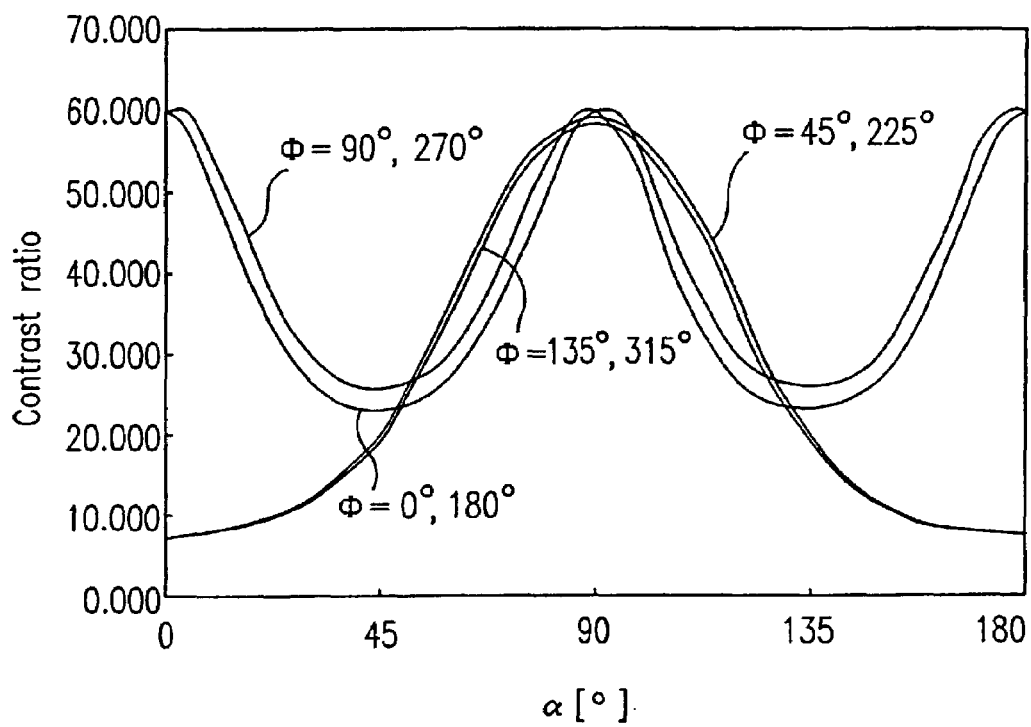
FIG. 15 is a graph illustrating the α dependent characteristic of the contrast ratio in accordance with Example 2 of the present invention.

FIG. 15 shows the measurement results. As shown in FIG. 15, at Φ=0°, =90°, Φ=180° and Φ=270°, the contrast ratio takes its maximum value at three angles, that is, °=0°, α=90° and α=180°. At Φ=45°, Φ=135°, Φ=225° and Φ=315°, on the other hand, the contrast ratio takes its maximum value at one angle, α=90°, where the x axis of the phase compensation element is perpendicular to the absorption axis of the closest polarizing plate.

Therefore, the effect of the present invention is most effectively provided at α=90°, where the axis nx of the phase compensation element along which the element exhibits its maximum refractive index in the plane is perpendicular to the absorption axis of the polarizing plate which is closest to the phase compensation element. As shown in FIG. 15, the effect of the present invention can still be provided in the range of about 45°<α<about 135° (i.e., when the angle α is shifted from the most preferable angle by up to about 45° clockwise or counterclockwise), and more preferably, in the range of about 67°<α<about 113° (i.e., when the angle α is shifted from the most preferable angle by up to about 23° clockwise or counterclockwise).

Although the liquid crystal display mode as illustrated in FIGS. 7A and 7B is used in Examples 1 and 2, the present invention is not limited thereto. Any other liquid crystal display mode can be used as long as the liquid crystal cell meets the requirements that the refractive index anisotropy value of the liquid crystal layer along a plane parallel to a surface of the liquid crystal cell is smaller in a black display than in a white display.

EXAMPLE 3

In Examples 1 and 2 above, the phase compensation technique of the present invention is applied to a representative liquid crystal mode where a vertically-oriented Nn type liquid crystal material is divided into regions and oriented differently in different regions. In Examples 3 and 4, the phase difference compensation technique of the present invention is applied to a representative liquid crystal mode where a horizontally-oriented Np type liquid crystal material is divided into regions and oriented differently in different regions.

A liquid crystal display device of Example 3 has substantially the same structure as that illustrated in FIG. 5.

The liquid crystal cell illustrated in FIG. 5 can be used in the wide viewing angle liquid crystal display mode proposed by the inventors of the present invention where an Np type liquid crystal material is in an axially symmetric horizontal orientation. An exemplary method for producing such a liquid crystal cell will be described below. It is understood that the method which can be used in the present invention is not limited to the following method.

Referring again to FIGS. 7A and 7B, a spacer 65 having a height of about 4.5 μm is formed outside a pixel region using a photosensitive polyimide on a transparent electrode 63 (ITO: about 100 nm) which is formed on a substrate 62. A protrusion 66 having a height of about 3 μm is then formed using OMR83 (produced by Tokyo Ohka Kogyo Co., Ltd.). The size of a region surrounded by the protrusion 66, i.e., the area of the pixel region, is about 100 μm×about 100 μm. In the present example, the vertical alignment layer 68 is not provided.

The substrate is attached to another substrate which has a transparent electrode and is flat, thus producing a liquid crystal cell.

A mixture of: 0.1 g of R-684 (produced by Nippon Kayaku Co., Ltd.) as a photocurable resin; 0.1 g of p-phenylstyrene as a photopolymerization inhibitor; 3.74 g of MS90847 (produced by Merck & Co., Inc., with 0.4 wt % of S881 added) as a liquid crystal material; and 0.025 g of Irgacure651 as a photoinitiator is injected into the produced liquid crystal cell.

Then, the liquid crystal cell is heated over the clearing point of the liquid crystal material to about 110° C., and the temperature is maintained for about 1 hour. Thereafter, the liquid crystal cell is gradually cooled to the room temperature at a rate of about 0.1° C./min. When a transparent phase and a non-transparent phase of about the same size are observed in a pixel during the gradual cooling process, the gradual cooling is stopped. A rectangular wave of about 2.5 Vrms is intermittently applied through the liquid crystal cell while the temperature of the cell is appropriately adjusted, thereby obtaining a satisfactory axially symmetric orientation, after which the applied voltage is stopped and the cooling process is resumed. Finally, the liquid crystal cell is irradiated with UV radiation so as to cure the photocurable resin R-684 to fix the axially symmetric orientation, thus producing the liquid crystal cell.

Phase plates produced by a biaxial stretching method (thickness df=about 50 μm, df·(nx−ny)=about 25 nm, df{nz−(nx+ny)/2}=about 130 nm) as the phase compensation elements 103 and 104 are placed as illustrated in FIG. 5. Moreover, the polarizing plates 101 and 102 are placed over the elements 103 and 104, thus producing a liquid crystal display device.

The liquid crystal display device of the present example was examined using an optical characteristic measurement apparatus LCD5000 (produced by Otsuka Electronics Co., Ltd.). First, the transmittance viewing angle characteristic when performing a black display at a driving voltage Von=about 7.3 V was measured. Then, the transmittance viewing angle characteristic when performing a white display at a driving voltage Voff=about 2.3 V was measured. Thereafter, the white display transmittance was divided by the black display transmittance, thereby obtaining the contrast ratio viewing angle characteristic.

Figure 16:
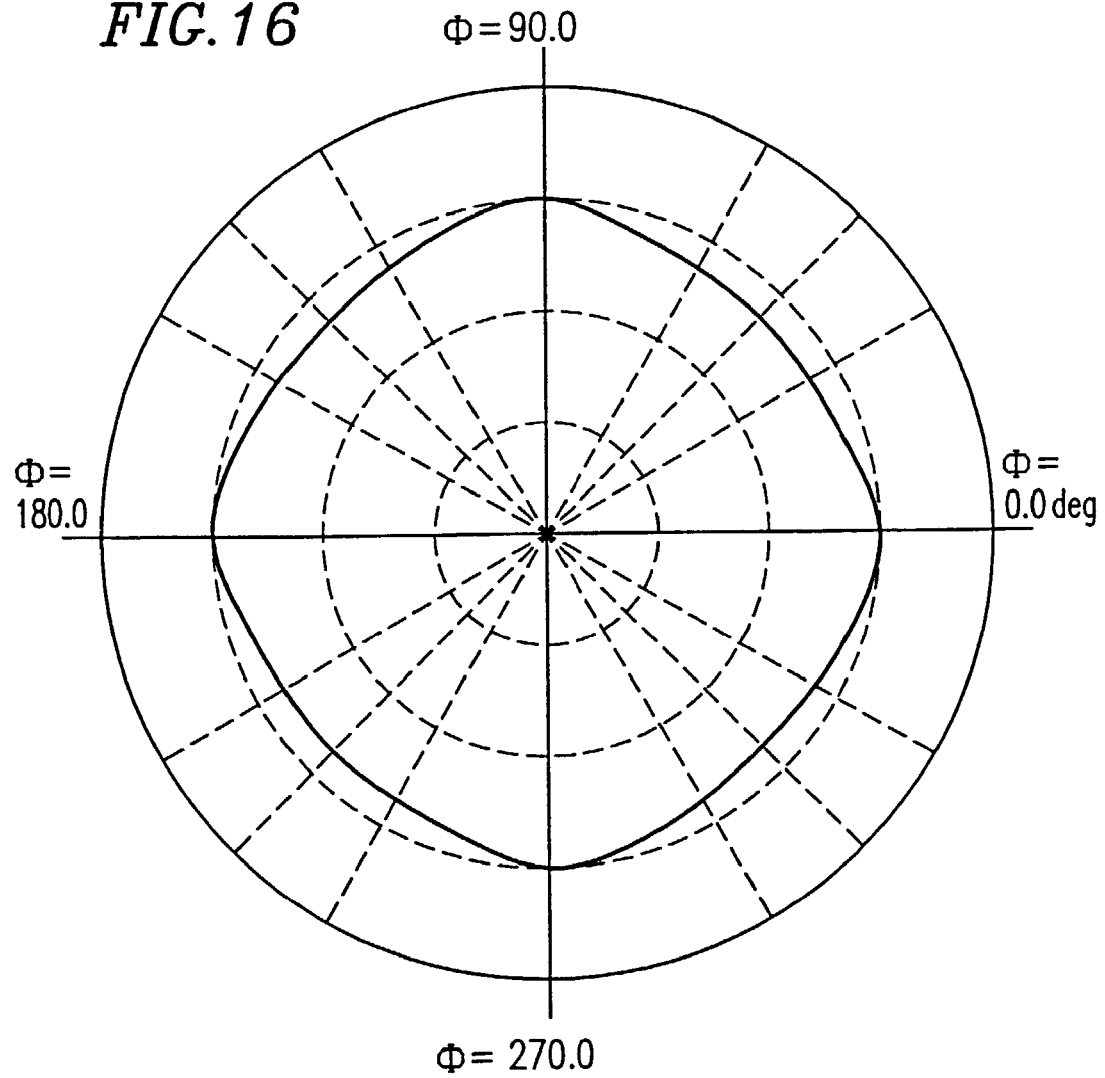
FIG. 16 is a graph illustrating the viewing angle characteristic in accordance with Example 3 of the present invention.

FIG. 16 shows an isocontrast contour curve at a contrast ratio of about 5 based on the results obtained as described above.

COMPARATIVE EXAMPLE 3

Hereinafter, Comparative Example 3 for Example 3 of the present invention will be described.

In Comparative Example 3, a liquid crystal cell having substantially the same structure as that illustrated in FIG. 5 (Example 3) is used. In Comparative Example 3, however, a different phase plate (thickness df=about 50 μm, df·(nx−ny)=about 0 nm, df{nz−(nx+ny)/2}=about 130 nm) is used as the phase compensation element.

Figure 17:
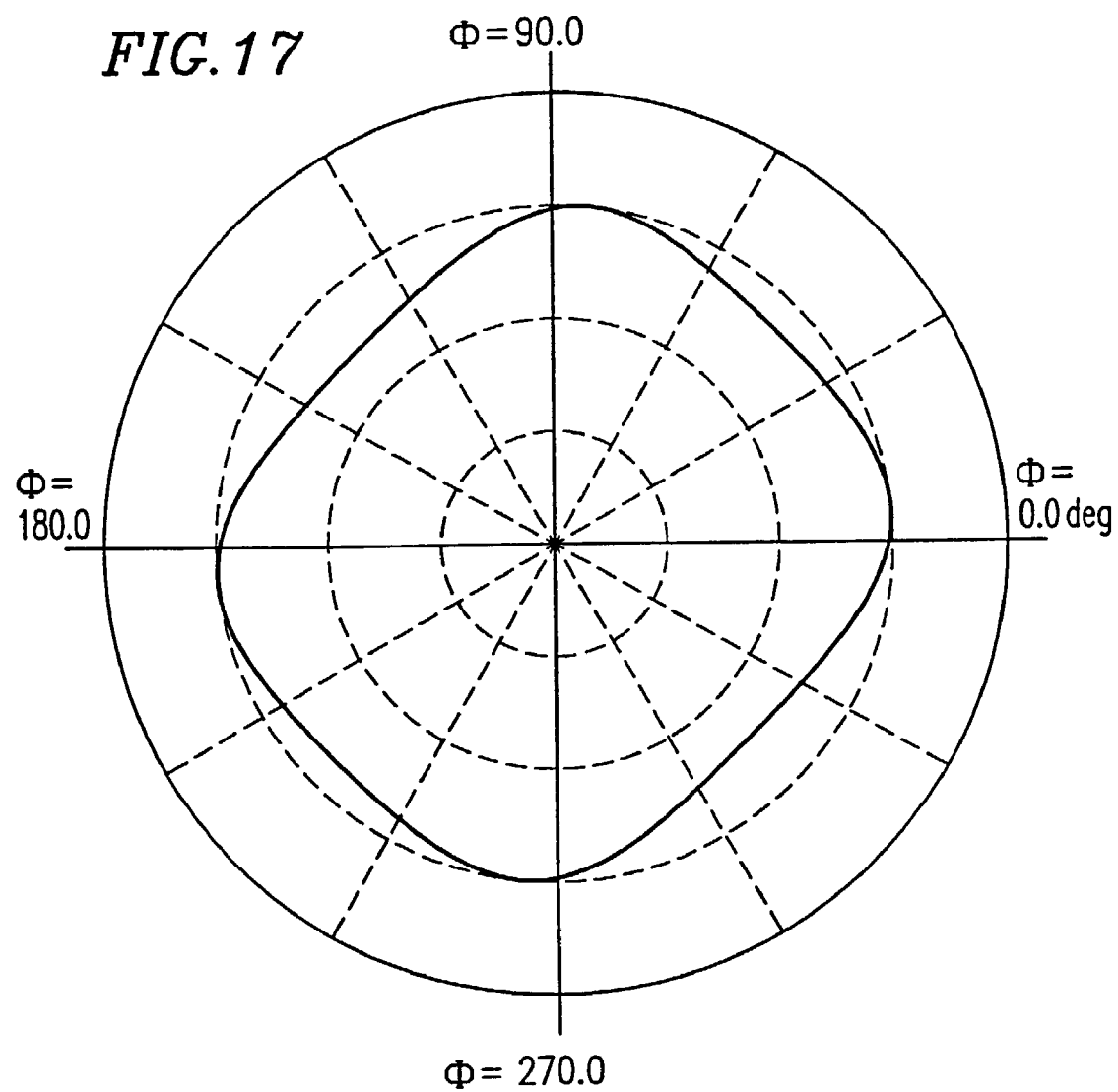
FIG. 17 is a graph illustrating the viewing angle characteristic in accordance with Comparative Example 3.

FIG. 17 shows an isocontrast contour curve at a contrast ratio of about 5 for the liquid crystal display device of Comparative Example 3 based on measurement results obtained in a manner similar to that of Example 3.

COMPARATIVE EXAMPLE 4

Hereinafter, Comparative Example 4 for Example 3 of the present invention will be described.

In Comparative Example 4, a liquid crystal cell having substantially the same structure as that illustrated in FIG. 5 (Example 3) is used. In Comparative Example 4, however, no phase compensation element is used.

Figure 18:
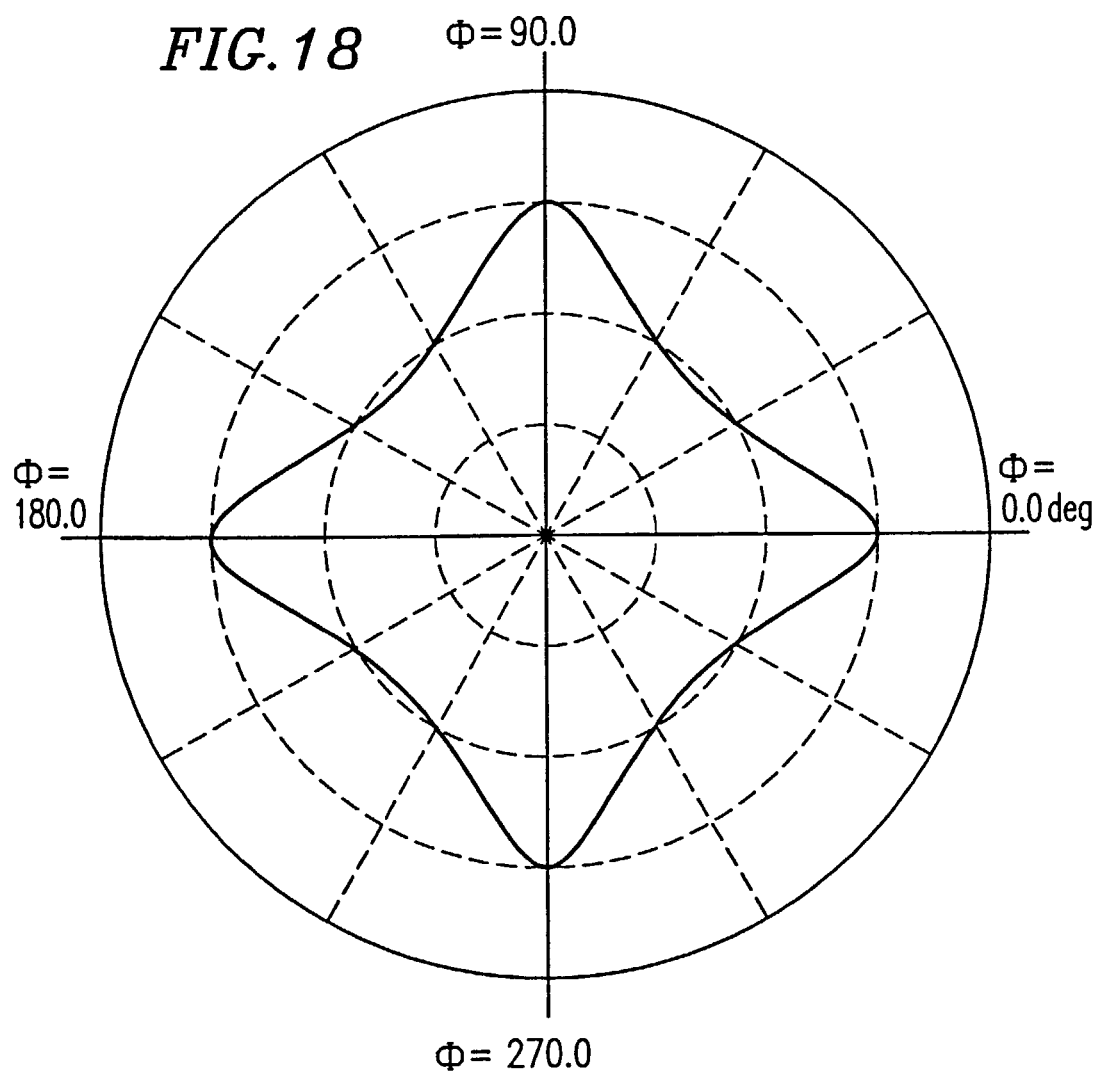
FIG. 18 is a graph illustrating the viewing angle characteristic in accordance with Comparative Example 4.

FIG. 18 shows an isocontrast contour curve at a contrast ratio of about 5 for the liquid crystal display device of Comparative Example 4 based on measurement results obtained in a manner similar to that of Example 3.

Comparing FIGS. 16, 17 and 18 with one another, at Φ=0°, Φ=90°, Φ=180° and Φ=270°, each of the isocontrast contour curves at a contrast ratio of about 5 shows about the same value, that is, θ=about 60°. At Φ=135° and Φ=315°, however, the respective isocontrast contour curves show different values, that is, θ=about 38° in FIG. 18 (Comparative Example 4), θ=about 48° in FIG. 17 (Comparative Example 3) and θ=about 55° in FIG. 16 (Example 3).

In summary, all of Example 3, and Comparative Examples 3 and 4 have about the same satisfactory viewing angle characteristic at Φ=0°, Φ=90°, Φ=180° and Φ=270°. At Φ=135° and Φ=315°, however, the viewing angle characteristic is poor in the liquid crystal display device of Comparative Example 4. The liquid crystal display device of Comparative Example 3 shows some improvement from that of Comparative Example 4. In the liquid crystal display device of Example 3, the viewing angle characteristics at Φ=135° and Φ=315° are improved to substantially the same level as those at Φ=0°, Φ=90°, Φ=180° and Φ=270°. Thus, Example 3 realizes a substantially complete isotropic and satisfactory viewing angle characteristic.

While each phase compensation element is formed of two phase films in Example 3, it may alternatively be formed of three or more phase films or of a material other than a film, e.g., a liquid crystal cell, or a liquid crystal polymer film.

EXAMPLE 4

In Example 3, two phase films (phase compensation elements) (thickness df=about 50 μm, df·(nx−ny)=about 25 nm, df{nz−(nx+ny)/2}=about 130 nm) interpose a liquid crystal cell, where the phase compensation elements are arranged such that the x axis of each of the elements is perpendicular to the absorption axis of the closest polarizing plate.

In Example 4, the value df{nz−(nx+ny)/2}, the value df·(nx−ny) and the angle between the absorption axis of the polarizing plate and the x axis of the phase plate are varied independently of one another, so as to determine the range of each of the values within which the effect of the present invention can be provided. In example 4, instead of using the phase film where the values nx, ny and nz are different from one another, a phase compensation element obtained by combining a first phase film where nx=ny>nz and a second phase film where nx>ny=nz, as illustrated in FIG. 11, is used. The arrangement of the phase compensation element is substantially the same as that of Example 2.

The phase compensation element is used in this example for the following two reasons:

(a) to be able to easily and precisely determine the value ranges where the effect of the present invention can be provided; and (b) to show that the effect of the present invention can be provided with a phase compensation element obtained by combining a plurality of phase films.

[Variation in df{nz−(nx+ny)/2}]

Using the same measurement system as that in Example 1, the contrast characteristic of a liquid crystal cell having an arrangement as that shown in FIG. 11 as viewed from an inclined direction was measured while varying the value df·(nx−nz) of the first phase film (nx=ny>nz, thickness df) from about 20 nm to about 400 nm. Herein, referring to FIGS. 23A and 23B, the inclined direction refers to a direction defined at θ=50° and Φ=0°, Φ=45°, Φ=90°, Φ=135°, Φ=180°, Φ=225°, Φ=270° and Φ=315°.

Figure 19:
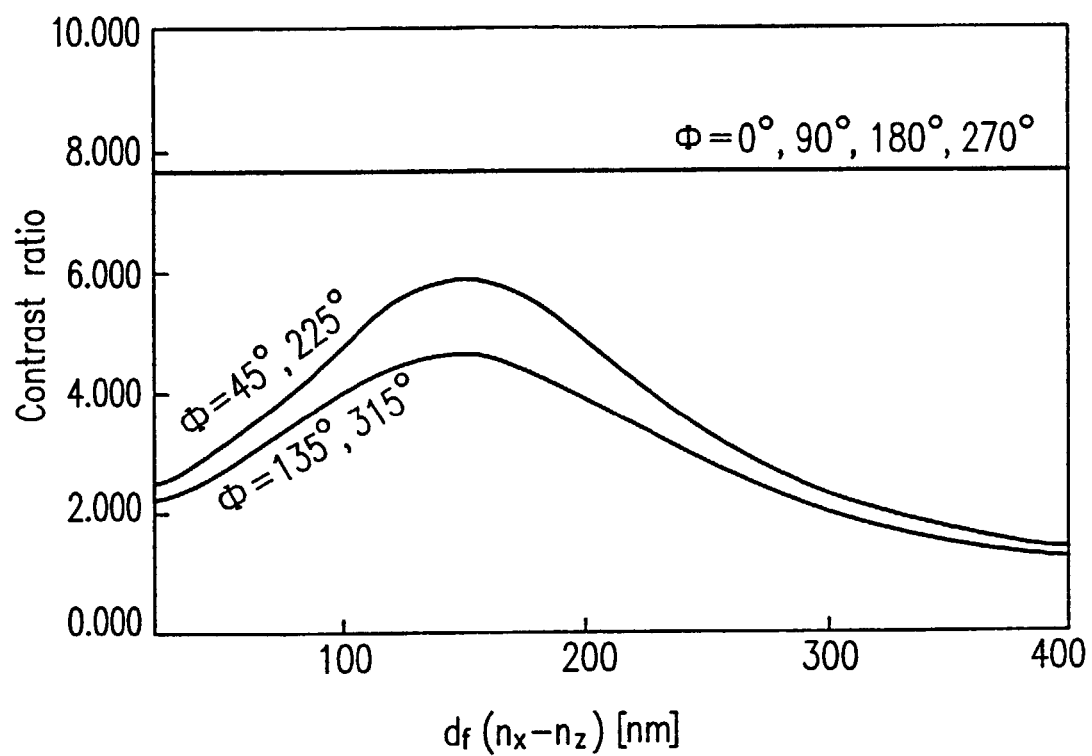
FIG. 19 is a graph illustrating the df·(nx−nz) dependency of the contrast ratio in accordance with Example 4 of the present invention.

FIG. 19 shows the measurement results. FIG. 19 illustrates a substantially constant and satisfactory contrast value at Φ=0°, Φ=90°, Φ=180° and Φ=270° irrespective of the value df·(nx−nz). At Φ=45°, Φ=135°, Φ=225° and Φ=315°, on the other hand, the maximum contrast value was measured at df·(nx−nz)=about 150 nm. As shown in FIG. 19, an improved contrast can be provided in a range of about 20 nm<df·(nx−nz)<about 300 nm, and more preferably, in a range of about 70 nm<df·(nx−nz)<about 230 nm.

As is well known in the art, the retardation value {df·(nx−nz)} of a phase compensation element should be discussed as a relative value with respect to the value dLC·Δn (a product of the cell thickness dLC and Δn=ne−no of the liquid crystal material used) of the compensated liquid crystal cell. The liquid crystal material used in Example 4 (MS90847: produced by Merck & Co., Inc., ) has a value Δn of about 0.096 and a cell thickness of about 4.5 μm. Accordingly, the value dLC·Δn of the liquid crystal cell is about 432 nm. Therefore, the effect of the present invention can be provided when the retardation value {df·(nx−nz)} of the phase compensation element is in the range of about 5% to about 69% of the dLC·Δn value of the liquid crystal cell. More preferably, df·(nx−nz) is in the range of about 16% to about 54%, and most preferably, about 35% of dLC·Δn.

In Example 4, the phase compensation element is provided on both sides of the liquid crystal cell. To recalculate the determined values for a liquid crystal cell in which the phase compensation element is provided only on one side of the liquid crystal, the above values may generally be doubled. Thus, in such a case where the phase compensation element is provided only on one side, the effect of the present invention can be provided when the retardation value {df·(nx−nz)} is in the range of about 10% to about 138% of the dLC·Δn value of the liquid crystal cell. More preferably, df·(nx−nz) is in the range of about 32% to about 108%, and most preferably, about 70% of dLC·Δn.

[Variation in df·(nx−ny)]

Using the same measurement system as that in Example 1, the contrast characteristic of a liquid crystal cell having an arrangement as shown in FIG. 11 as viewed from an inclined direction was measured while varying the value df·(nx−ny) of the second phase film from about 3 nm to about 50 nm. Herein, referring to FIG. 23, the inclined direction refers to a direction defined at θ=50° and Φ=0°, Φ=45°, Φ=90°, Φ=135°, Φ=180°, Φ=225°, Φ=270° and Φ=315°.

Figure 20:
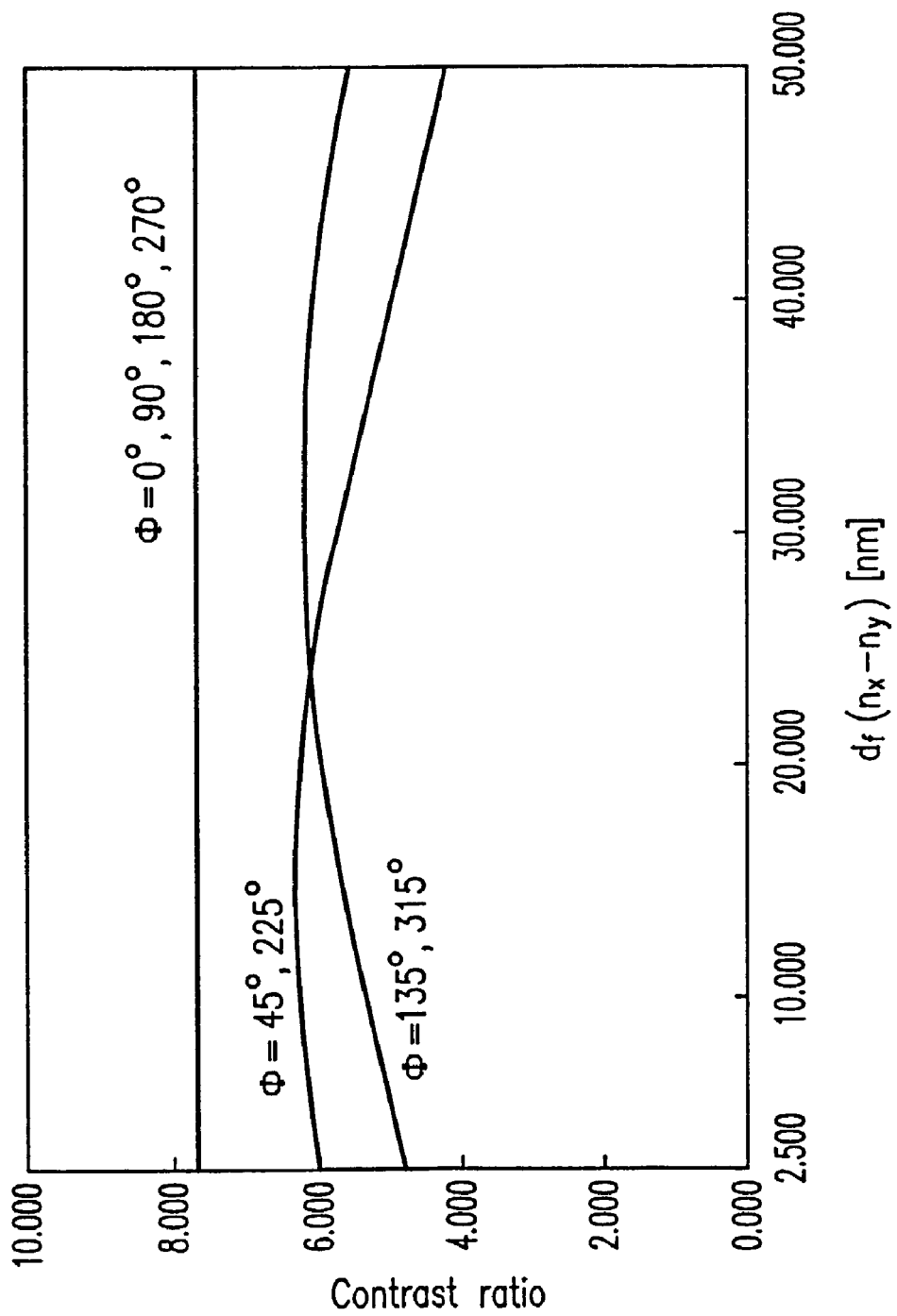
FIG. 20 is a graph illustrating the df·(nx−ny) dependency of the contrast ratio in accordance with Example 4 of the present invention.

FIG. 20 shows the measurement results. FIG. 20 shows a substantially constant and satisfactory contrast value at Φ=0°, Φ=90°, Φ=180° and Φ=270° irrespective of the value df·(nx−ny). At Φ=45°, Φ=135°, Φ=225° and Φ=315°, on the other hand, there is a significant difference in the value df·(nx−ny) which gives the maximum contrast between the line of Φ=45°, Φ=225° and the line of Φ=135°, Φ=315°. However, both lines have a mild contrast curve for the variation in the value df·(nx−ny), and the effect of an improved contrast is still provided sufficiently at a point where the two contrast lines meet each other, i.e., when the viewing angle characteristic becomes more concentric (this is also an effect of the present invention). At this point, where df·(nx−ny) takes a value of about 24 nm, the effect of the present invention is most effectively provided. As shown in FIG. 20, an improved contrast can be provided in a range of about 3 nm<df·(nx−ny)<about 48 nm, and more preferably, in a range of about 12 nm<df·(nx−ny)<about 36 nm.

Again, the retardation value {df·(nx−ny)} of a phase compensation element is discussed as a relative value with respect to the value dLC·Δn (dLC·Δn=about 432 nm in the present example) of the compensated liquid crystal cell.

The effect of the present invention can be provided when the retardation value {df·(nx−ny)} of the phase compensation element is in the range of about 0% to about 12% of the dLC·Δn value of the liquid crystal cell. More preferably, df·(nx−ny) is in the range of about 2% to about 9%, and most preferably, about 5.5% of dLC·Δn.

[Angle Between the x Axes of the Upper and Lower Phase Compensation Elements (x Axis=the Axis Along Which Element Exhibits its Maximum Refractive Index)]

According to the present invention, the x axes of the phase compensation elements provided above and below the liquid crystal cell are substantially perpendicular to each other in order to avoid a decrease in the contrast when the liquid crystal display device is seen from the front side. When the x axes of the two phase compensation elements are not perpendicular to each other, in-plane phase difference occurs. Accordingly, satisfactory black display is not obtained. Thus, it is easily expected that the contrast is lowered.

[Position of the Phase Compensation Elements, Change in the Angle Between the x Axes and the Absorption Axis of the Polarizing Plate]

In Example 3 above, the x axis (x axis=the axis along which the element exhibits its maximum refractive index) of each of the phase compensation elements provided on the upper and lower sides of the liquid crystal cell, respectively, is perpendicular to the absorption axis of the closest polarizing plate. In Example 4, the relationship between the effect of the present invention and the shift of the x axis from the absorption axis of the closest polarizing plate was examined.

A phase film such that df·(nz−nx)=about 150 nm and ny=nx and another phase film such that df·(nz−ny)=about 24 nm and nz=ny were placed as shown in FIG. 11. Using the same measurement system as that in Example 1, the contrast characteristic of such a liquid crystal cell as viewed from an inclined direction was measured, while maintaining the perpendicular relationship between the x axes (an axis parallel to the maximum refractive index in the plane) of the upper and lower second phase films, and varying (in clockwise rotation) the angle α (see FIG. 14) between the x axis of the second phase film and the absorption axis of the closest polarizing plate in the range of 0°≦α<180°. Herein, referring to FIGS. 23A and 23B, the inclined direction refers to a direction defined at θ=50° and Φ=0°, Φ=45°, Φ=90°, Φ=135°, Φ=180°, Φ=225°, Φ=270° and Φ=315°.

Figure 21:
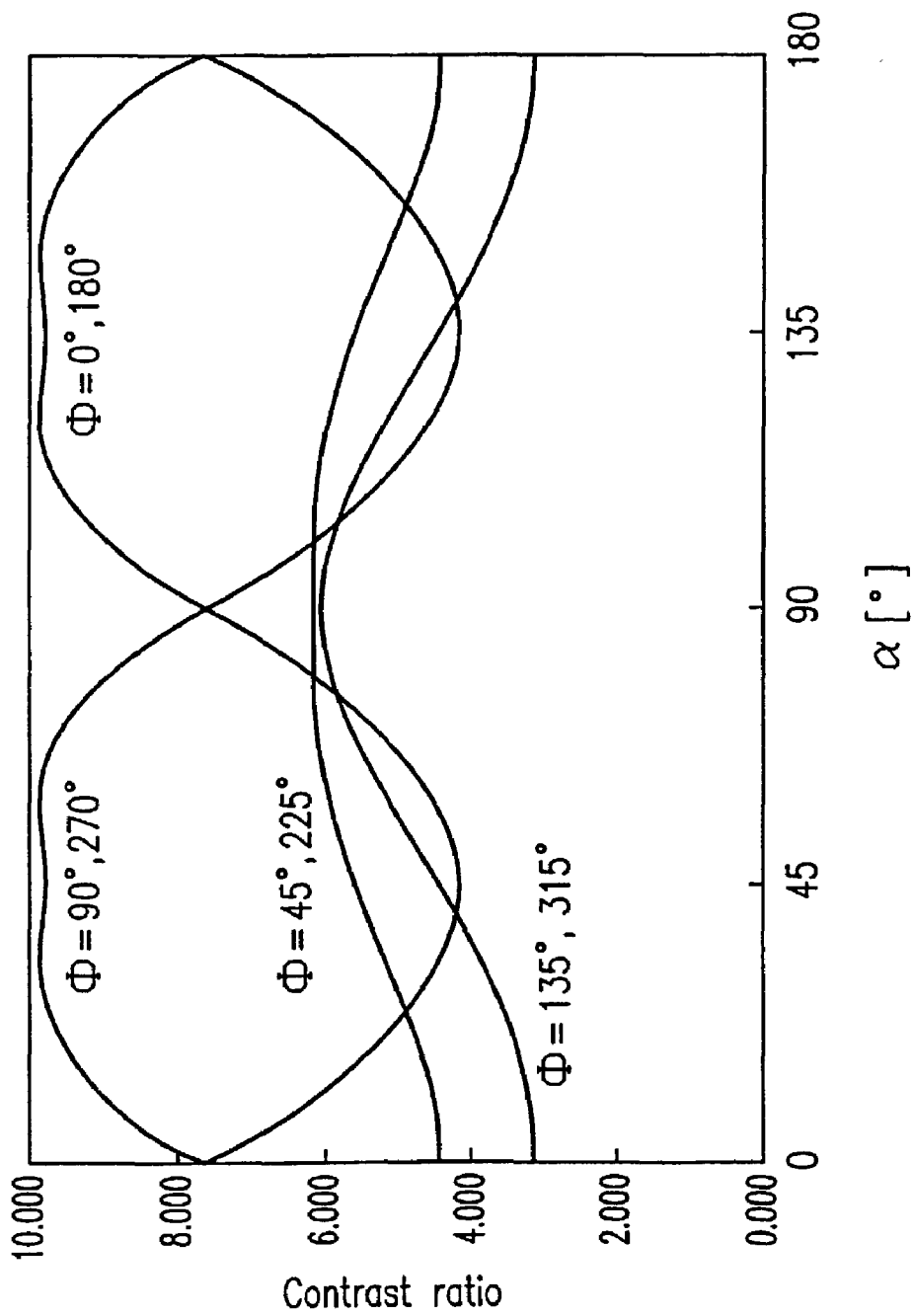
FIG. 21 is a graph illustrating the α dependent characteristic of the contrast ratio in accordance with Example 4 of the present invention.

FIG. 21 shows the measurement results. As shown in FIG. 21, while there is no such angle α at which the maximum contrast is obtained for all azimuths Φ, the viewing angle characteristic can be symmetrically improved at α=about 90°, where the x axis of the phase compensation element is perpendicular to the absorption axis of the closest polarizing plate.

Therefore, the effect of the present invention is most effectively provided at α=90°, where the axis nx of the phase compensation element along which the element exhibits its maximum refractive index in the plane is perpendicular to the absorption axis of the polarizing plate which is closest to the phase compensation element. As shown in FIG. 21, the effect of the present invention can still be provided in the range of about 45°<α<about 135° (i.e., when the angle α is shifted from the most preferable angle by up to about 45° clockwise or counterclockwise), and more preferably, in the range of about 67°<α<about 113° (i.e., when the angle α is shifted from the most preferable angle by up to about 23° clockwise or counterclockwise).

Although the liquid crystal display mode as illustrated in FIGS. 7A and 7B (where the orientation changes generally continuously, i.e., a pixel is divided into regions having continuously different orientations) is used in Examples 1 to 4 above, the present invention is not limited thereto.

Such a liquid crystal display mode, where the orientation changes generally continuously, is used because by improving the viewing angle characteristic at a direction shifted by 45° from the absorption axis of the polarizing plate in accordance with the present invention, an isotropic viewing angle characteristic can be realized.

Figures 22A, 22B:
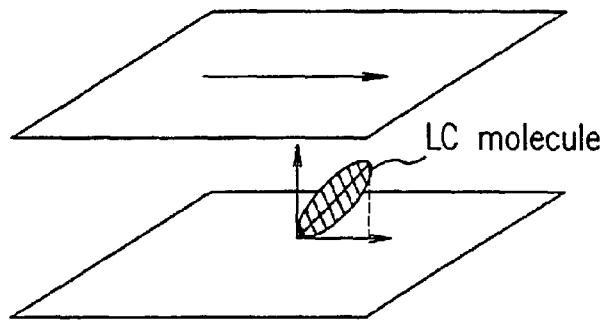
FIG. 22A illustrates various structures of a liquid crystal cell which can be used with the present invention.
FIG. 22B is a diagram illustrating how the orientation of a liquid crystal molecule in a liquid crystal cell is defined.

FIG. 22A illustrates exemplary director distributions within a pixel when viewed from a direction normal to the display plane for differently divided orientations (i.e., two division orientation, four division orientation, and continuous division orientation). In the figure, (a-1) shows a white display in the two division orientation, (a-2) shows a black display in the two division orientation, (b-1) shows a white display in the four division orientation, (b-2) shows a black display in the four division orientation, (c-1) shows a white display in the continuous division orientation, and (c-2)

shows a black display in the continuous division orientation. A broken line in FIG. 22A shows a domain boundary, and an arrow in FIG. 22A shows a director representing the rising direction of liquid crystal molecules in an intermediate layer of the liquid crystal cell (see FIG. 22B).

As can be seen from FIGS. 22A and 22B, it is characteristic of the continuous division orientation (where the pixel is divided into continuous regions of continuously different orientations) to have no such boundary line. Other than those shown in FIG. 22A, a no division orientation, a three division orientation, a five division orientation, a six division orientation, a seven division orientation, and so forth, are possible, and any of various twist angles may be appropriate.

As can be seen from the director distributions in a black display, i.e., (a-2), (b-2) and (c-2), the director is invariable in a black display (strictly speaking, the profile differs in the cell thickness direction). Thus, the present invention can be equally effective irrespective of the display mode (division mode). The characteristics realized in Examples 3 and 4 (using a Np type liquid crystal material in a horizontal orientation) are superior than those realized in Examples 1 and 2 (using a Nn type liquid crystal material in a vertical orientation) due to the difference in the profile along the cell thickness direction.

The difference in profile will be described more specifically.

When an Nn type liquid crystal material is used, the liquid crystal molecules are oriented with a principal axis thereof perpendicular to the surface of the substrate in black display at any position in the direction of cell thickness (any of positions in the vicinity of the upper and lower substrates or at the center in the cell thickness). In contrast, when an Np type liquid crystal material is used, the liquid crystal molecules in the vicinity of the center in the cell thickness are oriented with a principal axis thereof perpendicular to the surface of the substrate in black display, but the principal axis of the liquid crystal molecules gradually changes until becoming substantially parallel to the upper and lower substrate in the vicinity thereof. The above-described difference in profile refers to the difference in the orientations. Due to the orientation difference, the Nn type liquid crystal molecules are oriented as represented by the refractive index ellipsoid shown in FIG. 2 more easily than the Np type liquid crystal molecules. Accordingly, the liquid crystal display devices described in Examples 1 and 2 have a superior viewing angle characteristic than that of the liquid crystal display devices described in Examples 3 and 4.

Since one essential feature of the present invention is to efficiently suppress the light leakage in a black display, it may be easily understood that the effect of the present invention does not depend upon the display mode (division mode). Thus, any liquid crystal cell of any display mode can be used for the purpose of the present invention as long as the refractive index anisotropy value in the plane generally parallel to the liquid crystal cell surface is smaller in a black display than in a white display.

While the driving method of the liquid crystal display device is not described in the above-described examples of the present invention, it should be understood that any driving methods, including the passive matrix driving method, the active matrix driving method using thin film transistors, and the plasma addressing driving method using plasma discharge, can be used with the present invention.

As described above, in accordance with the present invention, it is possible to prevent the viewing angle characteristic from deteriorating as the viewing direction shifts away from the absorption axis, and provide a liquid crystal display device having a generally axially symmetric viewing angle characteristic. Moreover, it is therefore possible to considerably widen the viewing angle in such a manner that the viewing angle characteristic is generally isotropic over the entire azimuth range.

Embodiment 2

Hereinafter, Embodiment 2 of the present invention will be described. In Embodiment 2, the present invention is applied to an Nn type liquid crystal display device.

In accordance with Embodiment 2 of the present invention, a liquid crystal display device where the liquid crystal molecules are oriented in a vertical orientation in the absence of an applied voltage and in an axially symmetric or concentric orientation in each pixel region in the presence of an applied voltage includes a phase plate having a negative birefringence and such that nx>ny>nz (nx and ny are the principal refractive indices along an in-plane direction, and nz is the principal refractive index along the thickness direction) provided between at least one of a pair of polarizing plates placed in a crossed Nicols arrangement and a substrate which is the closest to the polarizing plate. Thus, it is possible to compensate for the viewing angle dependency resulting from an inherent characteristic of the polarizing plate and the viewing angle dependency of the retardation value of the liquid crystal layer. It is therefore possible to provide a circular isocontrast contour curve without depending upon the viewing angle. Moreover, the liquid crystal layer is switched between the vertical orientation and the axially symmetric orientation by way of voltage application, thereby providing an excellent viewing angle characteristic. Furthermore, the present embodiment can realize a high contrast display, since the present embodiment uses a liquid crystal material having a negative dielectric anisotropy and performs a normally black mode display where the liquid crystal material takes a vertical orientation in the absence of an applied voltage.

The phase plate may be provided only between one of the pair of phase plates and the closest substrate, or may by provided between each phase plate and the closest substrate.

The phase plate may be a biaxial film having retardations along the in-plane direction and along the thickness direction, respectively, a layered film of two biaxial films, or a layered film of two uniaxial films respectively having retardations in the in-plane direction and in the thickness direction.

By placing the phase plate so that the direction of the principal refractive index nx is substantially perpendicular to the absorption axis of the polarizing plate adjacent to the phase plate, the phase plate sufficiently provides the effect of compensating for the viewing angle dependency.

When the slower axis of the phase plate is shifted from the direction perpendicular to the absorption axis of the polarizing plate by an angle greater than about 1°, the polarizing characteristic obtained when the polarizing plates are in the crossed Nicols arrangement deteriorates, thereby causing light leakage, so that a sufficient black level or a sufficient contrast is not realized. Therefore, it is desirable that the angular shift between the slower axis the phase plate and a direction perpendicular to the absorption axis of the polarizing plate is equal to or less than about 1°.

Figure 59:
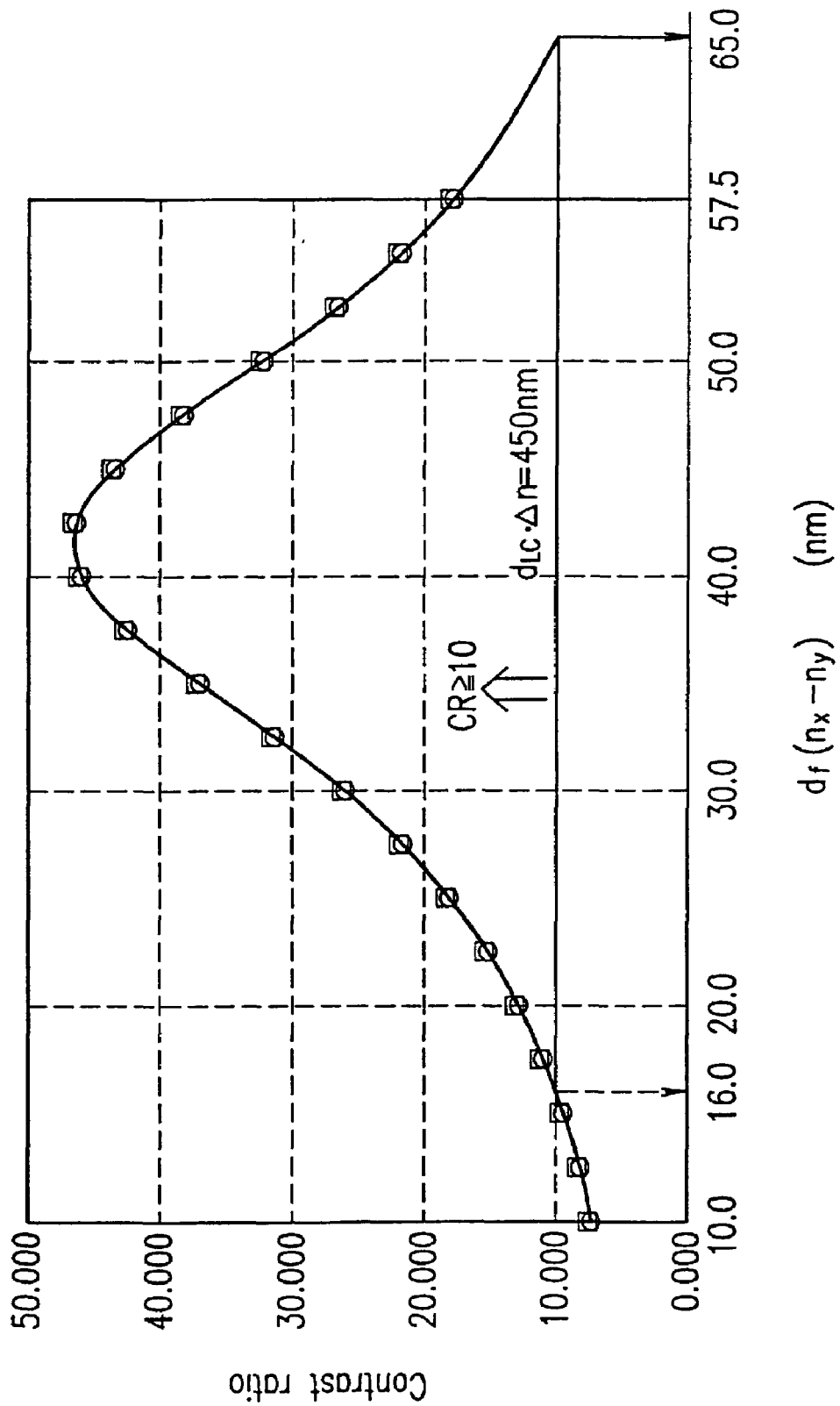
FIG. 59 is a graph illustrating the electro-optical characteristics of the liquid crystal display device of Example 6.

The effect of compensating for the viewing angle dependency can be increased by setting the in-plane retardation value $df \cdot (nx-ny)$ of the phase plate to be less than the retardation value $dLC \cdot \Delta n$ of the liquid crystal layer for a birefringence $\Delta n$ of the liquid crystal molecules, an average thickness $dLC$ of the liquid crystal layer and a thickness $df$ of the phase plate. Particularly, when the in-plane retardation value df·(nx−ny) of the phase plate is set in a range of about 3.5% to about 15% of the retardation value dLC·Δn of the liquid crystal layer, a high contrast display, as shown in FIG. 59, can be realized.

The effect of compensating for the viewing angle dependency can be increased by setting the retardation value df·(nx−nz) of the phase plate in the thickness direction to be less than the retardation value dLC·Δn of the liquid crystal layer for a birefringence Δn of the liquid crystal molecules, an average thickness dLC of the liquid crystal layer and a thickness df of the phase plate. Particularly, when the retardation value df·(nx−nz) of the phase plate in the thickness direction is set in a range of about 30% to about 80% of the retardation value dLC·Δn of the liquid crystal layer, it is possible to enhance the effect of the phase plate and to realize a display with a satisfactory color characteristic.

The ratio of the in-plane retardation value df·(nx−ny) of the phase plate and the retardation value df·(nx−nz) in the thickness direction (i.e., a refractive index difference ratio) is preferably greater than about 0. As will be illustrated in examples later, when the ratio of the retardation values is greater than about 0 (i.e., when the retardation value in the thickness direction is not about 0), there is provided a viewing angle compensation effect. Particularly, when the ratio of the retardation values is set to be about 2 or greater, it is possible to realize a satisfactory display where the contrast ratio is about 10 with the viewing angle being about 60° or greater. Moreover, when the ratio of the retardation values is set in the range of about 3 to about 6, it is possible to realize an even better display where the contrast ratio is about 20 with the viewing angle being about 60° or greater. The phase plate can be produced from a polymer material such as polycarbonate whose average refractive index is in a range of about 1.4 to about 1.7, and the produced phase plate is transparent in the visible light range (transmittance: about 90% or greater).

By setting the retardation value dLC·Δn of the liquid crystal layer in a range of about 300 nm to about 550 nm, it is possible to improve the viewing angle characteristic in the presence of an applied voltage and to prevent the gray-scale inversion, thereby realizing a satisfactory display where the contrast ratio is about 10 with the viewing angle being about 60° or greater.

By providing an antiglare layer on the surface of one of a pair polarizing plates on the front side, it is possible to increase the effect of compensating for the viewing angle dependency. By further providing an antireflection film on the antiglare layer, it is possible to further increase the effect of compensating for the viewing angle dependency.

When a phase plate is provided, coloring may occur in a widely inclined direction. However, by providing the antiglare layer on the surface of the front-side polarizing plate and further providing the antireflection film on the antiglare layer, it is possible to compensate for the coloring.

Basic Operation

Figure 25A:
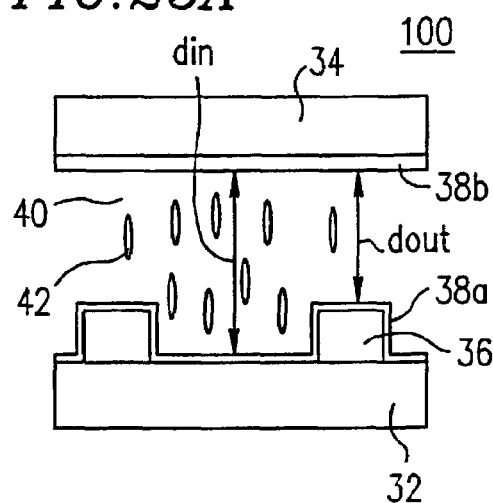
FIGS. 25A to 25D are views illustrating the operation principle of the liquid crystal display device of the present invention, where
Figure 25C:
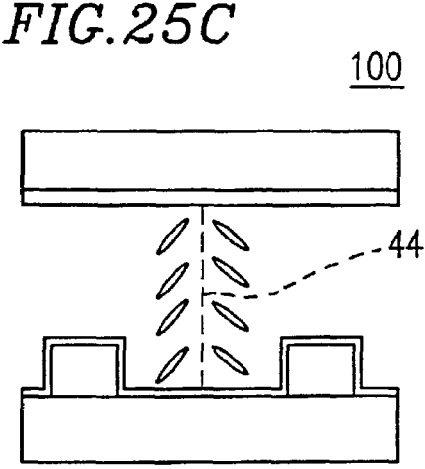
Figure 25B:
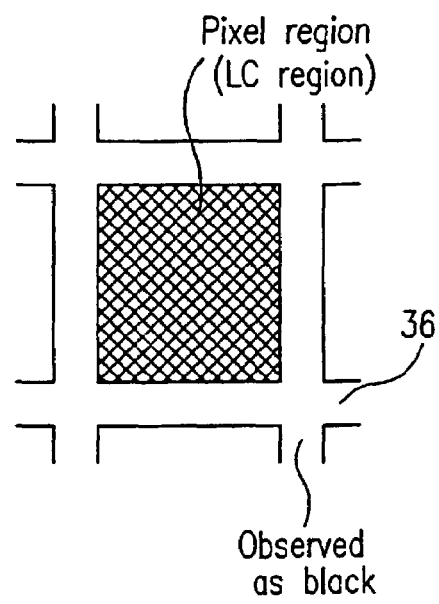
Figure 25D:
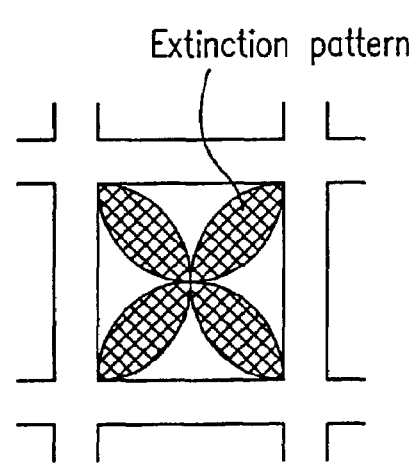

Referring to FIGS. 25A, 25B, 25C and 25D, the operation principle of a liquid crystal display device 100 of the present invention will be described. FIGS. 25A and 25B illustrate a state of the device in the absence of an applied voltage, while FIGS. 25C and 25D illustrate a state of the device in the presence of an applied voltage. FIGS. 25A and 25C are cross-sectional views illustrating the liquid crystal display device 100, while FIGS. 25B and 25D each illustrate how the upper surface of the device is observed with a polarization microscope in a crossed Nicols state.

The liquid crystal display device 100 includes a pair of substrates 32 and 34, and a liquid crystal layer 40 interposed therebetween. The liquid crystal layer 40 is formed of liquid crystal molecules 42 having a negative dielectric anisotropy (Δε) (i.e., an Nn type liquid crystal material). Vertical alignment layers 38a and 38b are provided on respective surfaces of the substrates 32 and 34 which are adjacent to the liquid crystal layer 40. A protrusion 36 is formed at least on one side of each of the substrates 32 and 34 which is adjacent to the liquid crystal layer 40. Due to the protrusion 36, the liquid crystal layer 40 has two different thicknesses dout and din. As a result, a liquid crystal region which exhibits an axially symmetric orientation in the presence of an applied voltage is defined in an area surrounded by the protrusions 36, as described later. In FIGS. 25A to 25D, electrodes provided on the substrates 32 and 34 for applying a voltage through the liquid crystal layer 40 is omitted.

In the liquid crystal display device 100, in the absence of an applied voltage, as illustrated in FIG. 25A, the liquid crystal molecules 42 are aligned in a direction vertical to the substrate by the anchoring strength of the vertical alignment layers 38a and 38b. When viewed by a polarization microscope in a crossed Nicols state, a pixel region in the absence of an applied voltage exhibits a dark field (normally black mode), as illustrated in FIG. 25B.

When a voltage is applied through the liquid crystal display device 100, a force acts upon the liquid crystal molecules 42 having a negative dielectric anisotropy to orient the molecules 42 so that the long axis of the molecules 42 is perpendicular to the direction of the electric field. As a result, the molecules 42 incline from a direction vertical to the substrate, as illustrated in FIG. 25C (gray-scale display state). In FIG. 25C, reference numeral 44 denotes a central axis. When viewed by a polarization microscope in a crossed Nicols state, a pixel region in this state exhibits an extinction pattern along the absorption axis as illustrated in FIG. 25D.

Figure 26:
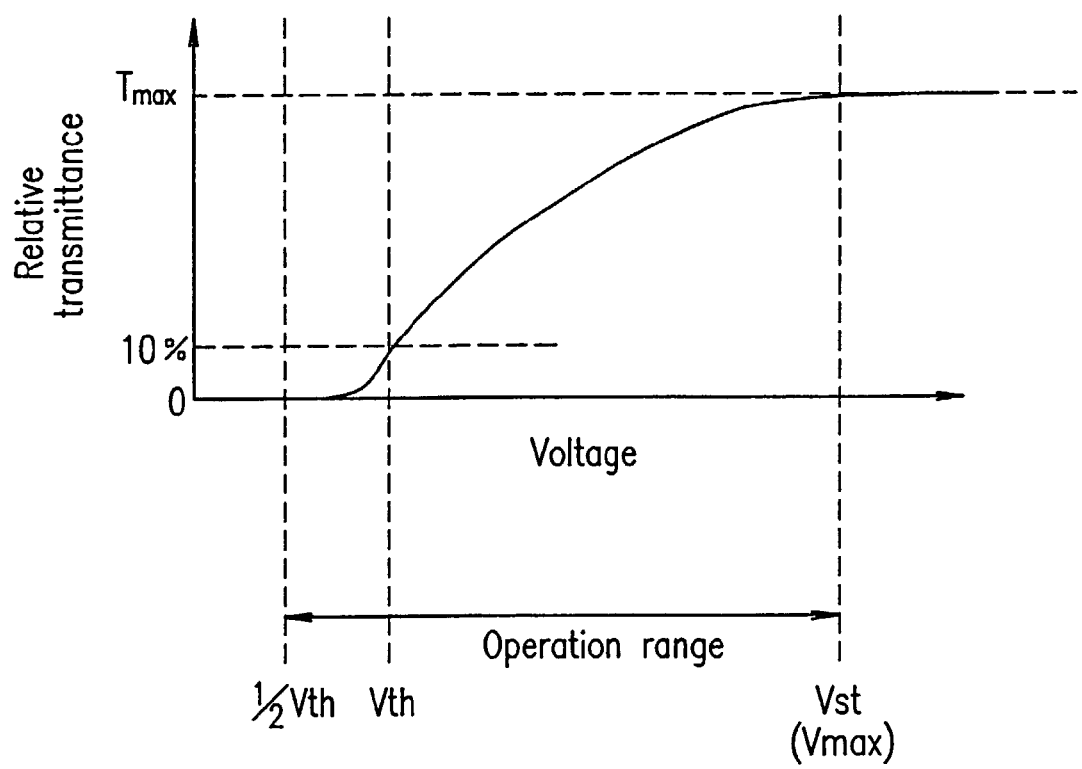
FIG. 26 is a graph illustrating a voltage-transmittance curve of a liquid crystal display device.

FIG. 26 illustrates a voltage-transmittance curve of the liquid crystal display device 100, where the horizontal axis represents the voltage applied to the liquid crystal layer, with the vertical axis representing the relative transmittance.

As the applied voltage increases from the normally black state (in the absence of an applied voltage), the transmittance gradually increases. Herein, the voltage corresponding to the transmittance of about 10% will be referred to as "Vth" (threshold voltage). When the voltage further increases, the transmittance further increases and reaches the saturation point. The voltage at which the transmittance is saturated will be referred to as "Vst". While the voltage applied through the liquid crystal layer 40 is between about ½ Vth to Vst, the transmittance varies reversibly within the operation range shown in FIG. 26. When a voltage near ½ Vth is applied, although the liquid crystal molecules are oriented substantially perpendicularly to the substrate, the molecules still remember the symmetry with respect to the central axis of the axisymmetric orientation. It is believed that when a voltage greater than about ½ Vth is applied, the molecules reversibly return to the axisymmetric orientation. When the applied voltage becomes less than about ½ Vth, the liquid crystal molecules substantially return to the vertical orientation. Then, when a voltage is applied again, the direction in which the liquid crystal molecules decline is not uniquely determined, whereby there are a plurality of central axes of axisymmetric orientation and the transmittance is unstable.

Immediately after the Nn type liquid crystal material is injected into the liquid crystal cell, the liquid crystal material behaves as when the applied voltage is lower than about ½ Vth. Once a voltage greater than about ½ Vth is applied thereto, each region surrounded by the protrusions 36 (corresponding to a pixel region) has a single central axis, thereby exhibiting a voltage-transmittance characteristic as illustrated in FIG. 26.

The term "pixel" is typically defined as the minimum unit for performing a display. In this specification, the term "pixel region" refers to a region or portion of a liquid crystal display device which corresponds to a "pixel". When a pixel has a large aspect ratio (long pixel), a plurality of pixel regions can be formed from one long pixel. It is preferable that the number of pixel regions provided for each pixel is as small as possible while the axisymmetric orientation can be formed stably. The term "axisymmetric orientation" as used herein refers to various orientations such as a radial orientation, a concentric (tangential) orientation and a spiral orientation.

Liquid Crystal Material

The liquid crystal material used in the present invention is a so-called Nn type liquid crystal material which has a negative dielectric anisotropy ($\Delta\epsilon<0$). The absolute value of $\Delta\epsilon$ can be appropriately designed for the particular application. Generally, it is preferable to have a large absolute value in view of reducing the driving voltage.

The retardation value $dLC\cdot\Delta n$ in the presence of an applied voltage is a factor which may influence important characteristics of the liquid crystal display device such as the transmittance or the viewing angle characteristic. In the display mode of the present invention, the retardation value inherent in the liquid crystal cell (determined by the product of $\Delta n$ inherent in the liquid crystal material and the thickness dLC of the liquid crystal layer) does not have to be limited to the optimal value.

Figure 27:
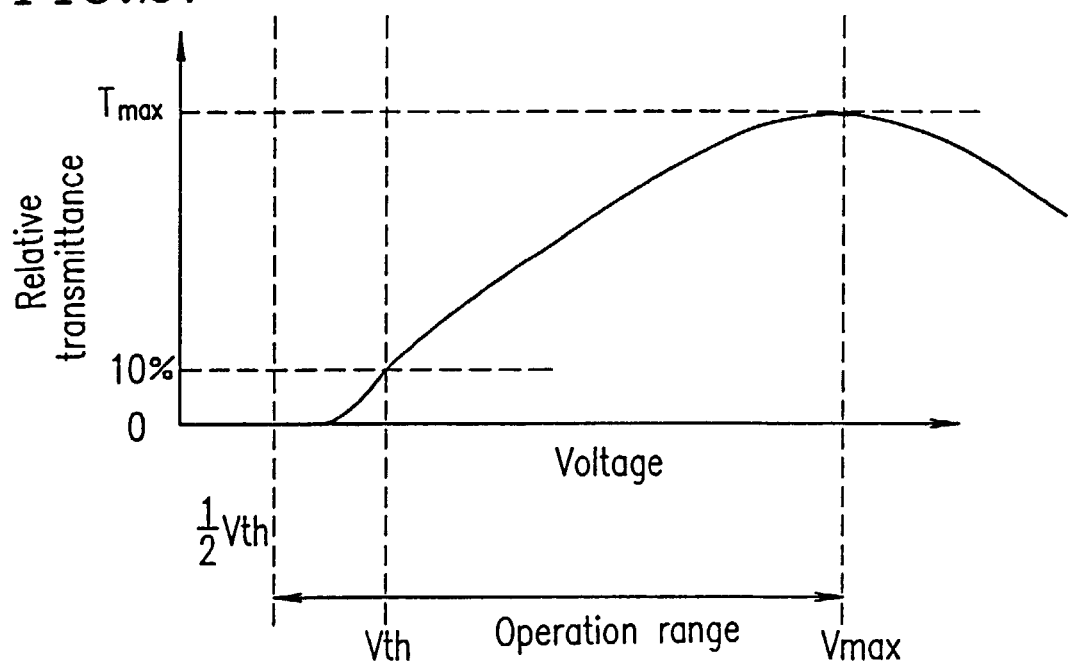
FIG. 27 is a graph illustrating a voltage-transmittance curve of a liquid crystal display device which has a retardation value greater than the optimal value thereof.

FIG. 27 shows a voltage-transmittance curve of a liquid crystal display device having a retardation value greater than the optimal retardation value (first minimum condition for the maximum transmittance: $dLC\cdot\Delta n$=about 450 nm).

In such a liquid crystal display device, a region exceeding the maximum relative transmittance point does not have to be used, but instead, the liquid crystal display device can be driven only by using a region in which the relative transmittance increases monotonically. Thus, the maximum driving voltage (Vmax) can be set to be the voltage at which the relative transmittance takes its maximum value, as shown in FIG. 27.

The retardation value at the maximum driving voltage used is important in the present invention. Herein, the product of the apparent $\Delta n$ of the liquid crystal molecules when the liquid crystal cell is produced (anisotropy in the refractive index: the value at the maximum driving voltage) and the average thickness dLC of the liquid crystal layer ($dLC\cdot\Delta n$, retardation value) is preferably about 300 nm to about 550 nm, and more preferably, about 300 nm to about 500 nm. In such ranges, the transmittance in the presence of an applied voltage and the viewing angle characteristic in the absence of an applied voltage are satisfactory, so that the gray-scale inversion (contrast inversion) phenomenon (the relationship between the applied voltage and the transmittance is inverted depending upon the viewing angle) does not occur.

There exists a second minimum condition (retardation value: about 1000 nm to about 1400 nm) in which the transmittance takes its maximum value. In this range, the viewing angle characteristic in the absence of an applied voltage is deteriorated, and the gray-scale inversion (contrast inversion) phenomenon may occur.

Hereinafter, $dLC\cdot\Delta n$ will be further described with reference to the results of two simulations conducted by the inventors of the present invention.

Simulation (1): First, $\Delta n$ of the liquid crystal material is fixed at about 0.08, while the thickness dLC of the liquid crystal cell is varied from about 4 µm to about 8 µm, and an electro-optical test (simulation) was conducted to optimize the biaxial phase plate so that the viewing angle characteristic takes its maximum value for each $dLC\cdot\Delta n$ value. Thus, the viewing angle characteristic, the gray-scale inversion, and the relationship between the transmittance and the retardation were evaluated. In calculating the contrast ratio, the contrast ratio for the applied voltage (10 V) at which the transmittance is saturated was set to be 100%, while the voltage at which the transmittance is about 0.1% was used for displaying the black level and the voltage at which the transmittance is about 95% was used for displaying the white level.

Figure 28:
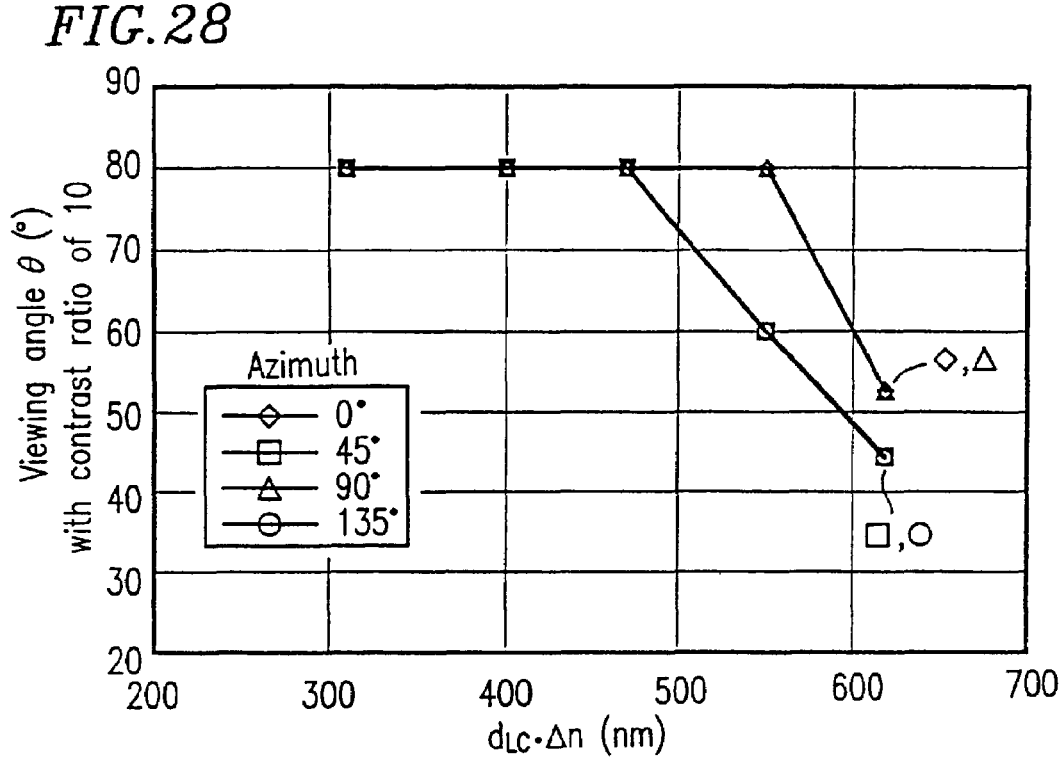
FIG. 28 is a graph illustrating the relationship between dLC·Δn (where Δn is fixed at about 0.0773, while varying dLC from about 4 µm to about 8 µm) and the viewing angle with a contrast ratio of about 10, at different azimuths (Φ=0°, Φ=45°, Φ=90° and Φ32 135°) with respect to the absorption axis of the polarizing plate.
Figure 29:
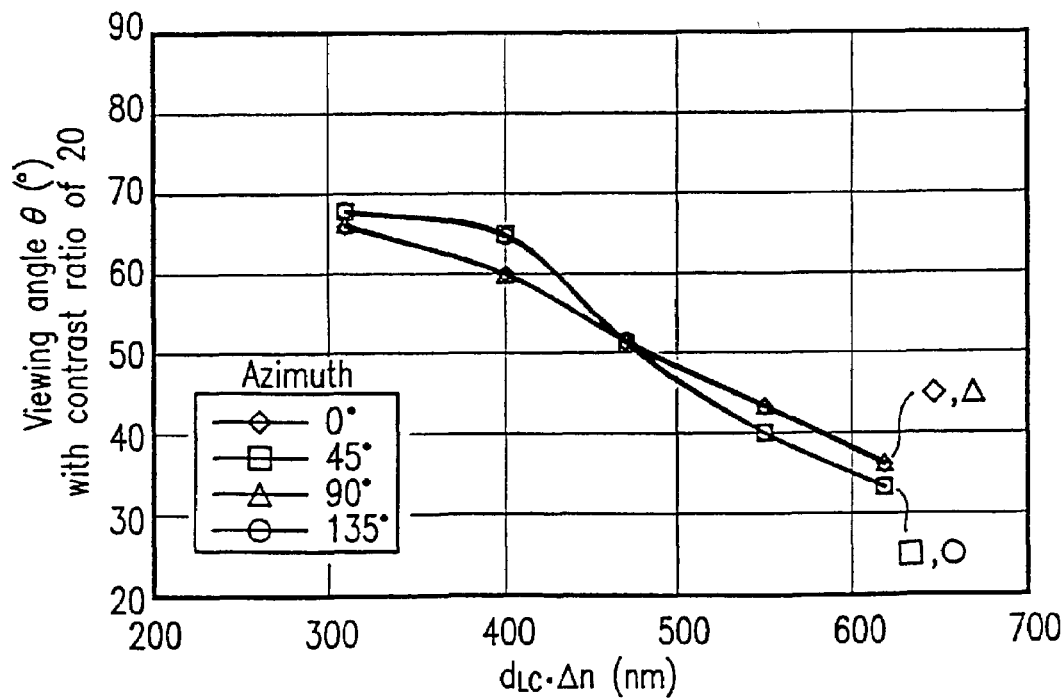
FIG. 29 is a graph illustrating the relationship between dLC·Δn (where Δn is fixed at about 0.0773, while varying dLC from about 4 µm to about 8 µm) and the viewing angle with a contrast ratio of about 20, at different azimuths (Φ=0°, Φ=45°, Φ=90° and Φ=135°) with respect to the absorption axis of the polarizing plate.
Figure 30:
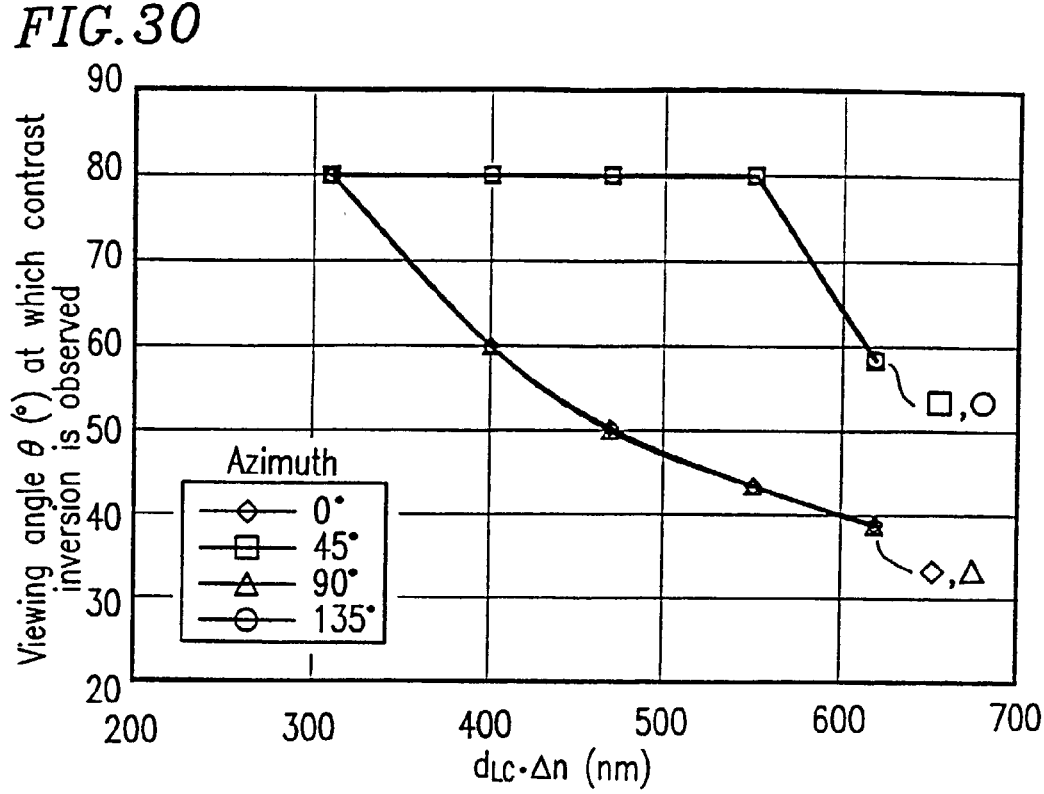
FIG. 30 is a graph illustrating the relationship between dLC·Δn (where Δn is fixed at about 0.0773, while varying dLC from about 4 µm to about 8 µm) and the inversion angle, at different azimuths (Φ=0°, Φ=45°, Φ=90° and Φ=135°) with respect to the absorption axis of the polarizing plate.
Figure 31:
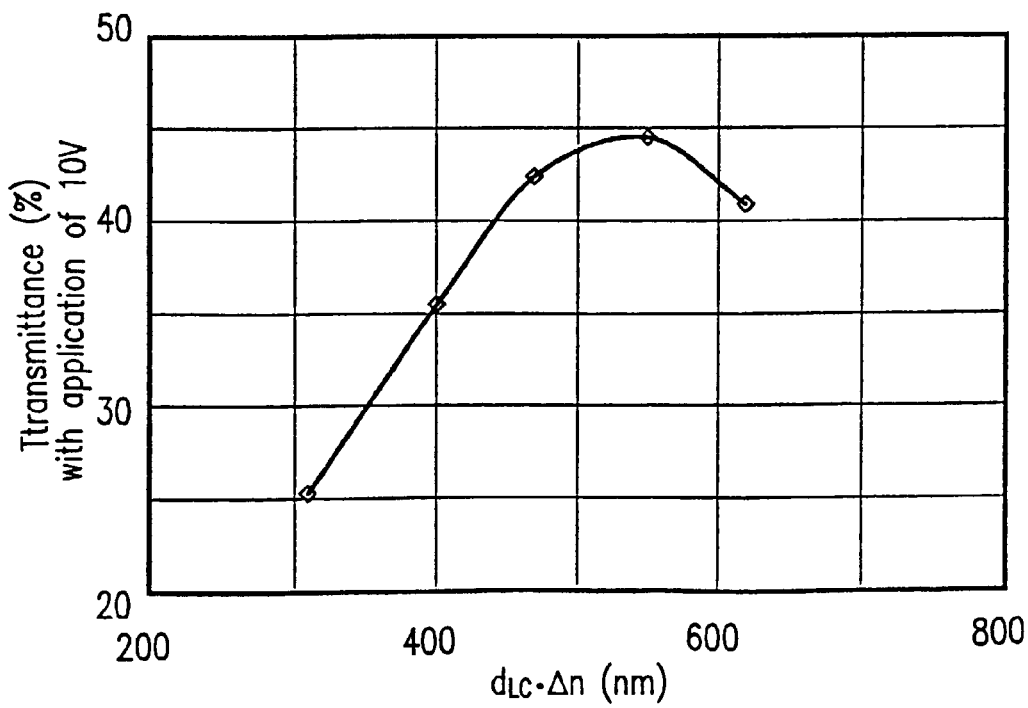
FIG. 31 is a graph illustrating the relationship between dLC·Δn (where Δn is fixed at about 0.0773, while varying dLC from about 4 µm to about 8 µm) and the transmittance at an applied voltage of about 10 V.

FIGS. 28 and 29 illustrate the viewing angle $\theta$ with contrast ratios of 10 and 20, respectively; FIG. 30 illustrates a contrast inversion angle $\theta$; and FIG. 31 illustrates the transmittance at an applied voltage of 10 V. Each of the viewing angle $\theta$, the contrast inversion angle $\theta$ and the transmittance is plotted along the vertical axis of each figure with the horizontal axis representing the retardation value $dLC\cdot\Delta n$ of the liquid crystal cell. A phase plate used herein was such that the ratio of the in-plane refractive index difference and the refractive index difference in the thickness direction, or the "normal direction" (a direction normal to the display plane), is about 4.5.

It can be seen from FIG. 28 that when the contrast ratio is about 10, the range of $dLC\cdot\Delta n$ where the viewing angle is about 60° or greater in every azimuth is from about 300 nm to about 550 nm, and that it is preferable that $dLC\cdot\Delta n$ is in this range.

It can be seen from FIG. 29 that when the contrast ratio is about 20, the viewing angle decreases as $dLC\cdot\Delta n$ increases. Moreover, it can be seen from FIG. 30 that when $dLC\cdot\Delta n$ is in the range of about 300 nm to about 400 nm, the reflection angle is about 60° or greater in every azimuth and a substantially circular viewing angle characteristic is realized. Therefore, the $dLC\cdot\Delta n$ range of about 300 nm to about 400 nm is preferable for applications where a contrast ratio of about 20 is required or for applications where a substantially circular viewing angle characteristic is required.

It is commonly known in the art that the display performance (i.e., the viewing angle or the reflection angle characteristic) considerably deteriorates when the retardation of the liquid crystal cell exceeds the first minimum condition. As can be seen from FIG. 31, the maximum transmittance is obtained when $dLC\cdot\Delta n$ is about 550 nm. Therefore, $dLC\cdot\Delta n$=about 550 nm is the first minimum, and a satisfactory display performance may not be realized in a liquid crystal cell condition where $dLC\cdot\Delta n$ exceeds about 550 nm.

Simulation (2): Next, the thickness dLC of the liquid crystal cell is fixed at about 5 µm, while varying $\Delta n$ of the liquid crystal material from about 0.07 to about 0.1, and an electro-optical test (simulation) was conducted to optimize the biaxial phase plate so that the viewing angle characteristic takes its maximum value for each $dLC\cdot\Delta n$ value. Thus, the viewing angle characteristic, the gray-scale inversion, and the relationship between the transmittance and the retardation were evaluated. In calculating the contrast ratio, the contrast ratio for the applied voltage at which the transmittance is saturated was set to be 100% (about 10 V), while the voltage at which the transmittance is about 0.1% was used for displaying the black level and the voltage at which the transmittance is about 95% was used for displaying the white level.

Figure 32:
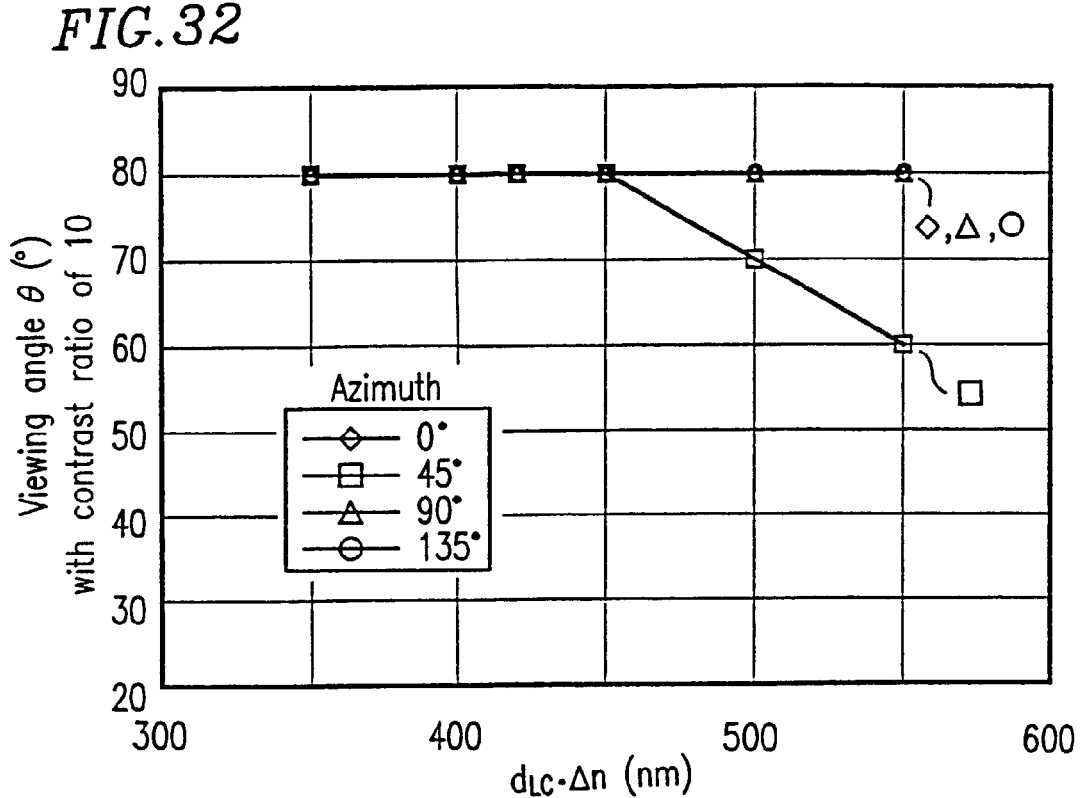
FIG. 32 is a graph illustrating the relationship between dLC·Δn (where dLC is fixed at about 5 µm, while varying Δn from about 0.07 to about 0.1) and the viewing angle with a contrast ratio of about 10, at different azimuths (Φ=0°, Φ=45°, Φ=90° and Φ=135°) with respect to the absorption axis of the polarizing plate.
Figure 33:
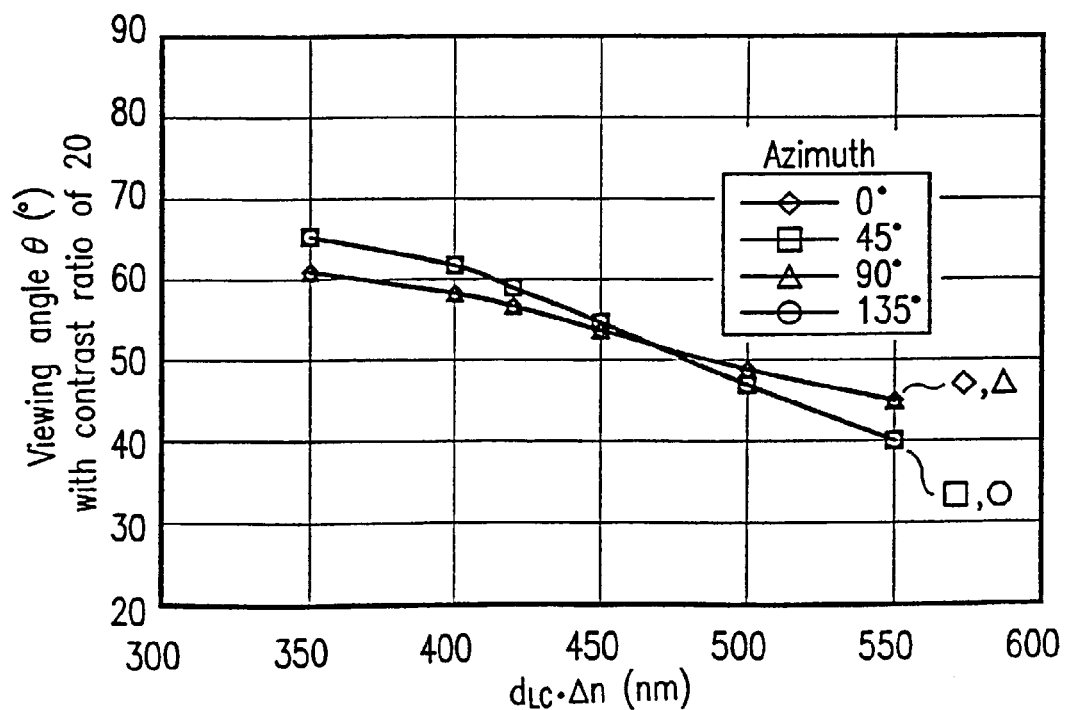
FIG. 33 is a graph illustrating the relationship between dLC·Δn (where dLC is fixed at about 5 µm, while varying Δn from about 0.07 to about 0.1) and the viewing angle with a contrast ratio of about 20, at different azimuths (Φ=0°, Φ=45°, Φ=90° and Φ=135°) with respect to the absorption axis of the polarizing plate.
Figure 34:
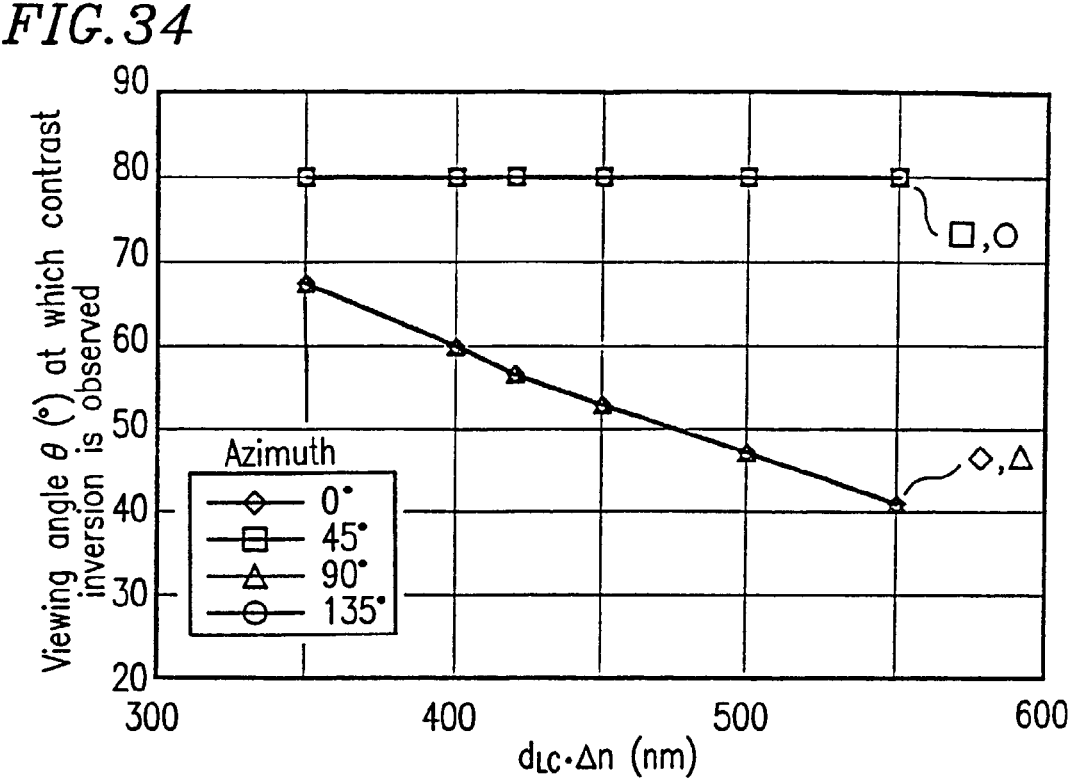
FIG. 34 is a graph illustrating the relationship between dLC·Δn (where dLC is fixed at about 5 µm, while varying Δn from about 0.07 to about 0.1) and the inversion angle, at different azimuths Φ=0°, Φ=45°, Φ=90° and Φ=135°) with respect to the absorption axis of the polarizing plate.
Figure 35:
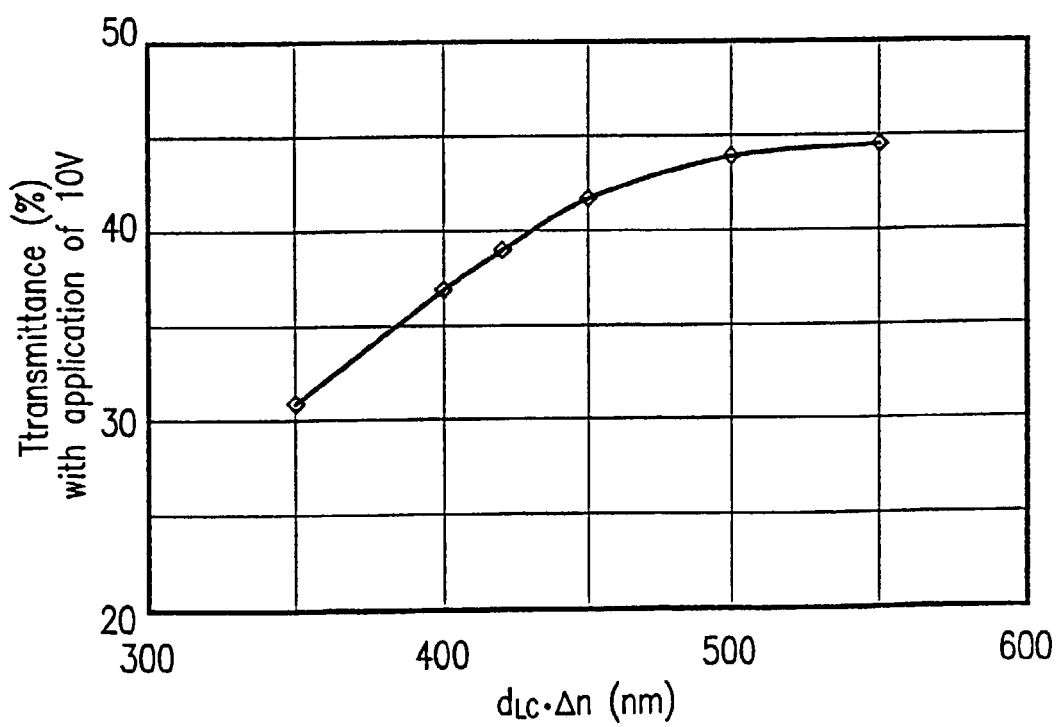
FIG. 35 is a graph illustrating the relationship between dLC·Δn (where dLC is fixed at about 5 µm, while varying Δn from about 0.07 to about 0.1) and the transmittance at an applied voltage of about 10 V.

FIGS. 32 and 33 illustrate the viewing angle θ with contrast ratios of 10 and 20, respectively; FIG. 34 illustrates a contrast inversion angle θ; and FIG. 35 illustrates the transmittance at an applied voltage of 10 V. Each of the viewing angle θ, the contrast inversion angle θ and the transmittance is plotted along the vertical axis of each figure with the horizontal axis representing the retardation value dLC·Δn of the liquid crystal cell. A phase plate used herein was such that the ratio of the in-plane refractive index difference and the refractive index difference in the thickness direction, or the "normal direction" (a direction normal to the display plane), is about 4.5.

It can be seen from FIG. 32 that when the contrast ratio is about 10, the range of dLC·Δn where the viewing angle is about 60° or greater in every azimuth is from about 300 nm to about 550 nm, and that it is preferable that dLC·Δn is in this range.

It can be seen from FIG. 33 that when the contrast ratio is about 20, the viewing angle decreases as dLC·Δn increases. Moreover, it can be seen from FIG. 34 that when dLC·Δn is in the range of about 300 nm to about 400 nm, the reflection angle is about 60° or greater in every azimuth and a substantially circular viewing angle characteristic is realized. Therefore, the dLC·Δn range of about 300 nm to about 400 nm is preferable for applications where a contrast ratio of about 20 is required or for applications where a substantially circular viewing angle characteristic is required.

As shown in FIG. 35, the transmittance at an applied voltage of about 10 V increases as the retardation of the liquid crystal cell increases.

Based on the results of the simulations (1) and (2), the dLC·Δn range used for the present invention is preferably about 300 nm to about 550 nm, and more preferably, about 300 nm to about 400 nm.

The twist angle of the liquid crystal molecules in the liquid crystal layer is also a factor which determines the transmittance of the liquid crystal display device. In the present invention, the twist angle at the maximum driving voltage is as important as the retardation value.

The twist angle at the maximum driving voltage is preferably about 45° to about 110°, and more preferably, about 100° in view of the transmittance.

Since Nn type liquid crystal molecules are used in the present invention, the apparent twist angle of the liquid crystal molecules depends upon the applied voltage. The twist angle is substantially 0° in the absence of an applied voltage, while the twist angle increases as the applied voltage increases, and the twist angle approaches the twist angle value inherent in the liquid crystal material.

It is desirable that the twist angle and the retardation value at the maximum driving voltage are in the respective preferable ranges. In such a case, it is possible to more efficiently bring the transmittance to its maximum value.

Photocurable Resin

As described above referring to FIG. 26, it is preferable that a voltage of about ½ Vth or greater always be applied through the liquid crystal display device of the present invention.

When a voltage is applied through the liquid crystal molecules oriented vertically to the substrate, the direction in which the liquid crystal molecules fall is not uniquely determined. As a result, there is a transitional state where there are a plurality of central axes. After a continued voltage application, a single central axis is formed in each region defined by the protrusions. This state can be stably maintained as long as a voltage of about ½ Vth or greater is applied.

In view of this, an axially symmetric orientation fixing layer can be formed in a surface region of the liquid crystal layer by curing the photocurable resin which has been previously mixed in the liquid crystal material while applying a voltage of about ½ Vth or greater and thereby stabilizing the axially symmetric orientation. In this way, the axially symmetric orientation of the liquid crystal molecules can be stabilized. Once the photocurable resin is cured, the voltage of about ½ Vth or greater can be removed without forming a plurality of central axes. As a result, the axially symmetric orientation can be formed with good reproducibility.

For example, an acrylate resin, a methacrylate resin, a styrene resin, and derivatives thereof can be used as the photocurable resin. By adding a photoinitiator in the resin, it is possible to more efficiently cure the photocurable resin. A thermosetting resin can also be used.

The appropriate amount of a curable resin to be added varies depending upon the material used, and therefore is not specified in this specification. However, it is preferable that the resin content (in percentage with respect to the total weight including the liquid crystal material) is about 0.1% to about 5%. When the resin content is less than about 0.1%, the axially symmetric orientation may not be stabilized by the cured resin. When the resin content exceeds about 5%, the effect of the vertical alignment layer is inhibited, and the liquid crystal molecules shift from the vertical orientation, thereby increasing the transmittance (causing light leakage) and deteriorating the black state in an OFF state.

(Phase Plate)

As described above in the prior art section, when a liquid crystal material is interposed between two polarizing plates whose axes are perpendicular to each other, a satisfactory black state and thus a high contrast display can be realized in a direction normal to the display plane. From different viewing angles, however, light leakage is observed, and the contrast ratio is deteriorated, because (i) some viewing angle dependency results from an inherent characteristic of the polarizing plate, and (ii) the retardation value of the vertically-oriented liquid crystal molecules varies from one direction to another.

In view of this, in accordance with the present invention, a phase plate is provided between at least one of the polarizing plates and one of the substrates adjacent thereto.

Figure 36:
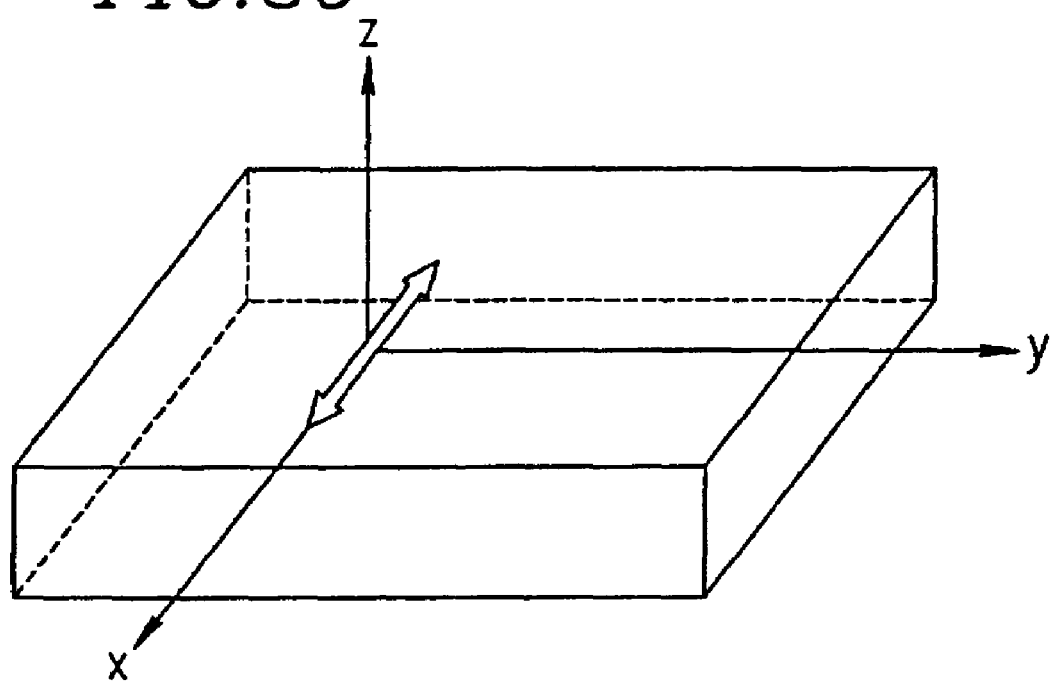
FIG. 36 is a perspective view illustrating directions of the principal refractive indices of the phase plate used in the present invention.

FIG. 36 is a perspective view illustrating directions of the principal refractive indices of the phase plate used in the present invention. The figure defines an orthogonal coordinate system with the x-y plane thereof being parallel to the phase plate. It is assumed that nx, ny and nz, respectively, represent the three principal refractive indices of the refractive index ellipsoid of the phase plate, with nx and ny being the principal refractive indices along the plane of the phase plate, and nz being the principal refractive index in the thickness direction of the phase plate. The phase compensation element has a negative birefringence and a relationship nx>ny>nz. In such a phase plate satisfying this relationship, the direction of nx, being the greatest principal refractive index, corresponds to the direction of the slower axis.

For example, a polymer material such as polycarbonate, polyvinyl alcohol, polystyrene, polymethacrylate (PMMA) which is transparent (90% or greater transmittance) in the visible light range can be used as a material of the phase plate. The average refractive index of the material is in a range of about 1.4 to about 1.7.

The phase plate can also be a layered phase film of a plurality of phase films whose optical axes are directed in different azimuths, respectively. The effect of an improved viewing angle characteristic can be provided either by a layered film obtained by attaching together a uniaxial film having a retardation along the in-plane direction and a uniaxial film having a retardation along the thickness direction, or by a biaxial film having retardations along an in-plane direction and along a thickness direction, respectively. Alternatively, a film of two layered biaxial phase films can also be used.

Figure 37A:
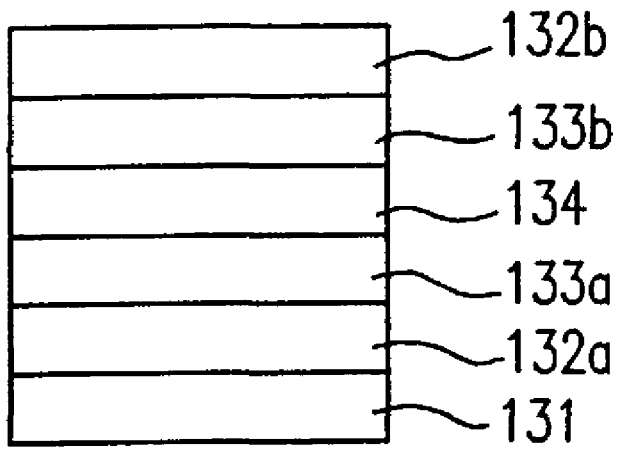
FIG. 37A is a cross-sectional view illustrating an exemplary structure of another phase plate which can be used in the present invention.
Figure 37B:
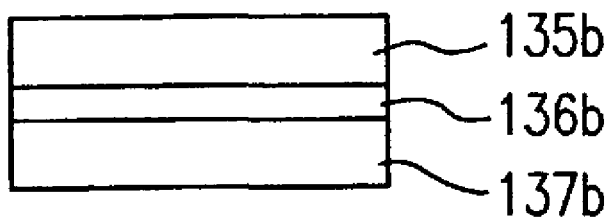
FIG. 37B is a cross-sectional view illustrating an exemplary structure of the polarizing plate 132*b* of FIG. 37A.
Figure 37C:
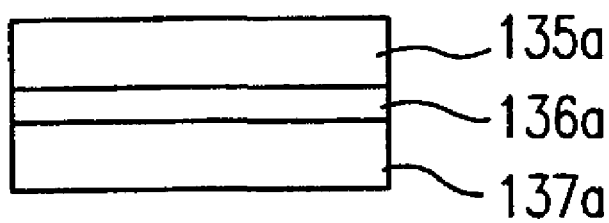
FIG. 37C is a cross-sectional view illustrating an exemplary structure of the polarizing plate 132*a* of FIG. 37A.

Moreover, a structure as illustrated in FIG. 37 may also be used. Referring to FIG. 37, polarizing plates 132a and 132b are provided on both sides of a liquid crystal cell 134. Biaxial phase film 133a and 133b are provided between the polarizing plates 132a and 132b and the liquid crystal cell 134, respectively, with a back light 131 being provided on the back of the polarizing plate 132a. Such a liquid crystal display device can have structures shown in, for example, FIGS. 37B and 37C.

At least one of the polarizing plates 132a and 132b has a polarizing layer 136a or 136b interposed between and supported by a pair of supporting films 135a and 137a or a pair of supporting films 135b and 137b. The polarizing plates 132a and 132b can be commercially available polarizing plates having retardation in the in-plane direction or direction normal to the plane. Such polarizing plates are available from, for example, Nitto Denko Co. and Sumitomo Chemical Co. Retardation of the phase compensation elements used for viewing angle compensation in the liquid crystal display device according to the present invention includes retardation of the polarizing plates 132a and 132b. The viewing angle characteristic is improved by adjusting the value of the retardation according to the present invention. In the above-described examples, the supporting films are provided on both sides of the polarizing layer, but the supporting films can be provided on one side of the polarizing layer.

Exemplary films usable for the present invention include uniaxial or biaxial films formed of TAC (triacetic acid cellulose), PET (polyethylene terephthalate), PETG (polyethylene glycol), PMMA (polymethyl methacrylate), PC (polycarbonate), ARTON and ZENOX. Specifically, TAC films, which are harder than the phase films, are suitable for supporting films. A supporting film formed of TAC has, for example, retardation of about 50 to 60 nm in the direction normal to the plane and retardation of about 5 to 10 nm in the in-plane direction.

The phase plate can be provided between one of the polarizing plates and one of the substrates adjacent thereto, or between each of the polarizing plates and one of the substrates adjacent thereto.

The direction of the principal refractive index nx and the absorption axis of the polarizing plate adjacent to the polarizing plate preferably form an angle of about 45° to about 135°, more preferably about 67° to about 113°. Preferably, they are substantially perpendicular to each other, so as to sufficiently provide the effect of compensating for the viewing angle dependency resulting from an inherent characteristic of the polarizing plate and the viewing angle dependency of the retardation value of the liquid crystal layer.

Figure 38:
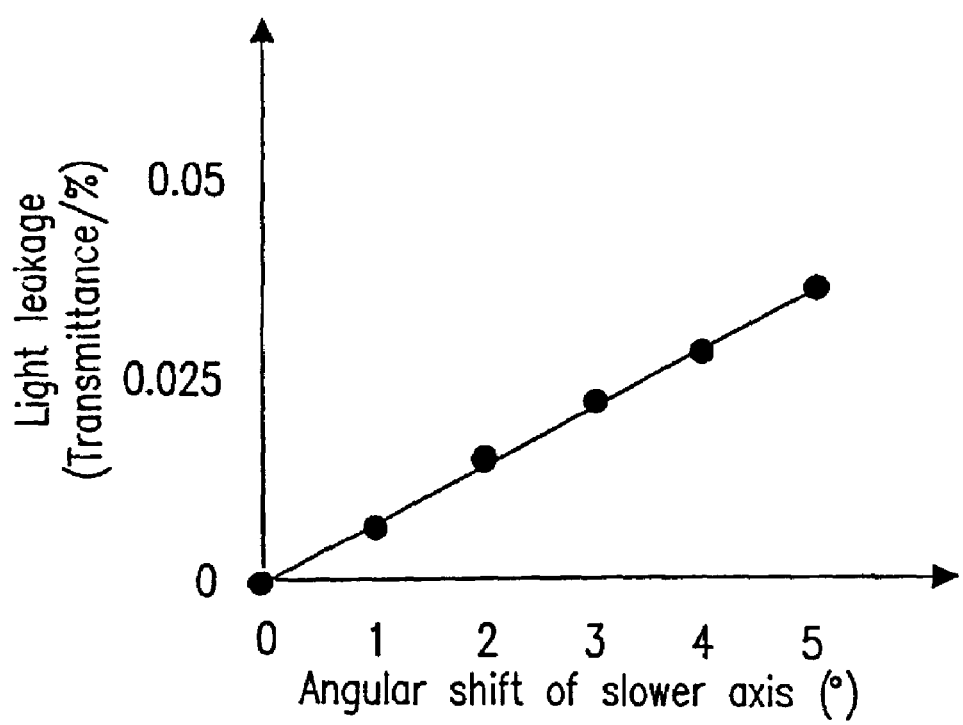
FIG. 38 is a graph illustrating the relationship between the shift of the slower axis of the phase plate from the absorption axis of the polarizing plate and the amount of light leakage.

An evaluation conducted where polarizing plates are in the crossed Nicols arrangement showed that, as illustrated in FIG. 38, when the angle between the slower axis of the phase plate and the absorption axis of the polarizing plate is shifted by more than 1° from 90°, the polarizing characteristic obtained when the polarizing plates are in the crossed Nicols arrangement deteriorates, thereby causing light leakage, so that a sufficient black level or a sufficient contrast is not realized. Therefore, it is desirable that the angular shift between the direction of the principal refractive index nx and a direction perpendicular to the absorption axis of the polarizing plate is equal to or less than about 1°.

Preferably, the in-plane retardation value df·(nx−ny) of the phase plate is less than the retardation value dLC·Δn of the liquid crystal layer for a birefringence Δn of the liquid crystal molecules, an average thickness dLC of the liquid crystal layer and a thickness df of the phase plate. More preferably, the in-plane retardation value df·(nx−ny) of the phase plate is in a range of about 3.5% to about 15% of the retardation value dLC·Δn of the liquid crystal layer. Below 3.5%, the effect of improving the viewing angle characteristic is reduced, and over 15%, the variation in hue may become significant in an inclined viewing angle.

Preferably, the retardation value df·(nx−nz) of the phase plate in the thickness direction is less than the retardation value dLC·Δn of the liquid crystal layer. More preferably, the value df·(nx−nz) is in a range of about 30% to about 80% of the retardation value dLC·Δn of the liquid crystal layer. Below 30%, the effect of the phase plate is reduced, and over 80%, the coloring may become significant in a widely inclined viewing angle.

Hereinafter, the mechanism of how the phase plate compensates for the viewing angle will be described with an example of a normally black mode.

It is known in the art that the viewing angle characteristic in an azimuth of about 45° with respect to the absorption axis of the polarizing plate is generally deteriorated from that in the axial direction due to the polarization characteristic of the polarizing plate and the axially symmetric orientation of the liquid crystal molecules.

Figure 39:
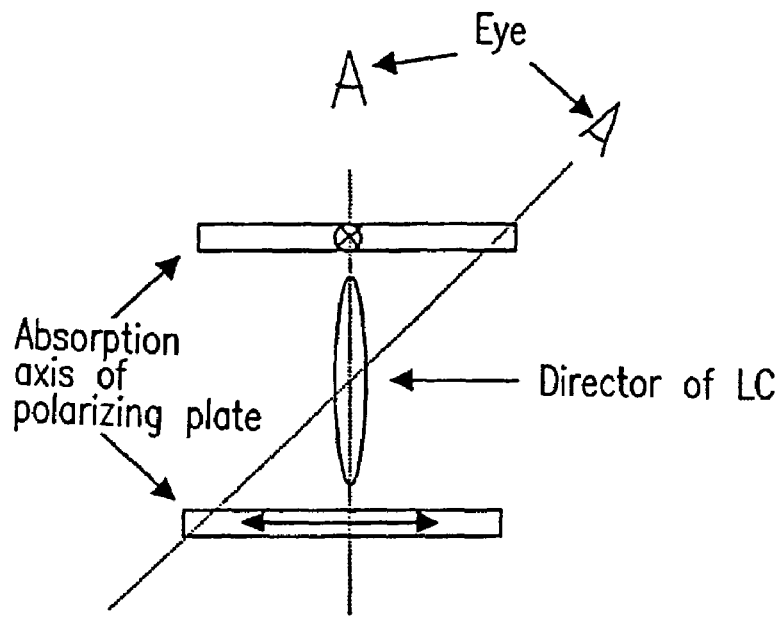
FIG. 39 is a diagram illustrating the mechanism of how the phase plate compensates for the viewing angle, showing the respective directions of the absorption axes of the polarizing plates.
Figure 40:
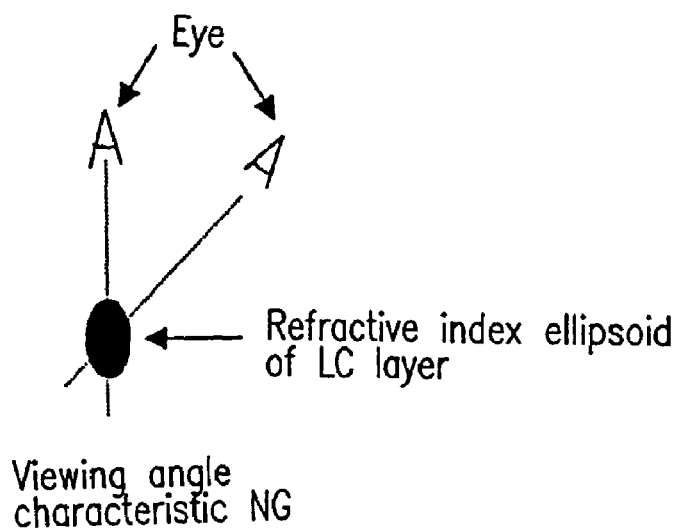
FIG. 40 is a diagram illustrating the mechanism of how the phase plate compensates for the viewing angle, showing the apparent shape of the refractive index ellipsoid in the respective directions of the absorption axes of the polarizing plates.

In an OFF state of a liquid crystal cell provided only with polarizing plates but with no phase plate, when inclining the viewing angle away from the plane normal direction, as illustrated in FIG. 39, the apparent refractive index of the refractive index ellipsoid is varied, as illustrated in FIG. 40. Thus, a satisfactory viewing angle characteristic is not realized due to the optical characteristics.

Figure 41:
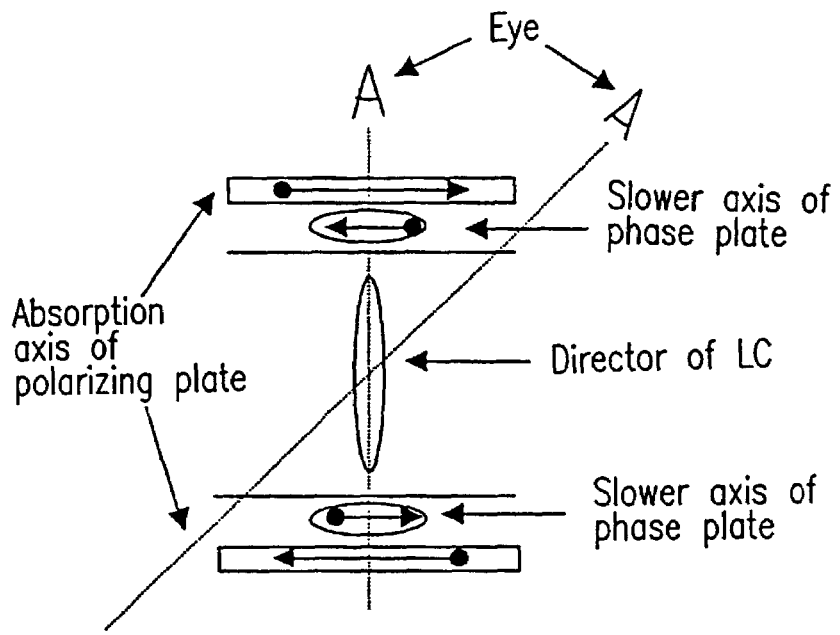
FIG. 41 is a diagram illustrating the mechanism of how the phase plate compensates for the viewing angle, showing a case where the slower axis of the phase plate is shifted by about 45° from the absorption axis of the polarizing plate.
Figure 42:
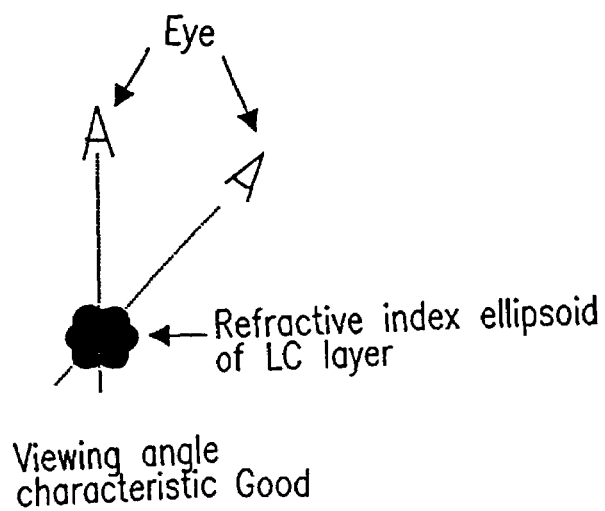
FIG. 42 is a diagram illustrating the mechanism of how the phase plate compensates for the viewing angle, showing the apparent shape of the refractive index ellipsoid in a case where the slower axis of the phase plate is shifted by about 45° from the absorption axis of the polarizing plate.
Figure 43:
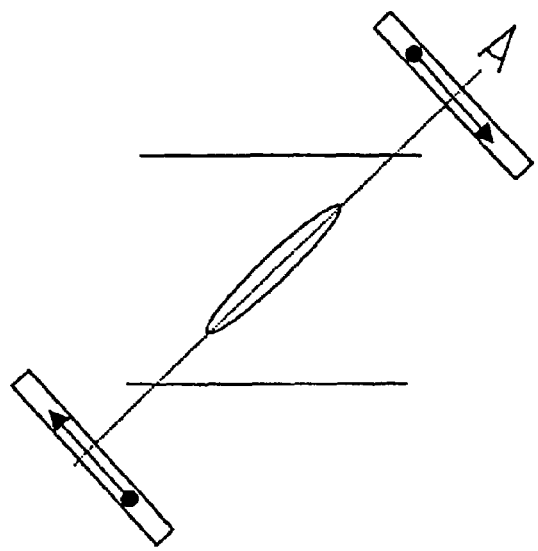
FIG. 43 is a diagram illustrating the mechanism of how the phase plate compensates for the viewing angle, showing the display of FIG. 41 in an OFF state as viewed from an inclined viewing angle.
Figure 44:
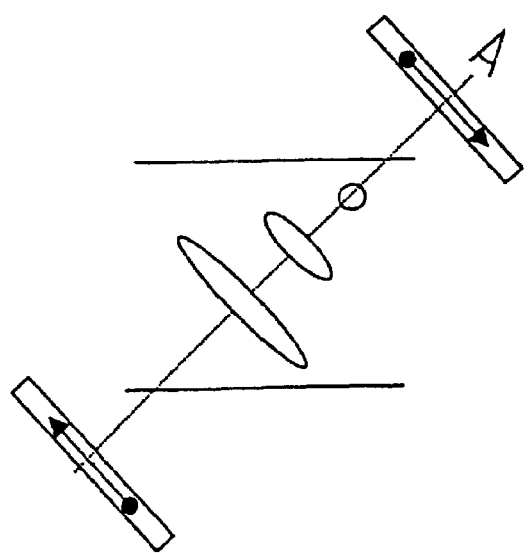
FIG. 44 is a diagram illustrating the mechanism of how the phase plate compensates for the viewing angle, showing the display of FIG. 41 in an ON state as viewed from an inclined viewing angle.
Figure 45:
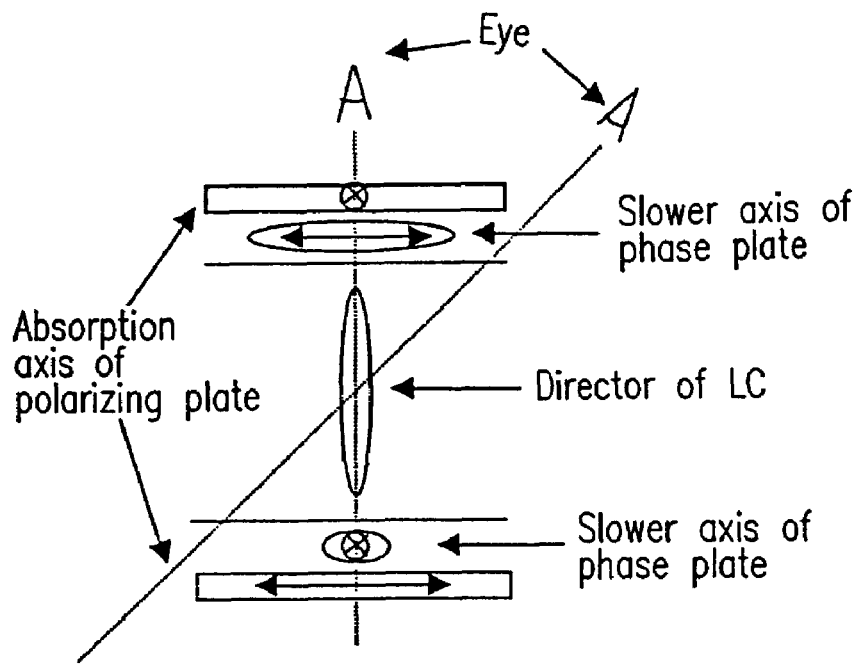
FIG. 45 is a diagram illustrating the mechanism of how the phase plate compensates for the viewing angle, showing the respective directions of the absorption axes of the polarizing plates.
Figure 46:
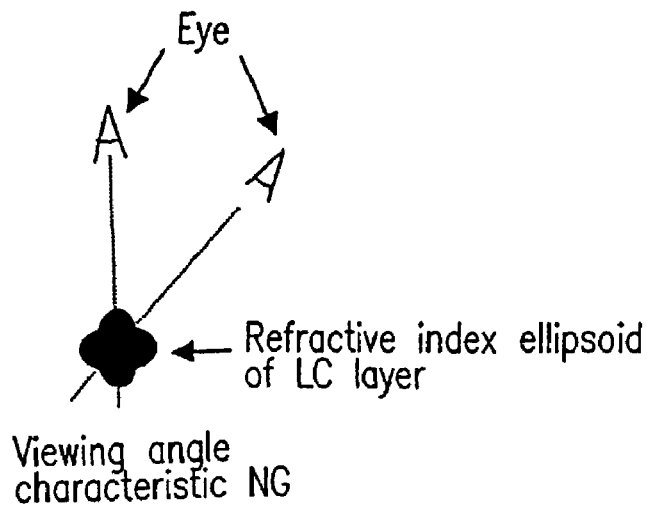
FIG. 46 is a diagram illustrating the mechanism of how the phase plate compensates for the viewing angle, showing the apparent shape of the refractive index ellipsoid in the respective directions of the absorption axes of the polarizing plates.
Figure 47:
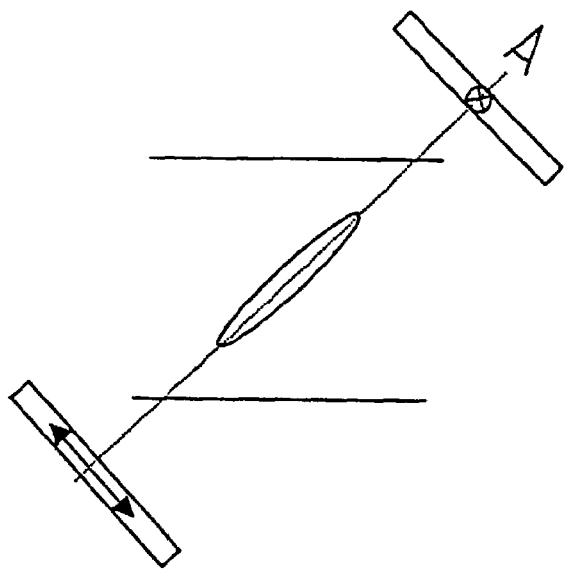
FIG. 47 is a diagram illustrating the mechanism of how the phase plate compensates for the viewing angle, showing the display of FIG. 45 in an OFF state as viewed from an inclined viewing angle.
Figure 48:
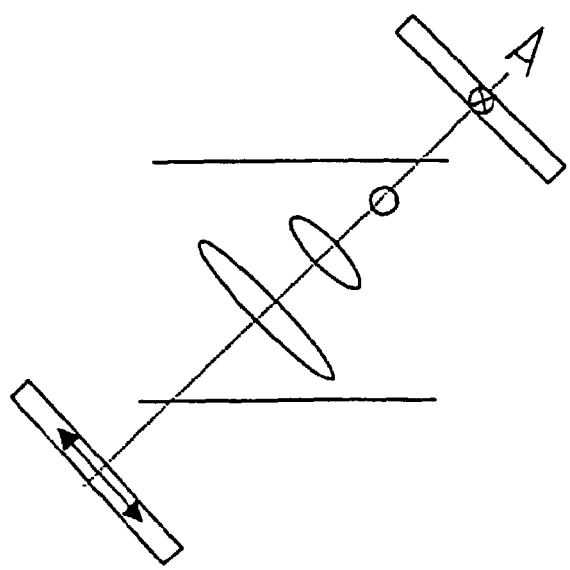
FIG. 48 is a diagram illustrating the mechanism of how the phase plate compensates for the viewing angle, showing the display of FIG. 45 in an ON state as viewed from an inclined viewing angle.

In an OFF state of a liquid crystal cell provided with phase plates, when inclining the viewing angle away from the plane normal direction, as illustrated in FIG. 41, the apparent shape of the refractive index ellipsoid is substantially spherical, as illustrated in FIG. 42, whereby the optical characteristics hardly change even when the viewing angle is varied. Therefore, as illustrated in FIGS. 43 (and 44), even when the viewing angle is inclined from the plane normal direction in an OFF state (and in an ON state), the black display (and the white display) appears the same as it does from a direction normal to the display plane, thereby compensating for the viewing angle characteristic.

Moreover, the viewing angle characteristic is not deteriorated by the phase plate aligned with the absorption axis of the polarizing plate, as illustrated in FIGS. 45 to 48. Thus, a satisfactory viewing angle characteristic can be realized in every azimuth.

Figure 49:
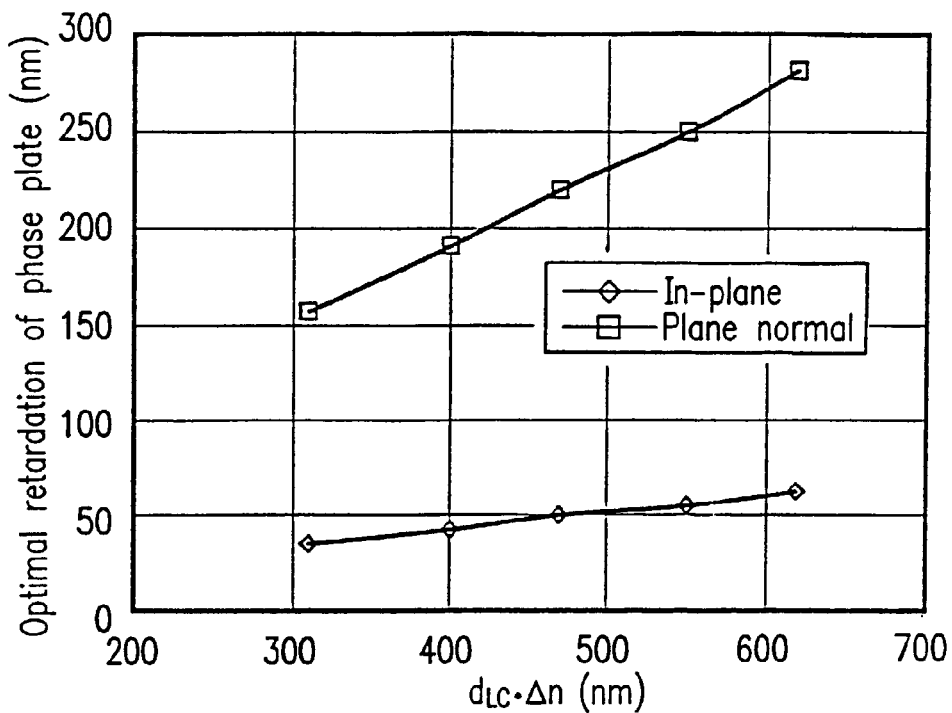
FIG. 49 is a graph illustrating the relationship between dLC·Δn (where Δn is fixed at about 0.0773, while varying dLC from about 4 μm to about 8 μm) and the in-plane and plane-normal retardations of an optimal phase film (where the ratio of the refractive index difference in the in-plane direction and the refractive index difference in the thickness direction is set to about 4.5).
Figure 50:
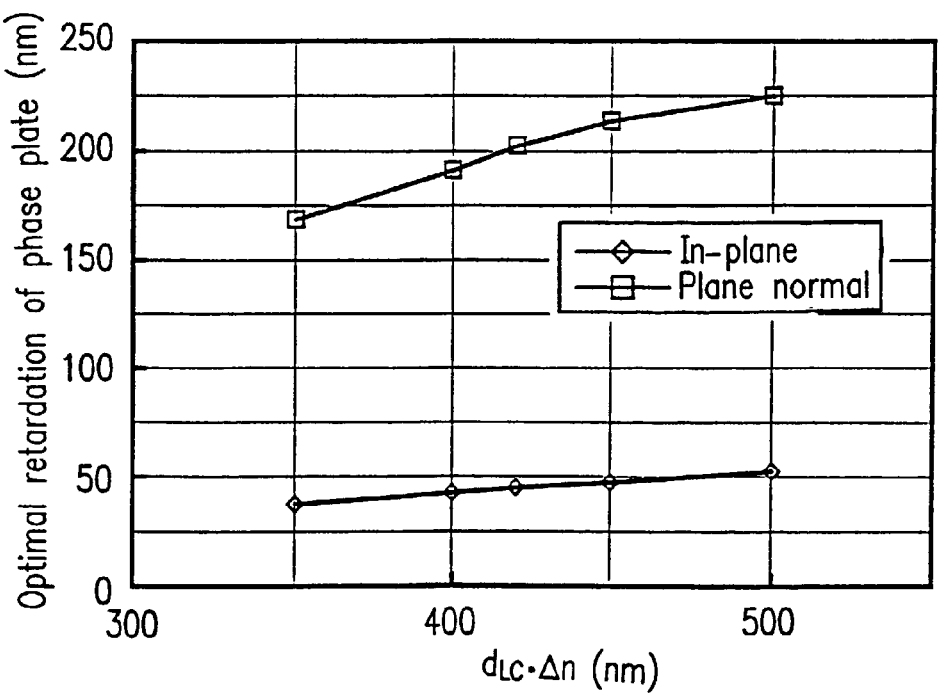
FIG. 50 is a graph illustrating the relationship between dLC·Δn (where dLC is fixed at about 5 μm, while varying Δn from about 0.07 to about 0.1) and the in-plane and plane-normal retardations of an optimal phase film (where the ratio of the refractive index difference in the in-plane direction and the refractive index difference in the thickness direction is set to about 4.5).

FIGS. 49 and 50 illustrate results obtained by evaluating, in the above-described simulations (1) and (2), respectively, the relationship between the retardation of the liquid crystal cell and the retardations respectively in the in-plane direction and in the plane normal direction of an optimized phase film (where the ratio of the refractive index difference in the in-plane direction and the refractive index difference in the thickness direction of the phase plate (phase film) is set to about 4.5). It can be seen from these figures that the optimal retardations in the in-plane direction and in the thickness direction increase as the value dLC·Δn increases.

The ratio of the retardation value df·(nx−ny) in the in-plane direction and the retardation value df·(nx−nz) in the thickness direction of the phase plate (or "refractive index difference ratio") is preferably greater than about 0, as shown in FIGS. 51 to 54. When the ratio of the retardation values is not about 0 (i.e., when the retardation value in the thickness direction (plane normal direction) is not about 0), there is provided a viewing angle compensation effect.

Figure 51:
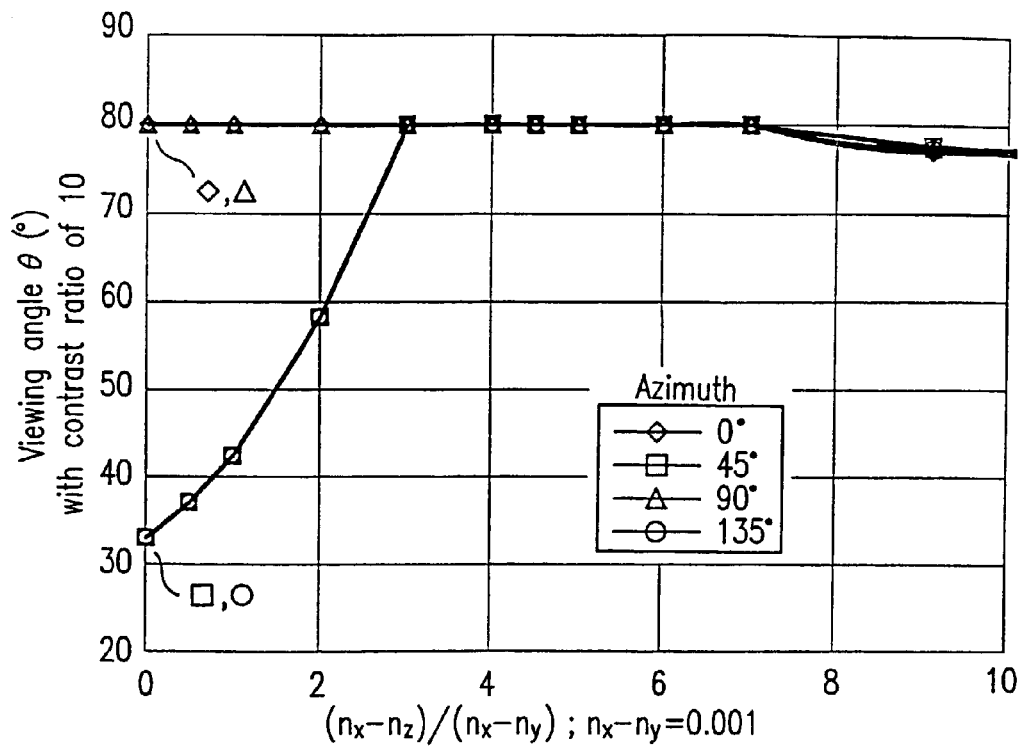
FIG. 51 is a graph illustrating the relationship between the ratio of the plane-normal refractive index difference to the in-plane refractive index difference (0.001) of the phase plate and the viewing angle with a contrast ratio of about 10, at different azimuths (Φ=0°, Φ=45°, Φ=90° and Φ=135°) with respect to the absorption axis of the polarizing plate.
Figure 53:
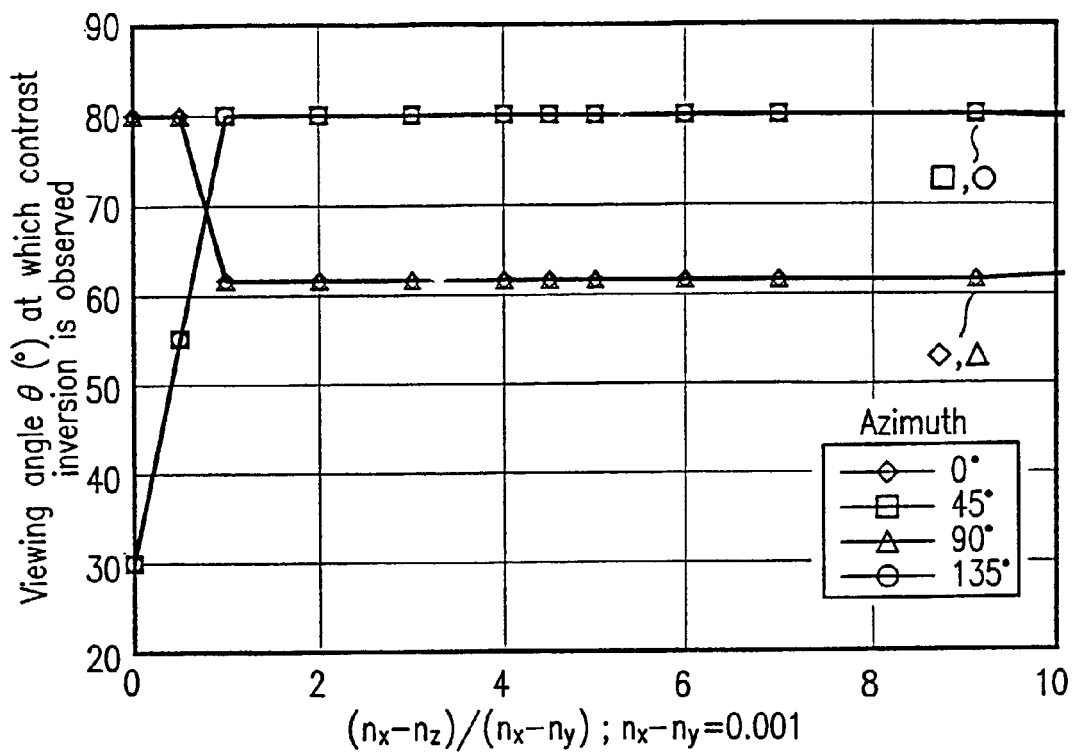
FIG. 53 is a graph illustrating the relationship between the ratio of the plane-normal refractive index difference to the in-plane refractive index difference (0.001) of the phase plate and the inversion angle, at different azimuths (Φ=0°, Φ32 45°, Φ=90° and Φ=135°) with respect to the absorption axis of the polarizing plate.
Figure 54:
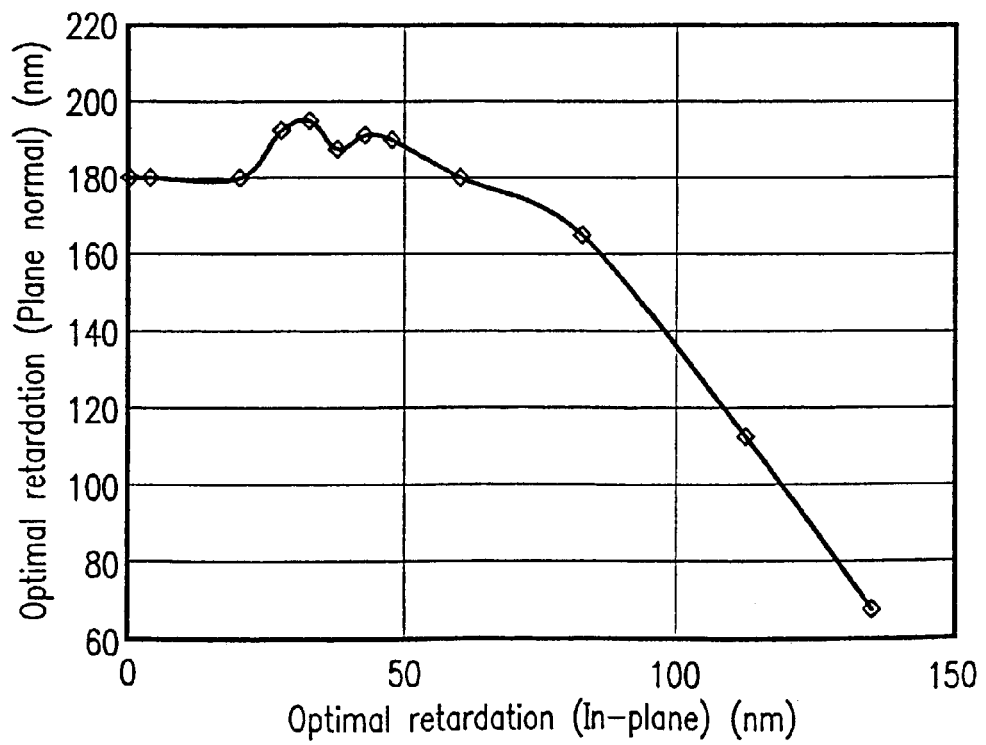
FIG. 54 is a graph illustrating the relationship between the in-plane retardation and the plane normal retardation of the phase plate in the liquid crystal cell whose dLC·Δn is about 390 nm, when varying the ratio of the plane-normal refractive index difference to the in-plane refractive index difference (0.001) of the phase plate.

Moreover, as illustrated in FIGS. 51 and 53, when the ratio of the refractive index difference in the in-plane direction and the refractive index difference in the thickness direction (i.e., retardation ratio) is about 2 or greater, it is possible to realize a satisfactory display where the contrast ratio is about 10 with the viewing angle being about 60° or greater.

In the above, the viewing angle is set to be about 60° or greater because a typical TN mode liquid crystal display device has a viewing angle of about 60°. The contrast ratio is set to be about 10 in the above because a typical wide viewing angle mode has a contrast ratio of about 10. Moreover, it is preferable to have a refractive index difference ratio of about 2.5 or greater in order to realize a viewing angle of about 70° or greater with a contrast ratio of about 10 in view of the IPS or VA modes.

Figure 52:
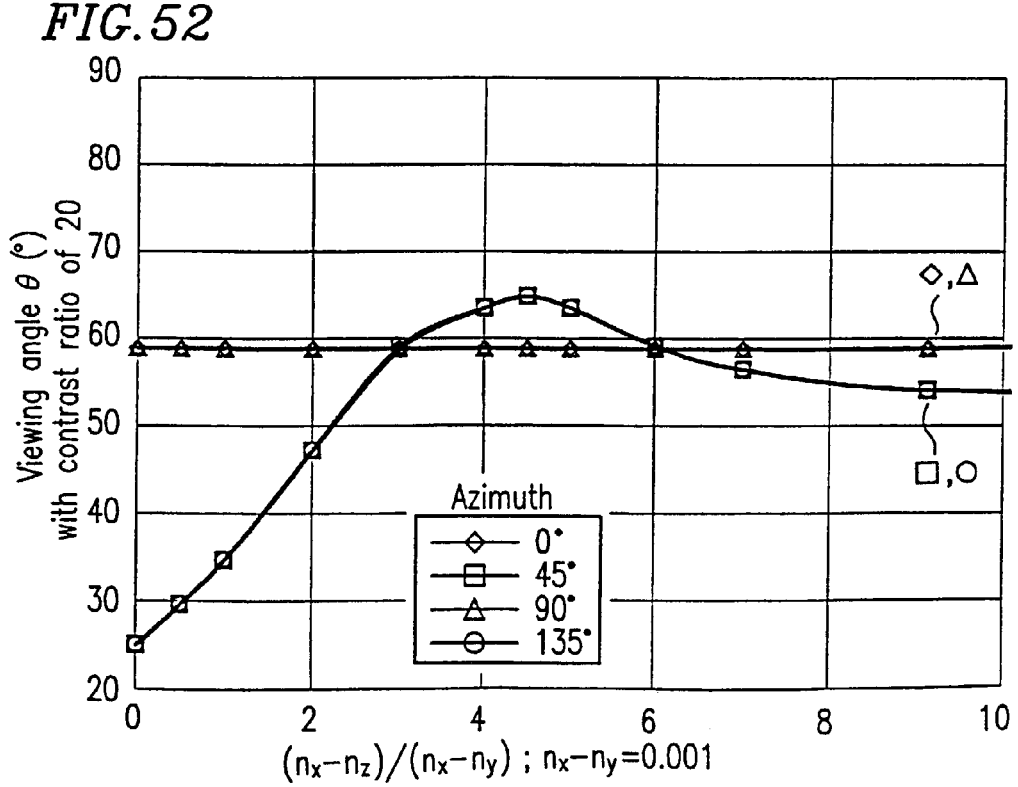
FIG. 52 is a graph illustrating the relationship between the ratio of the plane-normal refractive index difference to the in-plane refractive index difference (0.001) of the phase plate and the viewing angle with a contrast ratio of about 20, at different azimuths (Φ=0°, Φ=45°, Φ=90° and Φ=135°) with respect to the absorption axis of the polarizing plate.

Particularly, as illustrated in FIG. 52, when the refractive index difference ratio is in the range of about 3 to about 6, it is possible to realize an even better display where the contrast ratio is about 20 with the viewing angle being about 60° or greater. As can be seen from this graph, while the refractive index difference ratio is in the range of about 3 to about 6, the characteristic at Φ=45°, Φ=135° is superior to the characteristic at any other azimuth. Thus, in such a refractive index difference ratio range of about 3 to about 6, the viewing angle characteristic at Φ=45°, Φ=135° is improved, and a substantially circular viewing angle characteristic is realized.

In the above, the viewing angle is set to be about 60° or greater because a typical TN mode liquid crystal display device has a viewing angle of about 60°. The contrast ratio is set to be about 20 in the above example because a satisfactory display characteristic can be realized under a condition more stringent than that for a typical wide viewing angle mode.

(Vertical Alignment Layer)

The vertical alignment layer may be in any form as long as it has a surface for vertically aligning the liquid crystal molecules, and can be provided using either an inorganic or organic material. For example, a polyimide type material (JALS204: produced by Japan Synthetic Rubber Co., Ltd., or 1211: produced by Nissan Kagaku), an inorganic type material (EXP-OA003: produced by Nissan Kagaku Kogyo), or the like, may be used.

(Polarizing Plate)

When a pair of polarizing plates are provided in a crossed Nicols arrangement with a vertically oriented liquid crystal material being interposed therebetween, a satisfactory black state in the normally black mode and thus a high contrast display can be realized. For example, the polarizing plate can be: an iodic polarizing film, a dye polarizing film, or the like, obtained by adsorbing and orienting iodine or a hydrophilic polymer onto a hydrophilic polymer film (such as a polyvinyl alcohol film, a polyvinyl formal film, a polyvinyl acetal film and a poly (ethylene-acetic acid) copolymer saponified film); and a polyene polarizing film, or the like, obtained by orienting polyene by dehydrating a polyvinyl alcohol film or by removing hydrochloric acid from a polyvinyl chloride film.

By providing an antiglare layer on the surface of the polarizing plate, it is possible to further improve the viewing angle characteristic in a direction shifted by about 45° from the absorption axis direction. The antiglare layer is provided by performing an antiglare process on a hard coat layer. A binder resin used in the hard coat layer may be any kind of resin as long as it has a hard property and is transparent, e.g., a thermosetting resin, an ionizing radiation curable resin, or the like. The term "hard property" or "hard coat" as used herein refers to having a hardness equal to or greater than the grade "H" as defined in JISK5400 and used in the pencil hardness test.

For example, the thermosetting resin can be a phenol resin, a urea resin, a diallyl phthalate resin, a melamine resin, a guanamine resin, an unsaturated polyester resin, a polyurethane resin, an epoxy resin, an aminoalkyd resin, a melamine-urea cocondensation resin, a silicon resin, a polysiloxane resin, or the like.

The ionizing radiation curable resin includes those which can be cured by ion beam radiation or UV radiation. The ionizing radiation curable resin preferably has an acrylate functional group, and can be an oligomer, a prepolymer, or the like, of a resin of a relatively low molecular weight such as a polyester resin, a polyether resin, an acrylic resin, an epoxy resin, an urethane resin, an alkyd resin, a spiroacetal resin, a polybutadiene resin and a polythiol polyene resin, and an acrylate or a methacrylate of a polyfunctional compound such as a polyhydric alcohol. Preferably, a mixture of polyester acrylate and polyurethane acrylate is used.

The antiglare process performed on the hard coat layer is a process for forming minute undulations on the surface so that the ambient light is scattered around and will not be directly incident upon the viewer's eye. The process can be one using a mass film, or one adding a minute particle into a binder resin.

The method using a mass film may be performed as follows, for example. First, the ionizing radiation curable resin composition is applied on the surface of the polarizing plate, and a mat-like mass film having minute undulations is laminated on the applied, uncured film of the ionizing radiation curable resin composition. The film is then irradiated with ionizing radiation so as to completely cure the applied resin composition. When the mass film is removed therefrom, an antiglare layer having minute undulations thereon is produced.

The minute particle to be added into the binder resin can be a bead or a filler, e.g., an amorphous silica powder, a polycarbonate particle, an acrylate resin bead, a methacrylate resin bead, or the like.

By providing the antiglare layer on the surface of the polarizing plate and further providing a antireflection film (or antireflection coating layer) on the antiglare layer, it is possible to further improve the viewing angle characteristic in a direction shifted by about 45° from the absorption axis. The antireflection film reduces the amount of reflection light utilizing interference of light, and can be a layered film of dielectric thin films of an inorganic material, for example. For example, the inorganic material can be LiF, $MgF_2$, $3NaF·AlF_3$, $AlF_3$, $SiO_x$ (1.8<x<2.2), or the like. A gas phase method is preferably used for producing the thin film of an inorganic material (e.g., vacuum deposition method, sputtering, ion plating, plasma CVD, or the like).

Hereinafter, further examples of the present invention will be described. The present invention, however, is not limited to these examples.

EXAMPLE 5

Figure 55A:
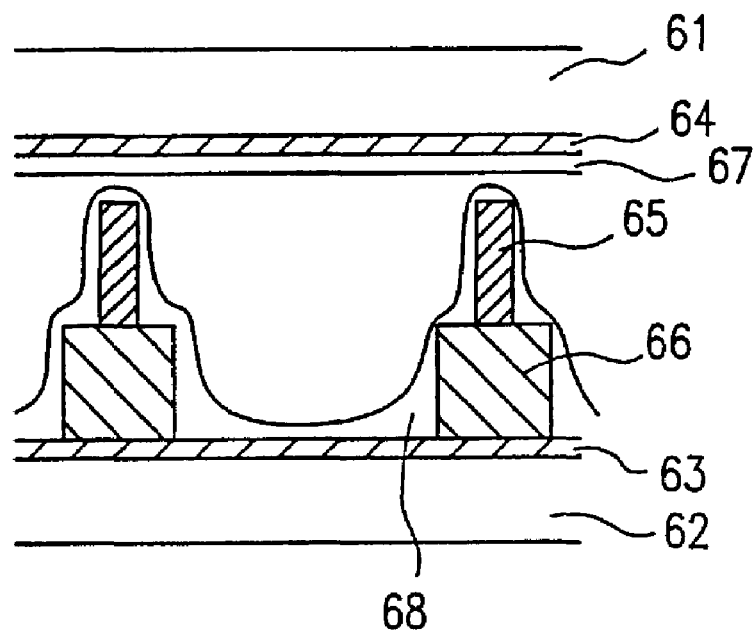
FIG. 55A is a cross-sectional view illustrating a liquid crystal display device according to Example 5 of the present invention.
Figure 55B:
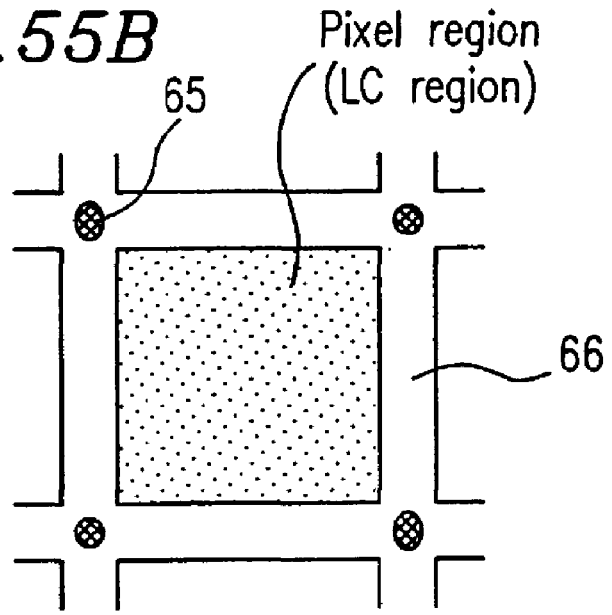
FIG. 55B is a plan view thereof.

Referring to FIGS. 55A and 55B, a method for producing a liquid crystal display device of Example 5 of the present invention will be described. FIG. 55A is a cross-sectional view illustrating a liquid crystal display device according to Example 5 of the present invention; and FIG. 55B is a plan view thereof.

First, a spacer 65 having a height of about 5 μm is formed outside a pixel region using a photosensitive polyimide on a transparent electrode 63 (e.g., ITO: about 100 nm) which is formed on a substrate 62. A protrusion 66 having a height of about 3 μm is then formed using an acrylic negative resist. The size of a region surrounded by the protrusion 66 (i.e., a pixel region) is about 100 μm×about 100 μm. JALS-204 (produced by Japan Synthetic Rubber Co., Ltd.) is spin-coated on the resultant structure, thereby forming a vertical alignment layer 68. Moreover, another vertical alignment layer 67 is formed on a transparent electrode 64 (ITO: about 100 μm) on another substrate 61 using the same material. The substrates are attached together, thus producing a liquid crystal cell.

An Nn type liquid crystal material ($\Delta\epsilon$=about −4.0; $\Delta n$=about 0.08; the twist angle inherent in the liquid crystal material is set to have a 90° twist within a cell gap of about 5 μm; retardation value $dLC \cdot \Delta n$=about 400 nm) is injected into the produced liquid crystal cell, and a voltage of about 7 V is applied thereto. In an initial state, immediately after the voltage application, there are a plurality of axially symmetric orientation axes. After a continued voltage application, each pixel region has a single axially symmetric orientation region (monodomain).

Figure 56A:
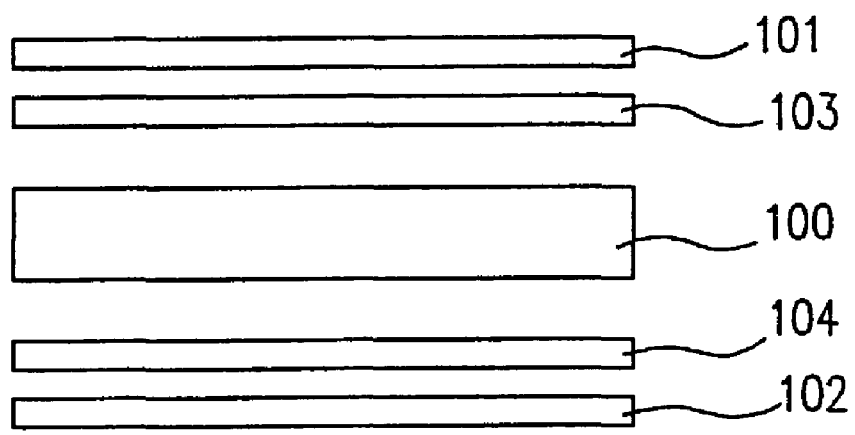
FIG. 56A is a diagram illustrating an arrangement of a liquid crystal cell, polarizing plates and phase plates according to Example 5 of the present invention.
Figure 56B:
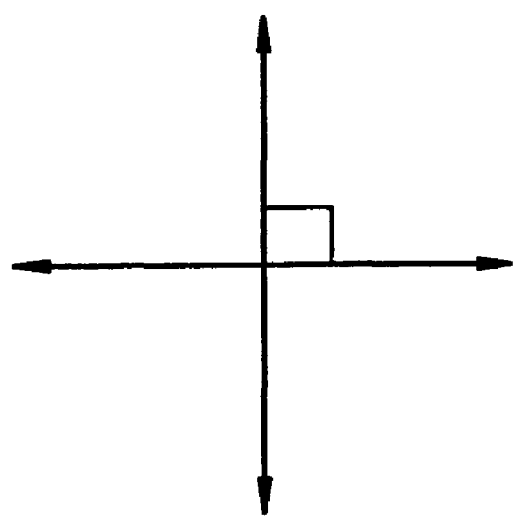
FIG. 56B is a diagram illustrating the relationship between the direction of the absorption axis and the direction of nx, being the greatest one of the three principal refractive indices.

Then, the polarizing plates 101 and 102 and the phase plates 103 and 104 are provided on respective sides of the liquid crystal cell 100, as illustrated in FIG. 56A, thereby completing the liquid crystal display device. FIG. 56A illustrates an arrangement of the liquid crystal cell, the polarizing plates and the phase plates in the present example. FIG. 56B is a diagram illustrating the relationship between the direction of the absorption axis and the direction of nx, being the greatest one of the three principal refractive indices (i.e., the slower axis). As illustrated in FIG. 56A, the upper polarizing plate 101 and the lower polarizing plate 102 are provided on the respective sides of the liquid crystal cell 100 so that the respective absorption axes are perpendicular to each other. The first phase plate 103 is provided between the upper polarizing plate 101 and the liquid crystal cell 100, and the second phase plate 104 is provided between the lower polarizing plate 102 and the liquid crystal cell 100. The first phase plate 103 and the second phase plate 104 are each a phase plate as illustrated in FIG. 36. In this example, the retardation value df·(nx−ny) in the in-plane direction is set to about 42 nm, and the retardation value df·(nx−nz) in the thickness direction is set to about 170 nm.

In the resultant liquid crystal display device, the vertical alignment layer 68 has a bowl-like cross section such as that shown in FIG. 55A. Referring to FIG. 55A, the differential coefficient of the curve corresponding to the thickness of the alignment layer 68 varying from the center of the pixel toward the periphery is positive, while the differential coefficient of the curve corresponding to the thickness of the liquid crystal layer varying within the pixel region is negative.

The axially symmetric orientation of the liquid crystal cell is stable as long as a voltage of about ½ Vth or greater is applied. When the voltage is reduced below about ½ Vth, the liquid crystal molecules return from the axially symmetric orientation back to the initial state. When a voltage is applied again, after the initial state (where there are a plurality of central axes of axially symmetric orientation), the axially symmetric orientation where there is only one central axis in each pixel region is obtained. This phenomenon has been confirmed by an experiment, where the above happened in the same way in 20 iterations.

In order to measure the electro-optical characteristics of the liquid crystal cell of Example 5, a voltage of about ½ Vth or greater was applied to reach the axially symmetric state, after which the electro-optical characteristics were measured using a voltage in a range (about ½ Vth or greater) where the axially symmetric orientation is stable.

Figure 57:
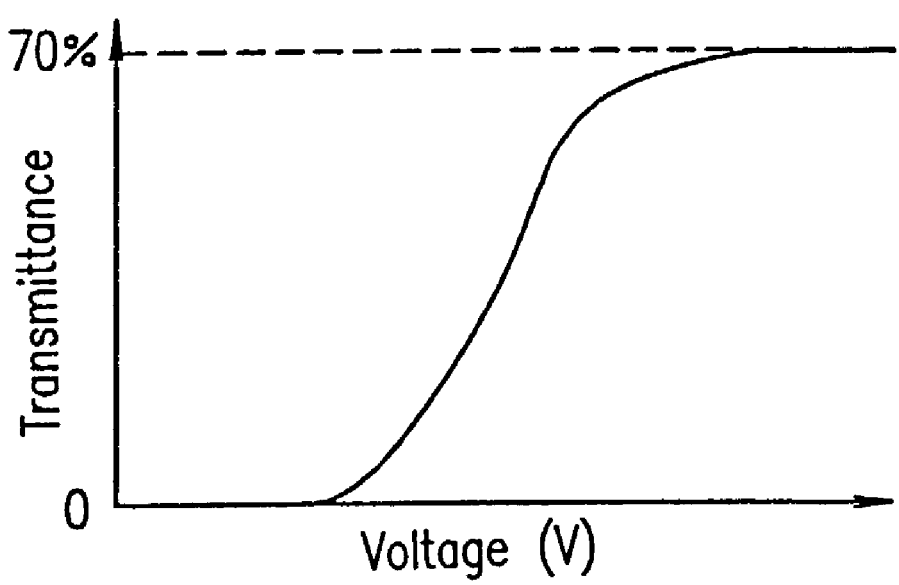
FIG. 57 is a graph illustrating the electro-optical characteristics of the liquid crystal display device of Example 5.

FIG. 57 shows the electro-optical characteristics of the liquid crystal display device of Example 5. As can be seen from FIG. 57, in the liquid crystal display device of Example 5, the transmittance in an OFF state was low, and a satisfactory contrast ratio (CR=about 300:1, at about 5V) was obtained.

Figure 58:
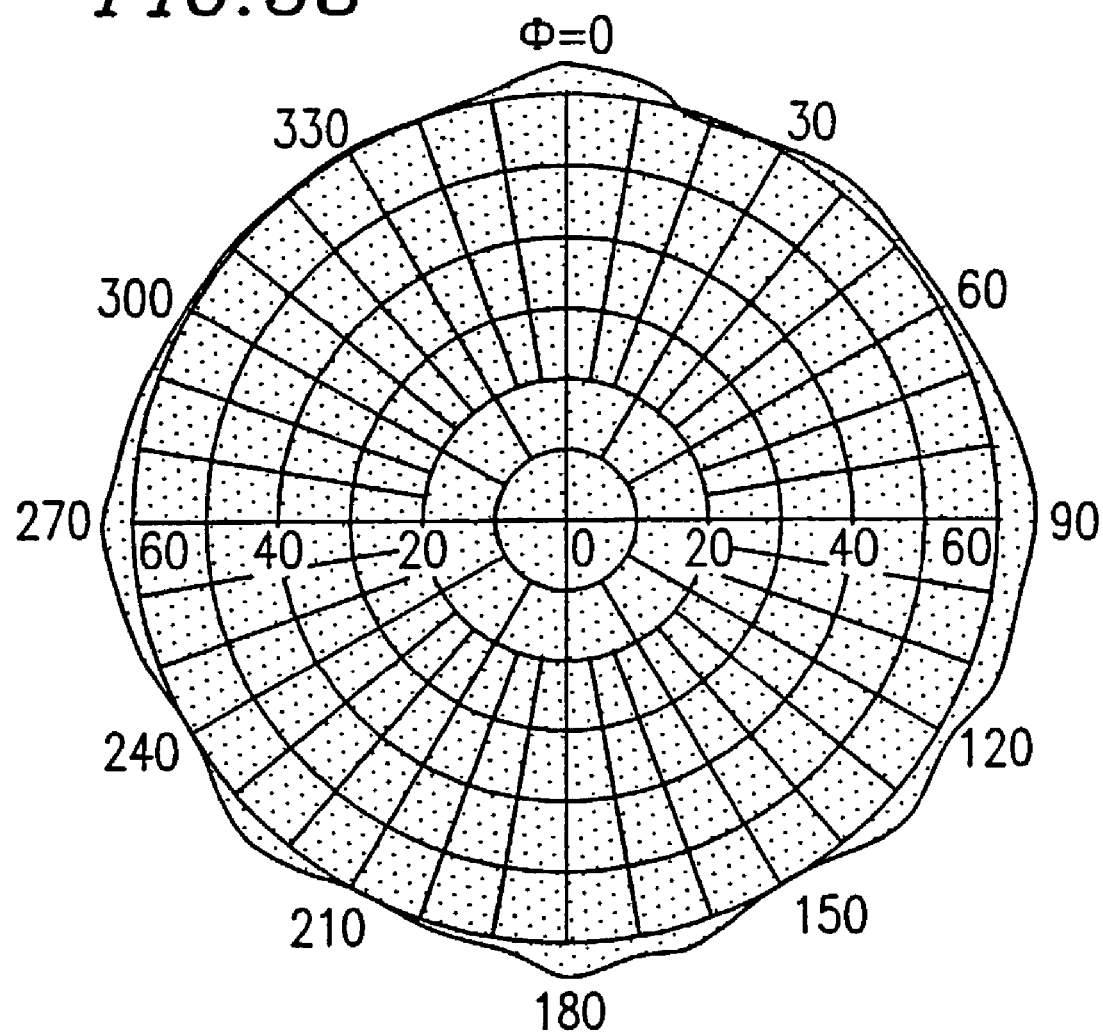
FIG. 58 is a graph illustrating the viewing angle characteristic of the contrast of the liquid crystal display device according to Example 5.

FIG. 58 shows the viewing angle characteristic of the contrast of the liquid crystal display device according to Example 5. In FIG. 58, $\Phi$ denotes the azimuth (angle in a display plane), $\theta$ denotes the viewing angle (angle inclined from a direction normal to the display plane), and a hatched area represents an area where the contrast ratio is about 20:1 or greater. FIG. 58 shows that a high contrast ratio is obtained over a wide viewing angle including a direction shifted by about 45° from the absorption axis of the polarizing plate (which is usually a direction in which the viewing angle characteristic is particularly poor), and shows a substantially circular viewing angle characteristic.

EXAMPLE 6

In Example 6, a liquid crystal cell as illustrated in FIGS. 55A and 55B is produced in a similar manner as that of Example 5, and the polarizing plates 101 and 102 and the phase plates 103 and 104 are provided on respective sides of the liquid crystal cell 100, as shown in FIGS. 56A and 56B (as in Example 5), thereby completing the liquid crystal display device. In Example 6, however, an Nn type liquid crystal material ($\Delta\epsilon$=about −3.3; $\Delta n$=about 0.773; the twist angle inherent in the liquid crystal material is set to have a 90° twist within a cell gap of about 6 μm; retardation value $dLC \cdot \Delta n$=about 450 nm) is injected into the produced liquid crystal cell.

FIG. 59 shows the electro-optical characteristics of the liquid crystal display device of Example 6 measured as in Example 5. In Example 6, however, the viewing angle and the azimuth were fixed respectively at $\theta$=about 40° and $\Phi$=about 45°, while varying the in-plane retardation value df·(nx−ny) of the phase plate. FIG. 59 shows that the contrast ratio is about 10 or greater when df·(nx−ny) is in a range of about 16.0 nm to about 65.0 nm (corresponding to a range of about 3.5% to about 15% of the retardation value $dLC \cdot \Delta n$ of the liquid crystal layer). The contrast ratio took its maximum value at df·(nx−ny)=about 42.5 nm (corresponding to about 9.5% of $dLC \cdot \Delta n$). Moreover, a result similar to that shown in FIG. 59 was obtained when the viewing angle and the azimuth were fixed respectively at $\theta$= about 40° and Φ=about 135°, while varying the in-plane retardation value df·(nx−ny) of the phase plate.

COMPARATIVE EXAMPLE 5

Hereinafter, Comparative Example 5 for Example 5 of the present invention will be described.

In Comparative Example 5, a liquid crystal cell having substantially the same structure as that illustrated in FIGS. 55A and 55B (Example 5) is used. A pair of polarizing plates are provided on the respective sides of the liquid crystal cell so that the respective absorption axes are perpendicular to each other. In Comparative Example 5, however, no phase compensation element is used.

Figure 60:
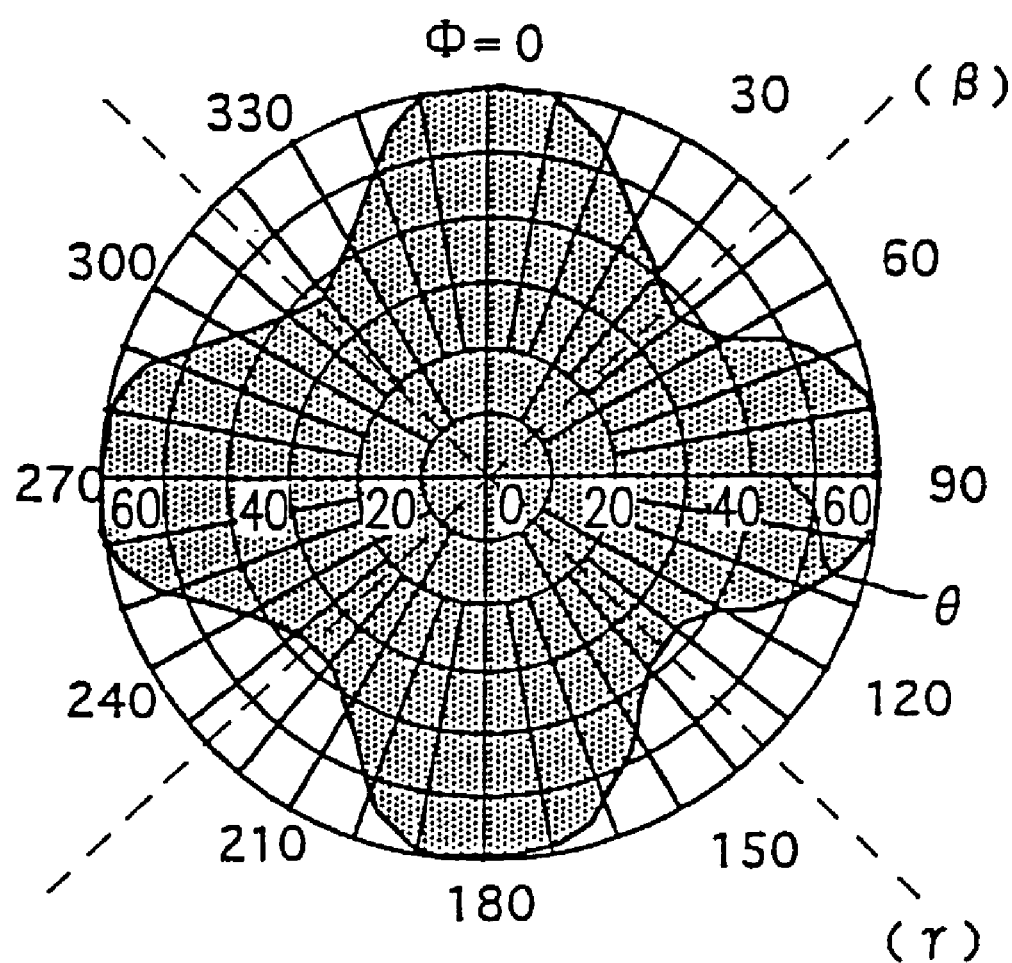
FIG. 60 is a graph illustrating the viewing angle characteristic of the contrast of the liquid crystal display device according to Comparative Example 5.

FIG. 60 shows the viewing angle characteristic of the contrast of the liquid crystal display device according to Comparative Example 5. In FIG. 60, Φ denotes the azimuth (angle in a display plane), θ denotes the viewing angle (angle inclined from a direction normal to the display plane), and a hatched area represents an area where the contrast ratio is about 10:1 or greater. FIG. 60 shows that the viewing angle characteristic is poor in a direction shifted by about 45° from the absorption axis of the polarizing plate (i.e., a direction indicated as (β) or (γ) in FIG. 60). Particularly, the contrast considerably deteriorates as the viewing angle is about 35° or greater.

COMPARATIVE EXAMPLE 6

Hereinafter, Comparative Example 6 for Example 5 of the present invention will be described.

In Comparative Example 6, a liquid crystal cell having substantially the same structure as that illustrated in FIGS. 55A and 55B (Example 5) is used. A pair of polarizing plates are provided on the respective sides of the liquid crystal cell so that the respective absorption axes are perpendicular to each other. Moreover, a first phase plate is provided between the upper phase plate and the liquid crystal cell, and a second phase plate is provided between the lower polarizing plate and the liquid crystal cell. In Comparative Example 6, the first and second phase plates are so-called "frisbee" type phase plates, where nx=ny, and the retardation value df·(nx−nz) in the thickness direction is set to about 150 nm.

Figure 61:
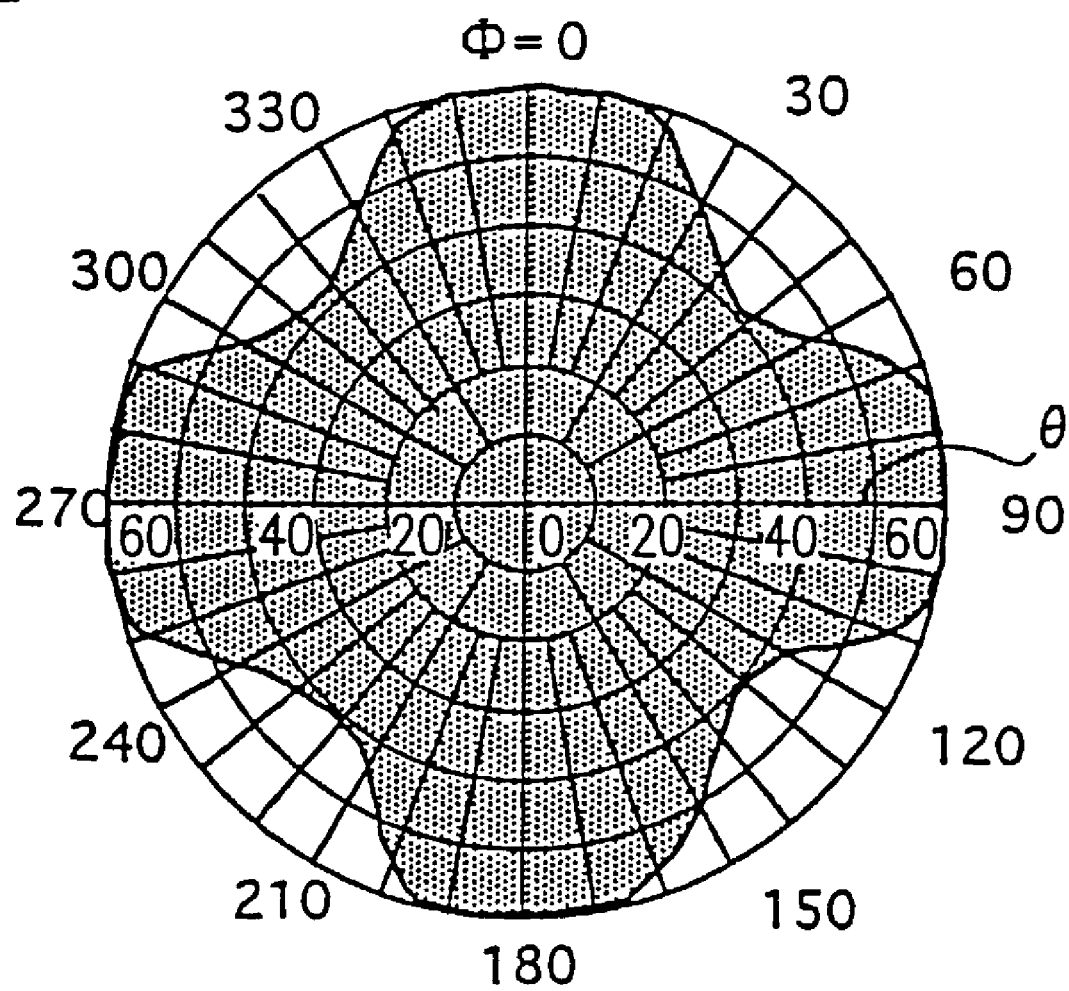
FIG. 61 is a graph illustrating the viewing angle characteristic of the contrast of the liquid crystal display device according to Comparative Example 6.

FIG. 61 shows the viewing angle characteristic of the contrast of the liquid crystal display device according to Comparative Example 6. In FIG. 61, Φ denotes the azimuth (angle in a display plane), θ denotes the viewing angle (angle inclined from a direction normal to the display plane), and a hatched area represents an area where the contrast ratio is about 10:1 or greater. FIG. 61 shows that the viewing angle characteristic is slightly improved in a direction shifted by about 45° from the absorption axis of the polarizing plate (as compared to that of Comparative Example 5). However, the contrast considerably deteriorates as the viewing angle is about 40° or greater.

EXAMPLE 7

In Example 7, a liquid crystal cell as illustrated in FIGS. 55A and 55B is produced in a similar manner to that of Example 5, and the polarizing plates 101 and 102 and the phase plates 103 and 104 are provided on respective sides of the liquid crystal cell 100, as shown in FIG. 56 (as in Example 5), thereby completing the liquid crystal display device. In Example 7, an antiglare layer having a haze of about 3.5% and a glossiness of about 80% is provided on the surface of the polarizing plate 101.

Figure 62A:
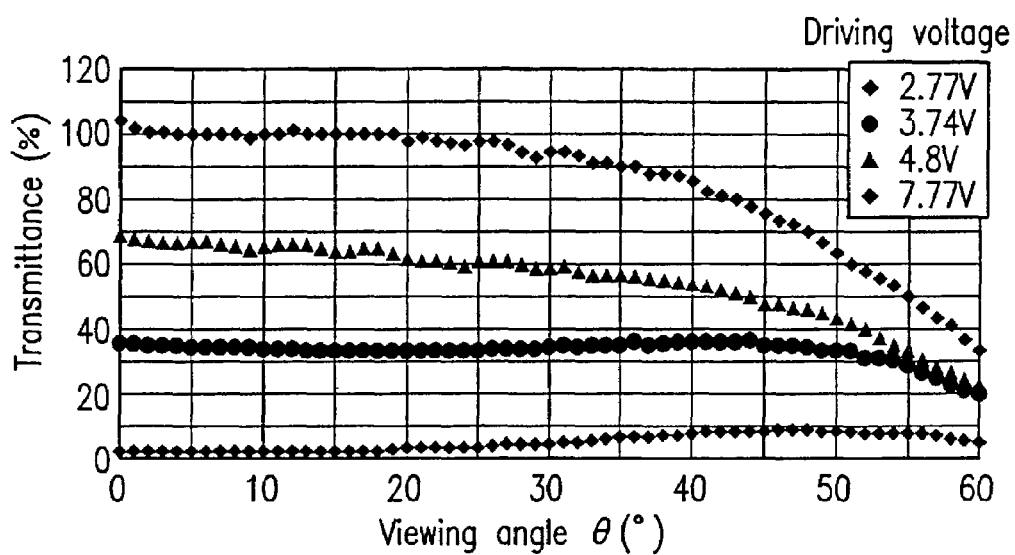
FIGS. 62A and 62B each show the gray-scale characteristic of a 4 gray-scale level display of a liquid crystal display device of Example 7, where.
Figure 62B:
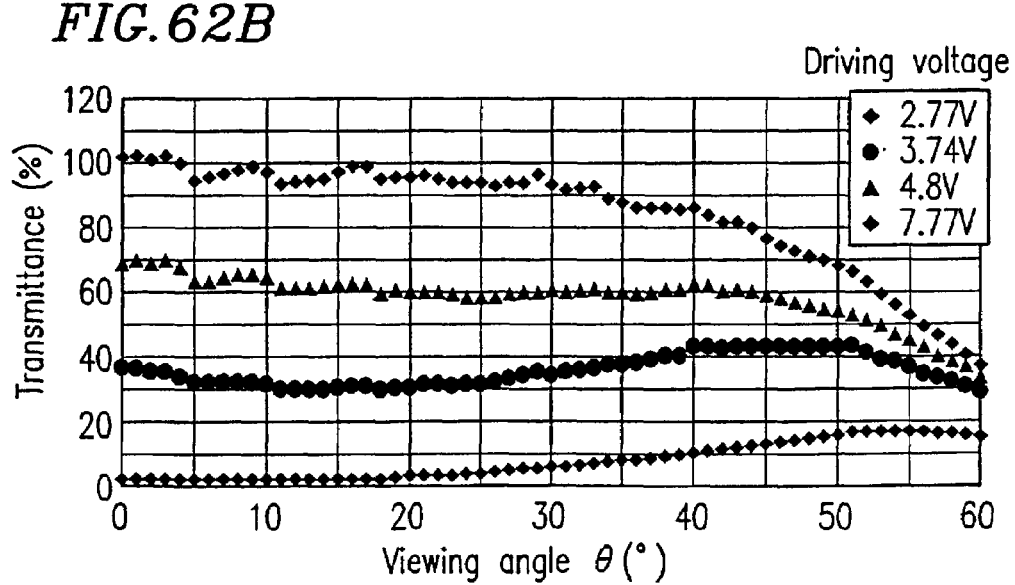
Figure 63A:
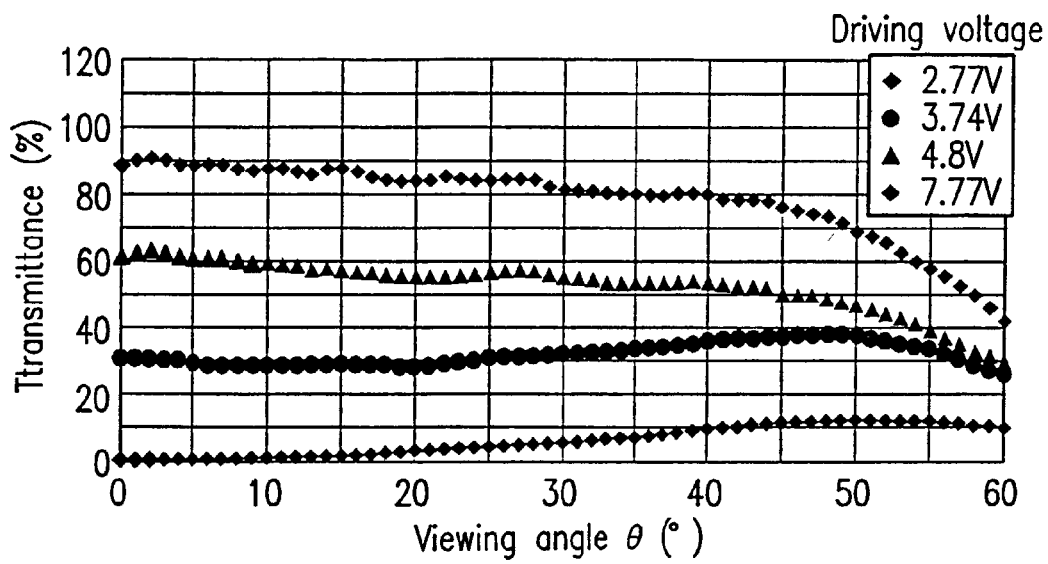
FIGS. 63A and 63B each show the gray-scale characteristic of a 4 gray-scale level display of a liquid crystal display device of Example 5, where.
Figure 63B:
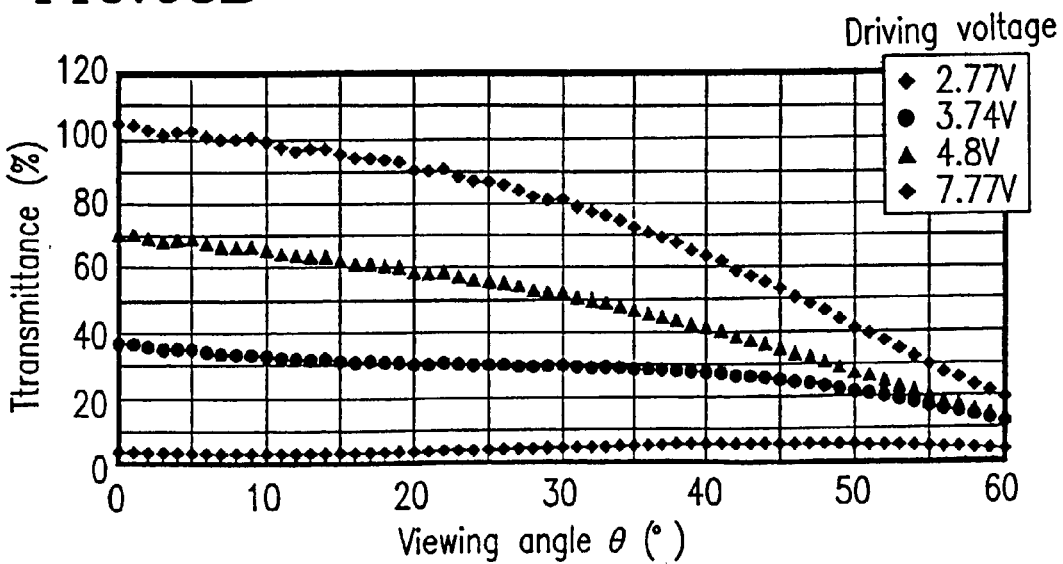

FIGS. 62A and 62B each show the gray-scale characteristic of a 4 gray-scale level display (driving voltages: about 2.77 V, about 3.74 V, about 4.8 V and about 7.77 V) of the liquid crystal display device of Example 7. FIG. 62A shows the gray-scale characteristic in a direction of the absorption axis of the upper polarizing plate 101; and FIG. 62B shows the gray-scale characteristic in a direction shifted by about 45° from the absorption axis of the upper polarizing plate 101. For comparison, FIGS. 63A and 63B each show the grayscale characteristic of a 4 gray-scale level display (driving voltages: about 2.77 V, about 3.74 V, about 4.8 V and about 7.77 V) of the liquid crystal display device of Example 5. FIG. 63A shows the gray-scale characteristic in a direction of the absorption axis of the upper polarizing plate 101; and FIG. 63B shows the gray-scale characteristic in a direction shifted by about 45° from the absorption axis of the upper polarizing plate 101.

FIGS. 62A, 62B, 63A and 63B show that the increase in the black level, which normally occurs when the viewing angle is inclined, is suppressed by the antiglare layer provided on the phase plate. Particularly, the increase in the black level at θ=about 60° (shifted from 45° from the absorption axis) is considerably suppressed, thereby improving the contrast ratio and the viewing angle characteristic.

EXAMPLE 8

In Example 8, a liquid crystal cell as illustrated in FIGS. 55A and 55B is produced in a similar manner to that of Example 7, and the polarizing plates 101 and 102 and the phase plates 103 and 104 are provided on respective sides of the liquid crystal cell 100, as shown in FIGS. 56A and 56B (as in Example 7), thereby completing the liquid crystal display device. In Example 8, an antiglare layer having a haze of about 13% and a glossiness of about 40% is provided on the surface of the polarizing plate 101.

Figure 64A:
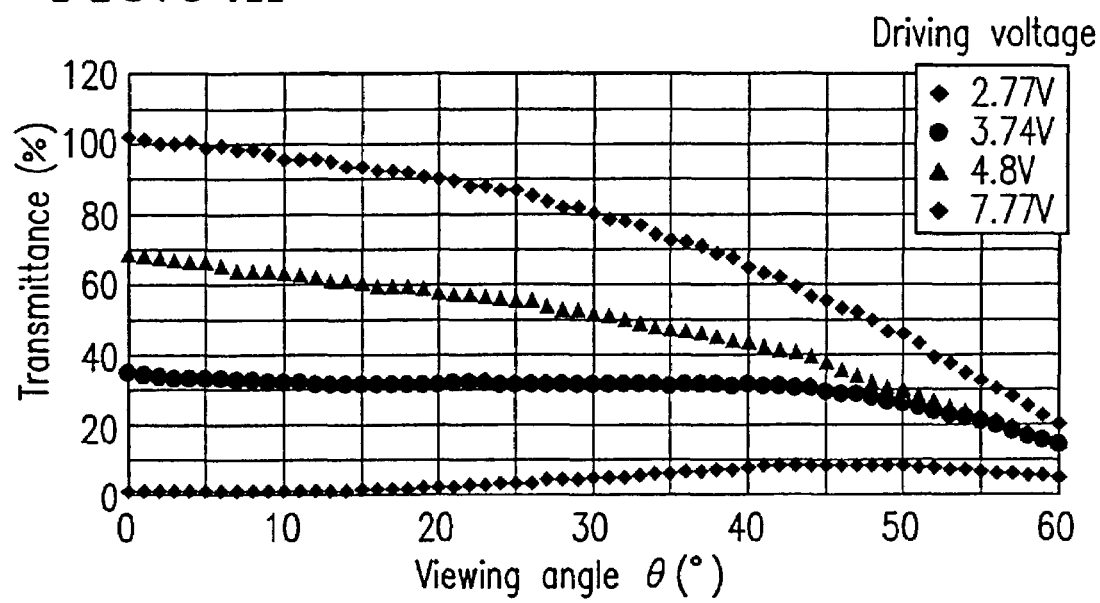
FIGS. 64A and 64B each show the gray-scale characteristic of a 4 gray-scale level display of a liquid crystal display device of Example 8, where.
Figure 64B:
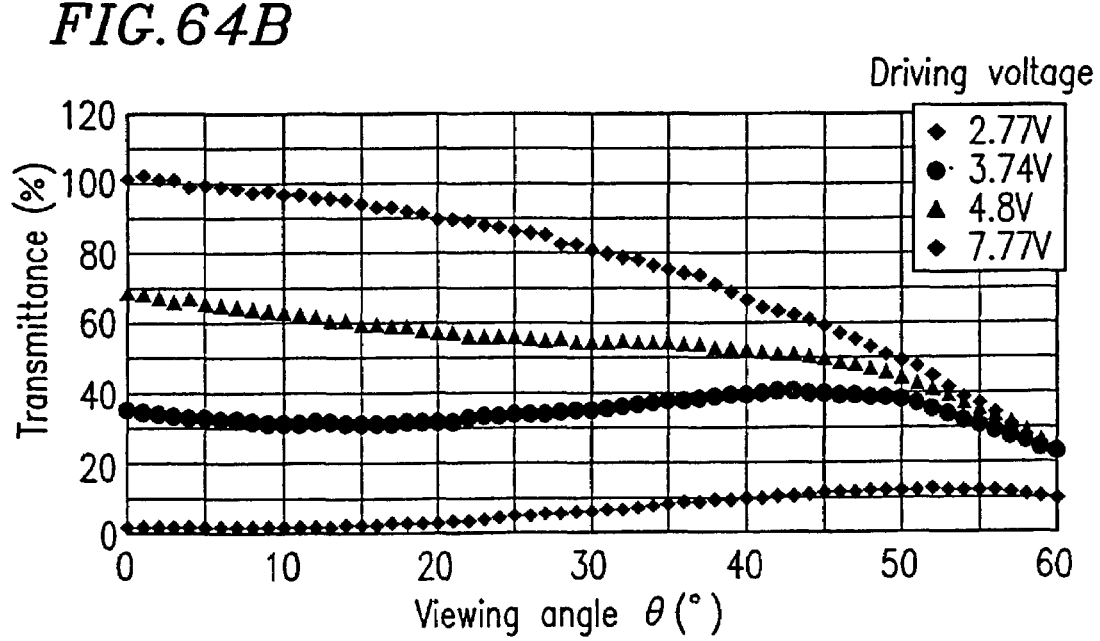

FIGS. 64A and 64B each show the gray-scale characteristic of a 4 gray-scale level display (driving voltages: about 2.77 V, about 3.74 V, about 4.8 V and about 7.77 V) of the liquid crystal display device of Example 8. FIG. 64A shows the gray-scale characteristic in a direction of the absorption axis of the upper polarizing plate 101; and FIG. 64B shows the gray-scale characteristic in a direction shifted by about 45° from the absorption axis of the upper polarizing plate 101.

FIGS. 64A and 64B show that the increase in the black level, which normally occurs when the viewing angle is inclined, is suppressed by the antiglare layer provided on the phase plate, as in Example 7. Particularly in Example 8 the increase in the black level at θ=about 60° (shifted from 45° from the absorption axis) is more considerably suppressed, as compared to Example 7, thereby further improving the contrast ratio and the viewing angle characteristic.

EXAMPLE 9

In Example 9, a liquid crystal cell as illustrated in FIGS. 55A and 55B is produced in a similar manner to that of Example 7, and the polarizing plates 101 and 102 and the phase plates 103 and 104 are provided on respective sides of the liquid crystal cell 100, as shown in FIGS. 56A and 56B (as in Example 7), thereby completing the liquid crystal display device. In Example 9, an antiglare layer having a haze of about 3.5% and a glossiness of about 80% is provided on the surface of the polarizing plate 101, and an antireflection film is further provided on the antiglare layer.

Figure 65A:
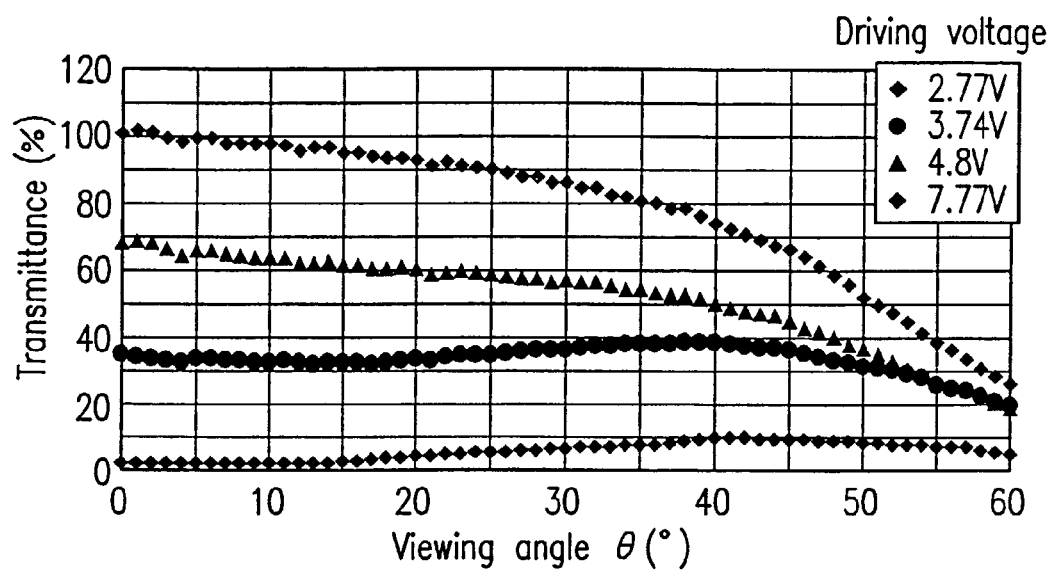
FIGS. 65A and 65B each show the gray-scale characteristic of a 4 gray-scale level display of a liquid crystal display device of Example 9, where.
Figure 65B:
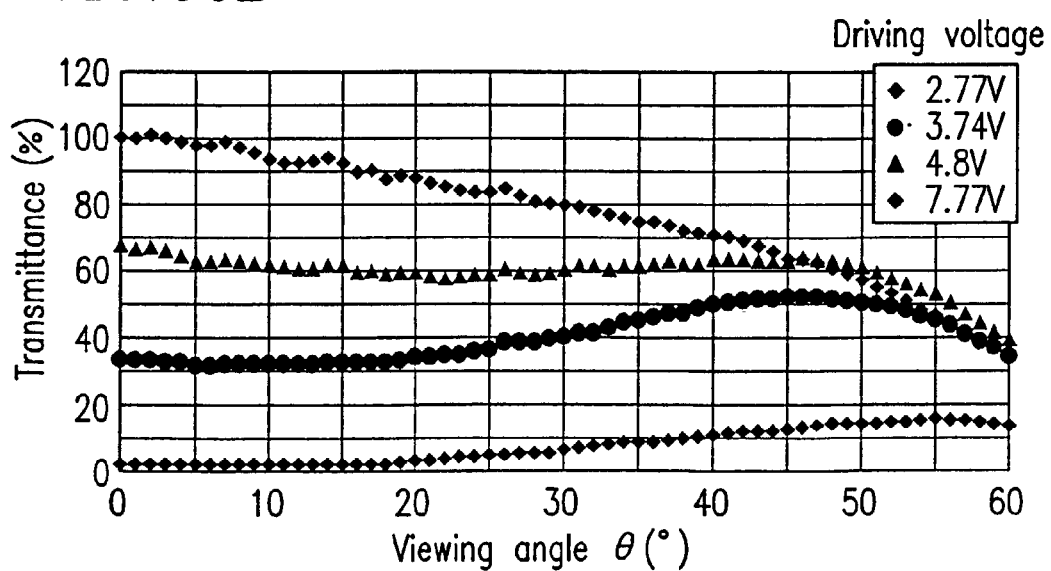

FIGS. 65A and 65B each show the gray-scale characteristic of a 4 gray-scale level display (driving voltages: about 2.77 V, about 3.74 V, about 4.8 V and about 7.77 V) of the liquid crystal display device of Example 9. FIG. 65A shows the gray-scale characteristic in a direction of the absorption axis of the upper polarizing plate 101; and FIG. 65B shows the gray-scale characteristic in a direction shifted by about 45° from the absorption axis of the upper polarizing plate 101.

FIGS. 65A and 65B show that the increase in the black level, which normally occurs when the viewing angle is inclined, is suppressed more than Example 7 by the antireflection film further provided on the antiglare layer, thereby further improving the contrast ratio and the viewing angle characteristic.

EXAMPLE 10

In Example 10, a liquid crystal cell as illustrated in FIGS. 55A and 55B is produced in a similar manner to that of Example 7, and the polarizing plates 101 and 102 and the phase plates 103 and 104 are provided on respective sides of the liquid crystal cell 100, as shown in FIGS. 56A and 56B (as in Example 7), thereby completing the liquid crystal display device. In Example 10, an antiglare layer having a haze of about 13% and a glossiness of about 40% is provided on the surface of the polarizing plate 101, and an antireflection film is further provided on the antiglare layer.

Figure 66A:
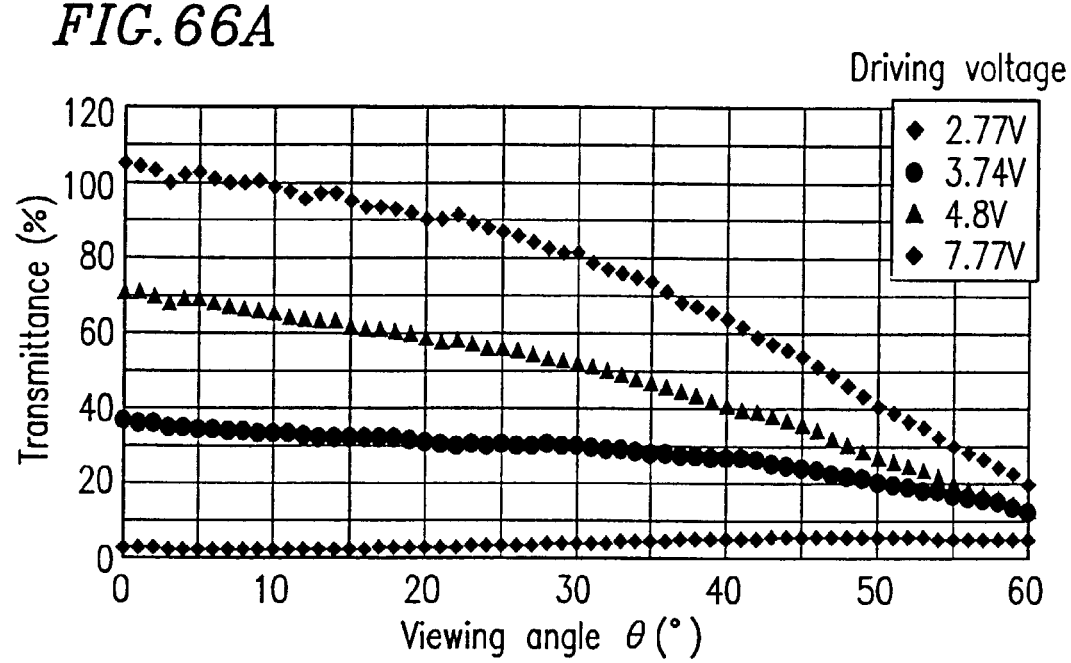
FIGS. 66A and 66B each show the gray-scale characteristic of a 4 gray-scale level display of a liquid crystal display device of Example 10, where.
Figure 66B:
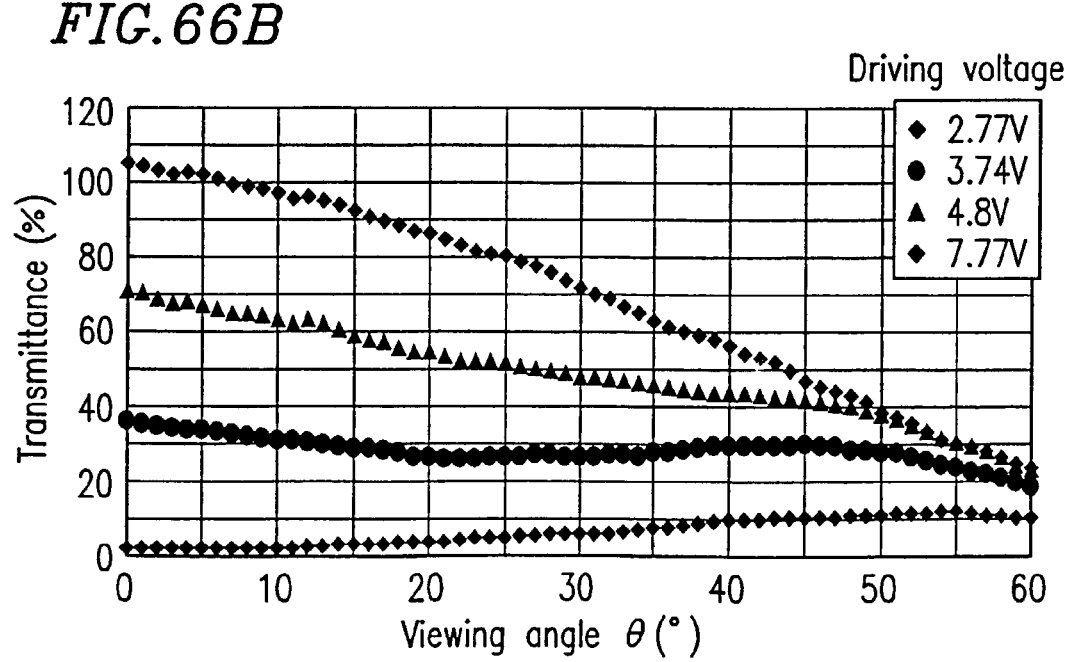

FIGS. 66A and 66B each show the gray-scale characteristic of a 4 gray-scale level display (driving voltages: about 2.77 V, about 3.74 V, about 4.8 V and about 7.77 V) of the liquid crystal display device of Example 9. FIG. 66A shows the gray-scale characteristic in a direction of the absorption axis of the upper polarizing plate 101; and FIG. 66B shows the gray-scale characteristic in a direction shifted by about 45° from the absorption axis of the upper polarizing plate 101.

FIGS. 66A and 66B show that the increase in the black level, which normally occurs when the viewing angle is inclined, is suppressed more than Example 8 by the antireflection film further provided on the antiglare layer, thereby further improving the contrast ratio and the viewing angle characteristic.

EXAMPLE 11

Figure 67:
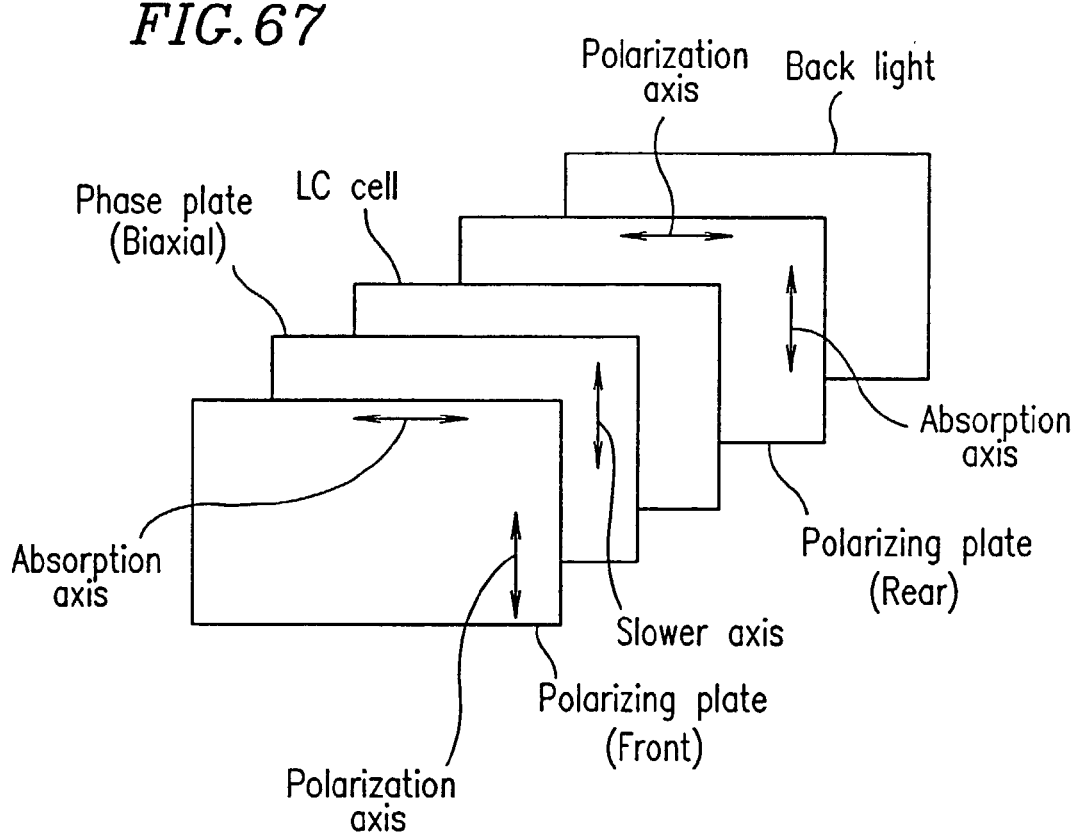
FIG. 67 is a diagram illustrating an arrangement of a liquid crystal cell, polarizing plates and phase plates according to Example 11 of the present invention.

Referring to FIG. 67, a method for producing a liquid crystal display device of Example 11 of the present invention will be described. The liquid crystal cell of the present example has a structure similar to that of the liquid crystal cell illustrated in FIGS. 55A and 55B. Therefore, Example 11 will be described also referring to FIGS. 55A and 55B.

First, a spacer having a height of about 6 μm is formed outside a pixel region using a photosensitive polyimide on a transparent electrode (e.g., ITO: about 100 nm) which is formed on a substrate. A protrusion 66 having a height of about 3 μm is then formed using an acrylic negative resist. The size of a region surrounded by the protrusion 66 (i.e., a pixel region) is about 100 μm×about 100 μm. JALS-204 (produced by Japan Synthetic Rubber Co., Ltd.) is spin-coated on the resultant structure, thereby forming a vertical alignment layer 68. Moreover, another vertical alignment layer 67 is formed on a transparent electrode 64 (ITO: about 100 μm) on another substrate 61 using the same material. The substrates are attached together, thus producing a liquid crystal cell.

An Nn type liquid crystal material (Δε=about −3.0; Δn=about 0.073; the twist angle inherent in the liquid crystal material is set to have a 90° twist within a cell gap of about 6 μm; retardation value dLC·Δn=about 450 nm) is injected into the produced liquid crystal cell, and a voltage of about 7 V is applied. In an initial state, immediately after the voltage application, there are a plurality of axially symmetric orientation axes. After a continued voltage application, each pixel region has a single axially symmetric orientation region (monodomain).

Then, polarizing plates and phase plates are provided on respective sides of the liquid crystal cell, as illustrated in FIG. 67, thereby completing the liquid crystal display device. FIG. 67 illustrates an arrangement of the liquid crystal cell, the polarizing plates and the phase plates in the present example, also illustrating the relationship between the direction of the absorption axis and the direction of nx, being the greatest one of the three principal refractive indices (i.e., the slower axis). As illustrated in FIG. 67, the upper polarizing plate and the lower polarizing plate are provided on the respective sides of the liquid crystal cell so that the respective absorption axes are perpendicular to each other. A phase plate is provided between the upper polarizing plate and the liquid crystal cell. The phase plate of the present example is formed using a polycarbonate material and the biaxial stretching method. In this example, the retardation value df·(nx−ny) in the in-plane direction is set to about 42 nm, and the retardation value df·(nx−nz) in the thickness direction is set to about 191 nm.

The difference from the other examples is that the phase plate is provided only on one side of the liquid crystal cell. Although, a phase plate having retardations respectively along two axial directions is used as the phase plate in the present example, the present invention is not limited thereto. Any other phase plate can alternatively be used as long as the entire liquid crystal display device has retardations respectively along two directions (i.e., the refractive indices nx, ny and nz, respectively) along x, y and z axes satisfy following expressions: $nz<(nx+ny)/2$; and $nx \neq ny$.

Figure 68:
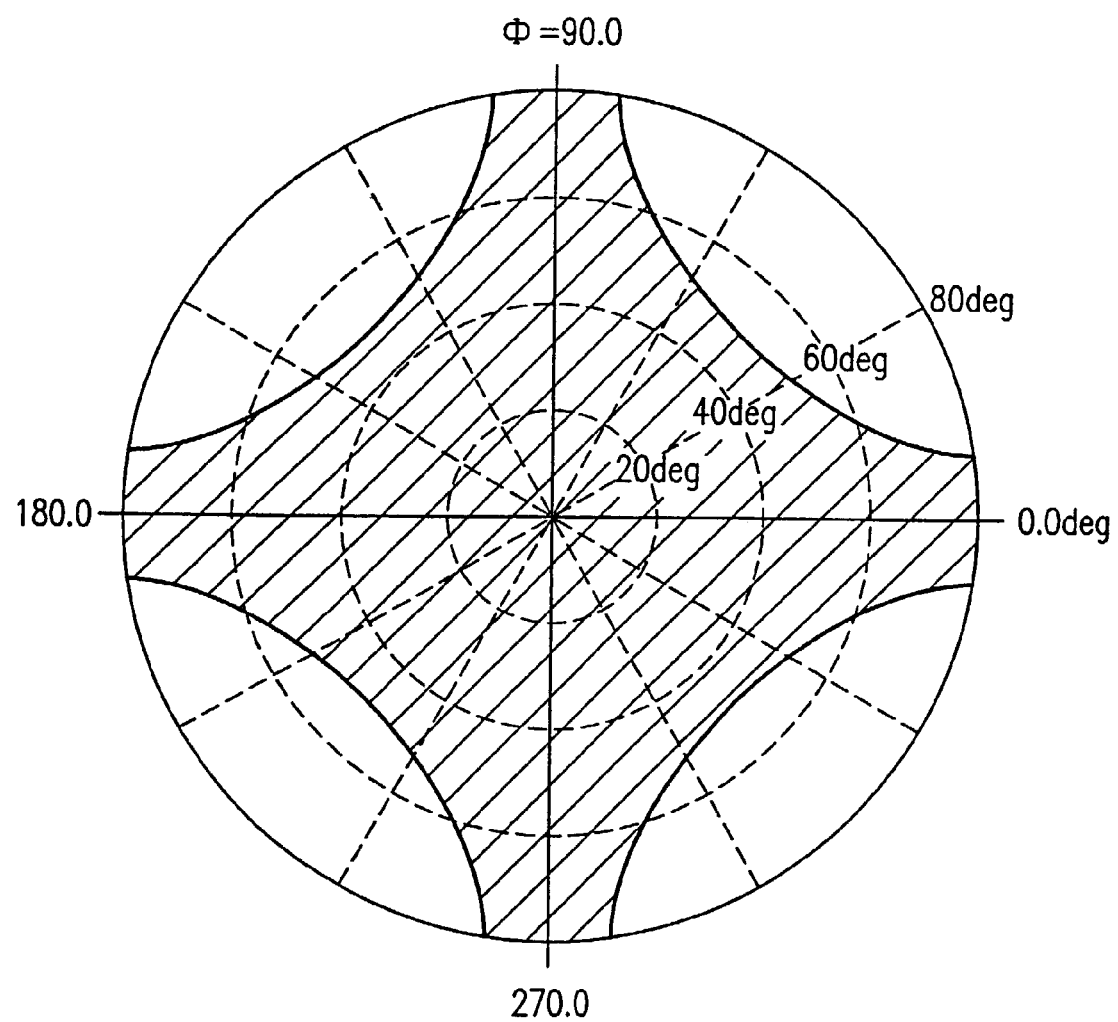
FIG. 68 is a graph illustrating the viewing angle characteristic of the contrast of the liquid crystal display device according to Example 11 of the present invention.

FIG. 68 shows the viewing angle characteristic of the contrast ratio of the liquid crystal display device of the present example. The hatched area represents an area where the contrast ratio is about 10:1 or greater. Due to the effect of the polarizing plates provided in a crossed Nicols arrangement in the liquid crystal display device of the present example, the viewing angle in which a contrast ratio is about 10 or greater increases to about 1.7 fold from that when no phase plate is provided in the direction equiangularly between the respective absorption axes of the polarizing plates (Φ=about 45°), where the viewing angle characteristic is usually poor. Thus, a high contrast ratio is realized in every azimuth. Although the phase plate is provided between the front-side polarizing plate and the liquid crystal cell in Example 11, a similar viewing angle characteristic can be realized when the phase plate is provided between the rear-side polarizing plate and the liquid crystal cell.

In a direction shifted by about 45° from the absorption axis of the polarizing plate, the viewing angle compensation effect was greater than that realized when no phase plate is provided for the in-plane retardation of about 5 nm to about 70 nm and the plane-normal retardation of about 60 nm to about 280 nm.

EXAMPLE 12

A liquid crystal display device of Example 12 uses the same liquid crystal cell as that of Example 11 and two phase plates produced by the biaxial stretching method, provided between the respective ones of two polarizing plates and the liquid crystal cell. The phase plate formed of the present example is formed of a polycarbonate material and has an in-plane retardation value df·(nx−ny) of about 43 nm and a retardation value df·(nx−nz) in the thickness direction of about 191 nm. The liquid crystal cell of the present example also has a liquid crystal layer whose liquid crystal molecules are oriented substantially vertically to the substrate in the absence of an applied voltage and oriented in axial symmetry about an axis vertical to the substrate in the presence of an applied voltage.

Figure 69:
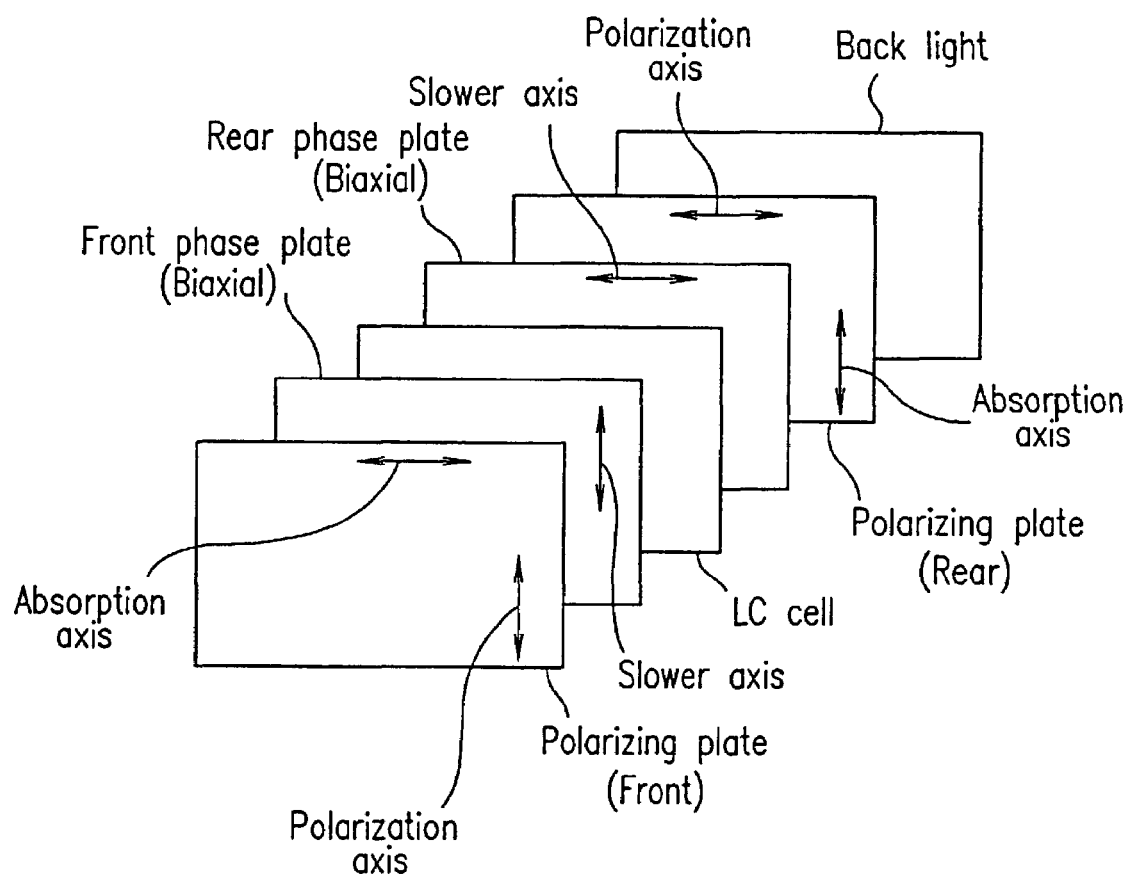
FIG. 69 is a diagram illustrating an arrangement of a liquid crystal cell, polarizing plates and phase plates according to Example 12 of the present invention.

FIG. 69 illustrates the structure of the liquid crystal display device of the present example. The respective slower axes of the pair of phase plates are perpendicular to each other. The slower axis of one of the phase plates is perpendicular to the absorption axis of the polarizing plate, while the respective absorption axes of the polarizing plates are perpendicular to each other (crossed Nicols arrangement).

Figure 70:
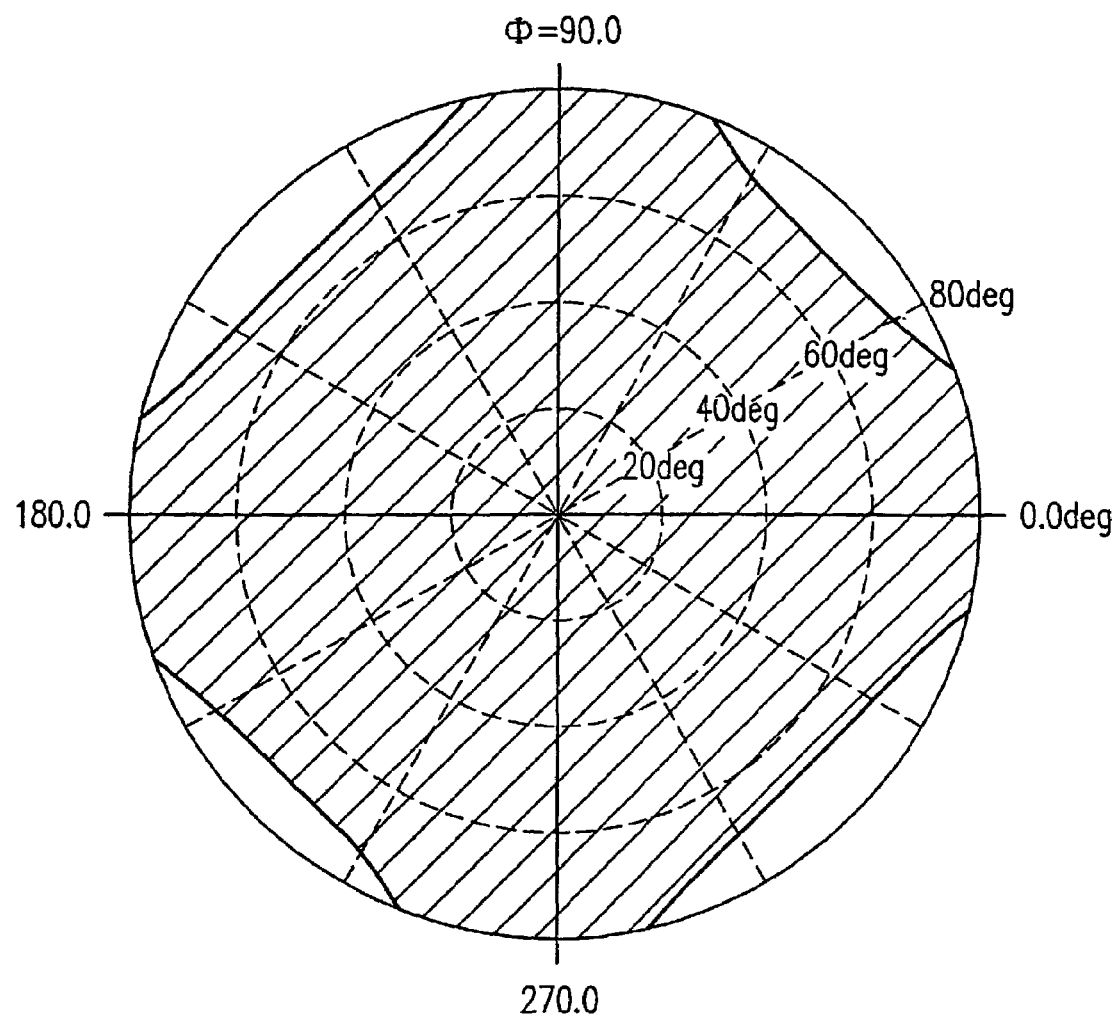
FIG. 70 is a graph illustrating the viewing angle characteristic of the contrast of the liquid crystal display device according to Example 12 of the present invention.

FIG. 70 shows the viewing angle characteristic of the contrast ratio of the liquid crystal display device of the present example. The hatched area represents an area where the contrast ratio is about 10:1 or greater. Due to the effect of the polarizing plates provided in a crossed Nicols arrangement in the liquid crystal display device of the present example, the viewing angle in which a contrast ratio is about 10 or greater increases to about 2.3 fold from that when no phase plate is provided in the direction equiangularly between the respective absorption axes of the polarizing plates (Φ=about 45°), where the viewing angle characteristic is usually poor. Thus, a high contrast ratio is realized in every azimuth.

In a direction shifted by about 45° from the absorption axis of the polarizing plate, the viewing angle compensation effect was greater than that realized when no phase plate is provided for the in-plane retardation of about 5 nm to about 70 nm and the plane-normal retardation of about 60 nm to about 280 nm.

As described in detail above, in a liquid crystal display device where the liquid crystal molecules are oriented in a substantially vertical orientation in the absence of an applied voltage and in an axially symmetric or concentric orientation in each pixel in the presence of an applied voltage, it is possible to prevent the gray-scale inversion from occurring in any viewing angle, thereby realizing a high contrast display over a wide viewing angle. While a liquid region is typically formed for each pixel, a plurality of liquid regions may be formed for each pixel.

The liquid crystal display device of the present invention having such excellent characteristics may be suitably used in a flat display in a personal computer, a word processor, an amusement apparatus, a TV, or the like, or in a display plate, a display window, a display door, a display wall utilizing the shutter effect.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
a liquid crystal cell having a pair of substrates and a liquid crystal layer interposed therebetween;
a pair of polarizing plates interposing the liquid crystal cell therebetween; and
a phase compensation element provided between at least one of the polarizing plates and the liquid crystal cell; wherein
a refractive index anisotropy value of the liquid crystal layer along a plane parallel to a surface of the liquid crystal cell is smaller in a black display than in a white display; and
the phase compensation element has three principal refractive indices nx, ny and nz respectively along x, y and z axes thereof which are perpendicular to one another, and when nx and ny are the principal refractive indices along a plane parallel to a surface of the liquid crystal cell with nz being the principal refractive index along a thickness direction of the liquid crystal cell, wherein the x axis is orthogonal to an absorption axis of one of the polarizing plates closer to a viewer viewing the liquid crystal display device, and the principal refractive indices nx, ny and nz satisfy the following expressions:

$nz<(nx+ny)/2$; and $nx \neq ny$;

wherein the liquid crystal layer includes a nematic liquid crystal material which has a negative dielectric anisotropy, where liquid crystal molecules of the nematic liquid crystal material are oriented substantially perpendicular to the substrate in an absence of an applied voltage, wherein the phase compensation element has a negative birefringence and a relationship nx>ny>nz; and wherein, for the phase compensation element, the ratio between a retardation value df·(nx−ny) of the phase compensation element along an in-plane direction thereof and a retardation value df·(nx−nz) of the phase compensation element along a thickness direction thereof is greater than or equal to 2 and less than or equal to 6.

2. A liquid crystal display device according to claim 1, wherein:
first and second of the phase compensation elements are provided respectively between one of the polarizing plates and the liquid crystal cell and between the other one of the polarizing plates and the liquid crystal cell; and
the first and second phase compensation elements each have a maximum refractive index axis along which the phase compensation element exhibits a maximum refractive index in the plane parallel to the surface of the liquid crystal cell, the axes being perpendicular to each other.

3. A liquid crystal display device according to claim 2, wherein the maximum refractive index axis of each of the first and second phase compensation elements is perpendicular to an absorption axis of one of the polarizing plates which is adjacent to the phase compensation element.

4. A liquid crystal display device according to claim 1, wherein the liquid crystal cell includes a plurality of pixel regions, each of the pixel regions including two or more liquid crystal regions, respectively, having different orientations of liquid crystal molecules.

5. A liquid crystal display device according to claim 1, wherein one of the phase compensation elements is provided between the liquid crystal cell and each of the polarizing plates.

6. A liquid crystal display device according to claim 1, wherein the phase compensation element comprises a biaxial film having retardations along an in-plane direction and along a thickness direction, respectively, or a layered film obtained by attaching together a uniaxial film having a retardation along the in-plane direction and a uniaxial film having a retardation along the thickness direction.

7. A liquid crystal display device according to claim 1, wherein the x axis of the phase compensation element is substantially perpendicular to an absorption axis of one of the polarizing plates which is adjacent to the phase compensation element.

8. A liquid crystal display device according to claim 7, wherein an angular shift between the x axis of the phase compensation element and a direction perpendicular to the absorption axis of the polarizing plate is equal to or less than about 1°.

9. A liquid crystal display device according to claim 1, wherein a retardation value df·(nx−ny) of the phase compensation element along an in-plane direction thereof is less than a retardation value dLC·Δn of the liquid crystal layer, where: Δn denotes a birefringence of the liquid crystal molecules; dLC denotes an average thickness of the liquid crystal layer; and df denotes a thickness of the phase compensation element.

10. A liquid crystal display device according to claim 9, wherein the retardation value dLC·Δn of the liquid crystal layer is in a range of 300 nm to 550 nm.

11. A liquid crystal display device according to claim 10, wherein the birefringence Δn of the liquid crystal molecules, the average thickness dLC (in μm) of the liquid crystal layer and the thickness df of the phase compensation element satisfy the following expressions:

$0 \leq \{df \cdot (nx-ny)\}/(dLC \cdot \Delta n) \leq 0.13$; and $0 \leq \{df \cdot (nx-nz)\}/(dLC \cdot \Delta n) \leq 0.72$.

12. A liquid crystal display device according to claim 1, wherein a retardation value df·(nx−nz) of the phase compensation element along a thickness direction thereof is less than a retardation value dLC·Δn of the liquid crystal layer, where: Δn denotes a birefringence of the liquid crystal molecules; dLC denotes an average thickness of the liquid crystal layer; and df denotes a thickness of the phase compensation element.

13. A liquid crystal display device according to claim 12, wherein the retardation value dLC·Δn of the liquid crystal layer is in a range of 300 nm and 550 nm.

14. A liquid crystal display device according to claim 13, wherein the birefringence Δn of the liquid crystal molecules, the average thickness dLC (in μm) of the liquid crystal layer and the thickness df of the phase compensation element satisfy the following expressions:

$0 \leq \{df \cdot (nx-ny)\}/(dLC \cdot \Delta n) \leq 0.13$; and $0 \leq \{df \cdot (nx-nz)\}/(dLC \cdot \Delta n) \leq 0.72$.

15. A liquid crystal display device according to claim 9, wherein the phase compensation element is such as to satisfy the following expression:

$0.035 \leq \{df \cdot (nx-ny)\}/(dLC \cdot \Delta n) \leq 0.15$.

16. A liquid crystal display device according to claim 1, wherein a retardation value df·(nx−nz) of the phase compensation element along a thickness direction thereof is greater than 0.

17. A liquid crystal display device according to claim 1, wherein the ratio between the retardation value df·(nx−ny) of the phase compensation element along the in-plane direction thereof and the retardation value df·(nx−nz) of the phase compensation element along the thickness direction thereof is in a range of about 3 to about 6.

18. A liquid crystal display device according to claim 1, wherein an average refractive index of the phase compensation element is in a range of about 1.4 to about 1.7.

19. A liquid crystal display device according to claim 1, wherein an antiglare layer is provided on a surface of the one of the polarizing plates closer to the viewer viewing the liquid crystal display device.

20. A liquid crystal display device according to claim 19, wherein an antireflection film is provided on a surface of the antiglare layer.

21. A liquid crystal display device according to claim 4, wherein the phase compensation element comprises a biaxial film having retardations along an in-plane direction and along a thickness direction, respectively, or a layered film obtained by attaching together a uniaxial film having a retardation along the in-plane direction and a uniaxial film having a retardation along the thickness direction.

22. A liquid crystal display device according to claim 4, wherein the x axis of the phase compensation element is substantially perpendicular to an absorption axis of one of the polarizing plates which is adjacent to the phase compensation element.

23. A liquid crystal display device according to claim 22, wherein an angular shift between the x axis of the phase compensation element and a direction perpendicular to the absorption axis of the polarizing plate is equal to or less than about 1°.

24. A liquid crystal display device according to claim 4, wherein a retardation value df·(nx−ny) of the phase compensation element along an in-plane direction thereof is less than a retardation value dLC·Δn of the liquid crystal layer, where: Δn denotes a birefringence of the liquid crystal molecules; dLC denotes an average thickness of the liquid crystal layer; and df denotes a thickness of the phase compensation element.

25. A liquid crystal display device according to claim 24, wherein the retardation value dLC·Δn of the liquid crystal layer is in a range of 300 nm to 550 nm.

26. A liquid crystal display device according to claim 25, wherein the birefringence Δn of the liquid crystal molecules, the average thickness dLC (in μm) of the liquid crystal layer and the thickness df of the phase compensation element satisfy the following expressions:

$0 \leq \{df \cdot (nx-ny)\}/(dLC \cdot \Delta n) \leq 0.13$; and $0 \leq \{df \cdot (nx-nz)\}/(dLC \cdot \Delta n) \leq 0.72$.

27. A liquid crystal display device according to claim 4, wherein a retardation value df·(nx−nz) of the phase compensation element along a thickness direction thereof is less than a retardation value dLC·Δn of the liquid crystal layer, where: Δn denotes a birefringence of the liquid crystal molecules; dLC denotes an average thickness of the liquid crystal layer; and df denotes a thickness of the phase compensation element.

28. A liquid crystal display device according to claim 27, wherein the retardation value dLC·Δn of the liquid crystal layer is in a range of 300 nm and 550 nm.

29. A liquid crystal display device according to claim 28, wherein the birefringence Δn of the liquid crystal molecules, the average thickness dLC (in μm) of the liquid crystal layer and the thickness df of the phase compensation element satisfy the following expressions:

$0 \leq \{df \cdot (nx-ny)\}/(dLC \cdot \Delta n) \leq 0.13$; and $0 \leq \{df \cdot (nx-nz)\}/(dLC \cdot \Delta n) \leq 0.72$.

30. A liquid crystal display device according to claim 24, wherein the phase compensation element is such as to satisfy the following expression:

$$0.035 \leq \{df \cdot (nx-ny)\}/(dLC \cdot \Delta n) \leq 0.15.$$

31. A liquid crystal display device according to claim 4, wherein a retardation value df·(nx−nz) of the phase compensation element along a thickness direction thereof is greater than 0.

32. A liquid crystal display device according to claim 31, wherein the ratio between the retardation value df·(nx−ny) of the phase compensation element along the in-plane direction thereof and the retardation value df·(nx−nz) of the phase compensation element along the thickness direction thereof is in a range of about 3 to about 6.

33. A liquid crystal display device according to claim 4, wherein an average refractive index of the phase compensation element is in a range of about 1.4 to about 1.7.

34. A liquid crystal display device according to claim 4, wherein an antiglare layer is provided on a surface of the one of the polarizing plates closer to the viewer viewing the liquid crystal display device.

35. A liquid crystal display device according to claim 34, wherein an antireflection film is provided on a surface of the antiglare layer.

36. A liquid crystal display device, comprising:
a liquid crystal cell including a liquid crystal layer interposed between a pair of substrates, the liquid crystal layer including liquid crystal molecules with a negative dielectric anisotropy;
a pair of polarizing plates interposing the liquid crystal cell therebetween, with adsorption axes of respective polarizing plates perpendicular to each other;
phase compensation elements, one provided between one of the pair of polarizing plates and the liquid crystal cell, and another provided between the other one of the pair of polarizing plates and the liquid crystal cell;
wherein the liquid crystal molecules are oriented substantially perpendicular to the pair of substrates in an absence of an applied voltage;
where at least one of the phase compensation elements has three principal refractive indices nx, ny and nz respectively along x, y and z axes thereof which are perpendicular to one another, and has a relationship nx>ny>nz where nx and ny denote the principal refractive indices along an in-plane direction and nz denotes the principal refractive index along a thickness direction of the liquid crystal cell;
wherein the at least one phase compensation element is arranged such that an x axis of the phase compensation element is substantially perpendicular to the adsorption axis of the polarizing plate adjacent to the phase compensation element; and
wherein, for each of the phase compensation elements, the ratio between a retardation value df·(nx−ny) of the phase compensation element along an in-plane direction thereof and a retardation value df·(nx−nz) of the phase compensation element along a thickness direction thereof is greater than or equal to 2 and less than or equal to 6.

37. The liquid crystal display device according to claim 36, wherein a retardation value df·(nx−nz) of the phase compensation element along a thickness direction thereof is less than a retardation value dLC·Δn of the liquid crystal layer, where: Δn denotes a birefringence of the liquid crystal molecules; dLC denotes an average thickness of the liquid crystal layer; and df denotes a thickness of the phase compensation element.

38. The liquid crystal display device of claim 37, wherein the retardation value df·(nx−nz) of the phase compensation element along the thickness direction is from 30–80% of the retardation value dLC·Δn of the liquid crystal layer.

39. The liquid crystal display device of claim 36, wherein the retardation value dLC·Δn of the liquid crystal layer is from 300–550 nm.

40. The liquid crystal display device according to claim 36, wherein the at least one phase compensation element is such as to satisfy the following expression:

$$0.035 \leq \{df \cdot (nx-ny)\}/(dLC \cdot \Delta n) \leq 0.15.$$

41. The liquid crystal display device of claim 40, wherein the retardation value dLC·Δn of the liquid crystal layer is from 300–550 nm.

42. A liquid crystal display device according to claim 36, wherein:
each of the phase compensation elements has a maximum refractive index axis along which the phase compensation element exhibits a maximum refractive index in the plane parallel to the surface of the liquid crystal cell, the axes being perpendicular to each other.

43. A liquid crystal display device according to claim 42, wherein the maximum refractive index axis of each of the phase compensation elements is perpendicular to an absorption axis of one of the polarizing plates which is adjacent to the phase compensation element.

44. A liquid crystal display device according to claim 36, wherein the liquid crystal cell includes a plurality of pixel regions, each of the pixel regions including two or more liquid crystal regions, respectively, having different orientations of liquid crystal molecules.

45. A liquid crystal display device according to claim 36, wherein the phase compensation elements each comprise a biaxial film having retardations along an in-plane direction and along a thickness direction, respectively, or a layered film obtained by attaching together a uniaxial film having a retardation along the in-plane direction and a uniaxial film having a retardation along the thickness direction.

46. A liquid crystal display device according to claim 36, wherein a retardation value df·(nx−ny) of the phase compensation element along an in-plane direction thereof is less than a retardation value dLC·Δn of the liquid crystal layer, where: Δn denotes a birefringence of the liquid crystal molecules; dLC denotes an average thickness of the liquid crystal layer; and df denotes a thickness of the phase compensation element.

47. A liquid crystal display device according to claim 36, wherein the retardation value dLC·Δn of the liquid crystal layer is in a range of 300 nm to 550 nm.

48. A liquid crystal display device according to claim 47, wherein the birefringence Δn of the liquid crystal molecules, the average thickness dLC (in μm) of the liquid crystal layer and the thickness df of the phase compensation element satisfy the following expressions:

$$0 \leq \{df \cdot (nx-ny)\}/(dLC \cdot \Delta n) \leq 0.13; \text{ and}$$

$$0 \leq \{df \cdot (nx-nz)\}/(dLC \cdot \Delta n) \leq 0.72.$$

* * * * *